US012325980B2

(12) United States Patent
Izumikawa et al.

(10) Patent No.: US 12,325,980 B2
(45) Date of Patent: Jun. 10, 2025

(54) DISPLAY DEVICE, SHOVEL, AND INFORMATION PROCESSING APPARATUS

(71) Applicant: SUMITOMO CONSTRUCTION MACHINERY CO., LTD., Tokyo (JP)

(72) Inventors: Takeya Izumikawa, Chiba (JP); Takaaki Morimoto, Chiba (JP); Atsushi Nakayama, Chiba (JP); Keiichi Tsuji, Chiba (JP); Yusuke Sato, Chiba (JP); Takashi Umeda, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 225 days.

(21) Appl. No.: 17/451,914

(22) Filed: Oct. 22, 2021

(65) Prior Publication Data
US 2022/0074171 A1   Mar. 10, 2022

Related U.S. Application Data

(63) Continuation of application No. PCT/JP2020/017574, filed on Apr. 23, 2020.

(30) Foreign Application Priority Data

Apr. 26, 2019   (JP) ................. 2019-086881

(51) Int. Cl.
*E02F 9/26* (2006.01)
*B60R 1/27* (2022.01)
(Continued)

(52) U.S. Cl.
CPC ............... *E02F 9/261* (2013.01); *B60R 1/27* (2022.01); *E02F 9/24* (2013.01); *G06T 11/00* (2013.01);
(Continued)

(58) Field of Classification Search
None
See application file for complete search history.

(56) References Cited

U.S. PATENT DOCUMENTS 6,919,917 B1 * 7/2005 Janssen ................ B60R 1/00
348/162
9,332,229 B2   5/2016 Ishimoto
(Continued)

FOREIGN PATENT DOCUMENTS

JP   2010-112100   5/2010
JP   2013-5233   1/2013
(Continued)

OTHER PUBLICATIONS

International Search Report for PCT/JP2020/017574 mailed on Jul. 28, 2020.

*Primary Examiner* — Rebecca A Volentine
(74) *Attorney, Agent, or Firm* — IPUSA, PLLC

(57) ABSTRACT

A display device is provided. The display device displays an image captured by a first camera of a plurality of cameras, the captured image representing a situation around a shovel, and when a predetermined object is detected within an imaging range of a second camera that is different from the first camera, the display device displays an image representing that the predetermined object is detected outside a range of the displayed captured image of the first camera.

12 Claims, 20 Drawing Sheets

(51) Int. Cl.
  *E02F 9/24* (2006.01)
  *G06T 11/00* (2006.01)
  *G06V 20/56* (2022.01)

(52) U.S. Cl.
  CPC ........ *G06V 20/56* (2022.01); *B60R 2300/105* (2013.01); *B60R 2300/304* (2013.01); *B60R 2300/307* (2013.01); *B60R 2300/8033* (2013.01); *B60R 2300/8093* (2013.01)

(56) References Cited

U.S. PATENT DOCUMENTS

| | | | | |
|---|---|---|---|---|
| 2013/0182066 A1* | 7/2013 | Ishimoto | ................. | E02F 9/261 |
| | | | | 348/38 |
| 2013/0222573 A1* | 8/2013 | Onuma | ..................... | E02F 9/24 |
| | | | | 348/82 |
| 2014/0118551 A1 | 5/2014 | Ikeda et al. | | |
| 2014/0354813 A1* | 12/2014 | Ishimoto | ................. | E02F 9/24 |
| | | | | 348/148 |
| 2015/0307024 A1* | 10/2015 | Fukuda | ................. | G06V 20/58 |
| | | | | 382/103 |
| 2017/0282794 A1* | 10/2017 | Kowatari | ............... | B60Q 9/008 |
| 2017/0286763 A1* | 10/2017 | Fukuda | ................. | E02F 9/261 |
| 2017/0305018 A1* | 10/2017 | Machida | ................ | H04N 7/181 |
| 2019/0352885 A1* | 11/2019 | Kurokami | ................ | B60R 1/00 |
| 2019/0360177 A1 | 11/2019 | Kiyota et al. | | |
| 2020/0071912 A1* | 3/2020 | Kennedy | ................ | G06V 20/17 |
| 2020/0284607 A1* | 9/2020 | Mangal | .............. | G01C 21/3647 |

FOREIGN PATENT DOCUMENTS

| | | |
|---|---|---|
| JP | 2014-181508 | 9/2014 |
| JP | 2016-119559 | 6/2016 |
| JP | 2018-157449 | 10/2018 |
| JP | 2019-015176 | 1/2019 |
| WO | 2006/106685 | 10/2006 |
| WO | 2011/158955 | 12/2011 |
| WO | 2017/038123 | 3/2017 |
| WO | 2018/151280 | 8/2018 |

* cited by examiner

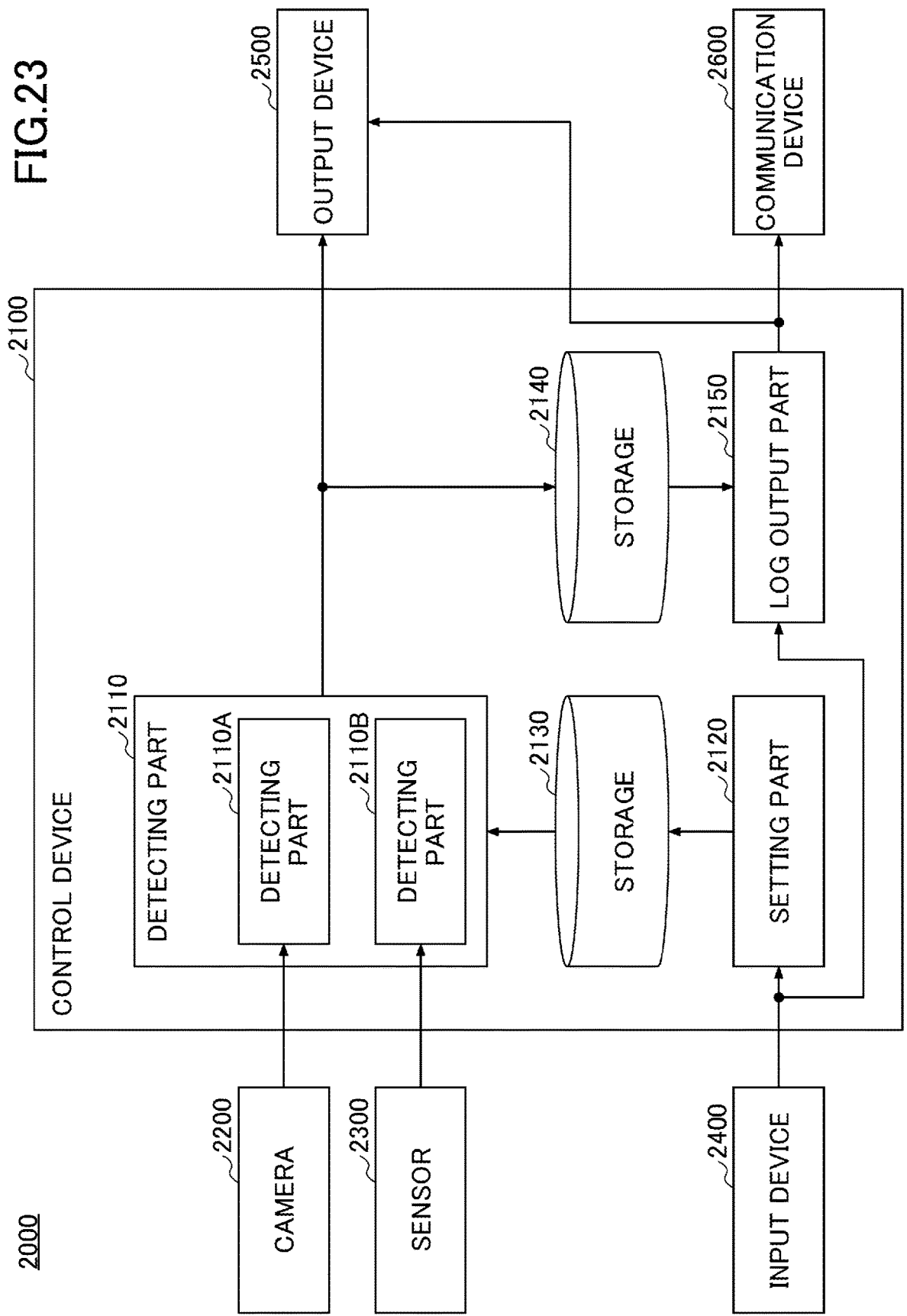

DISPLAY DEVICE, SHOVEL, AND INFORMATION PROCESSING APPARATUS

CROSS-REFERENCE TO RELATED APPLICATION

The present application is a continuation of International Application No. PCT/JP2020/017574, filed on Apr. 23, 2020, which claims priority to Japanese Application No. JP2019-086881, filed on Apr. 26, 2019, the entire content of each of which is incorporated herein by reference.

BACKGROUND

Technical Field

The present disclosure relates to a display device.

Description of Related Art

In the related art, a shovel includes a detection function that detects a monitoring object (such as a person) around the shovel, and a display function that causes a display device, provided within a cabin, to display a peripheral image representing the situation around the shovel based on an image captured by an image capturing device.

SUMMARY

According to an embodiment of the present invention, a display device is provided. The display device displays an image captured by a first camera of a plurality of cameras, the captured image representing a situation around a shovel, and when a predetermined object is detected within an imaging range of a second camera that is different from the first camera, the display device displays an image representing that the predetermined object is detected outside a range of the displayed captured image of the first camera.

According to another embodiment of the present invention, a shovel including the display device, and a cabin is provided. The display device is provided within the cabin.

According to yet another embodiment of the present invention, an information processing apparatus including the display device, and an operation device for remote operation of the shovel is provided.

BRIEF DESCRIPTION OF THE DRAWINGS

Other objects and further features of the present invention will be apparent from the following detailed description when read in conjunction with the accompanying drawings, in which:

FIG. 23 is a diagram illustrating an example configuration of a worksite safety management system.

DETAILED DESCRIPTION

In the shovel according to the related art, if a monitoring object is detected outside the range of a peripheral image displayed on the display device, there may be a case where the monitoring object is not displayed on the display device. Therefore, the operator within the cabin may be unable to identify the location around the shovel.

In view of the above, it is desirable to provide a technology that allows an operator of a shovel to readily identify the location of an object even when the object is detected outside a range of a peripheral image displayed on a display device.

In the following, embodiments will be described with reference to the drawings.

[Outline of Shovel Management System]

First, an outline of a shovel management system 1000 according to an embodiment will be described with reference to FIG. 1 and FIG. 2.

Figure 1:
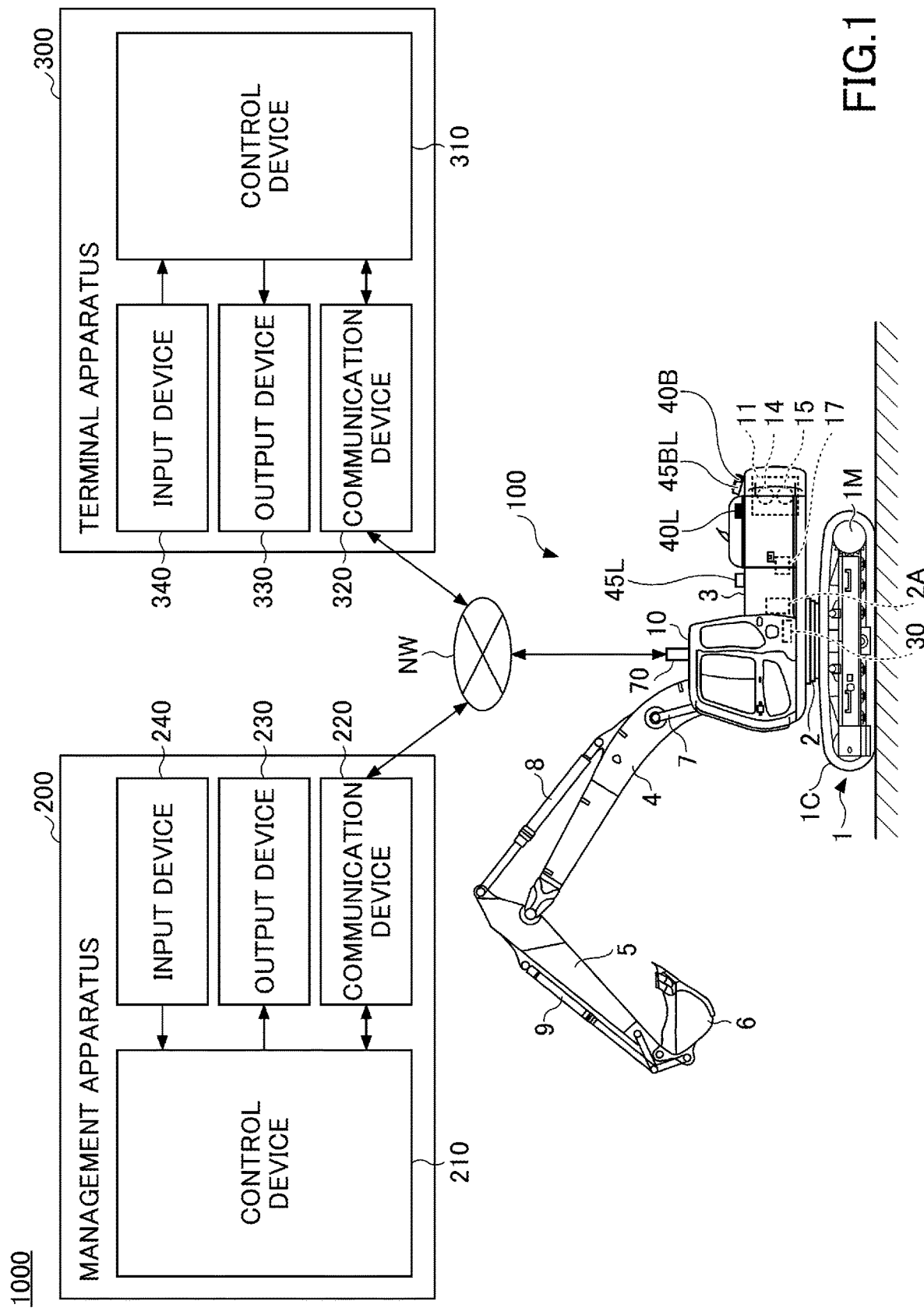
FIG. 1 is a diagram illustrating an example of a shovel management system.
Figure 2:
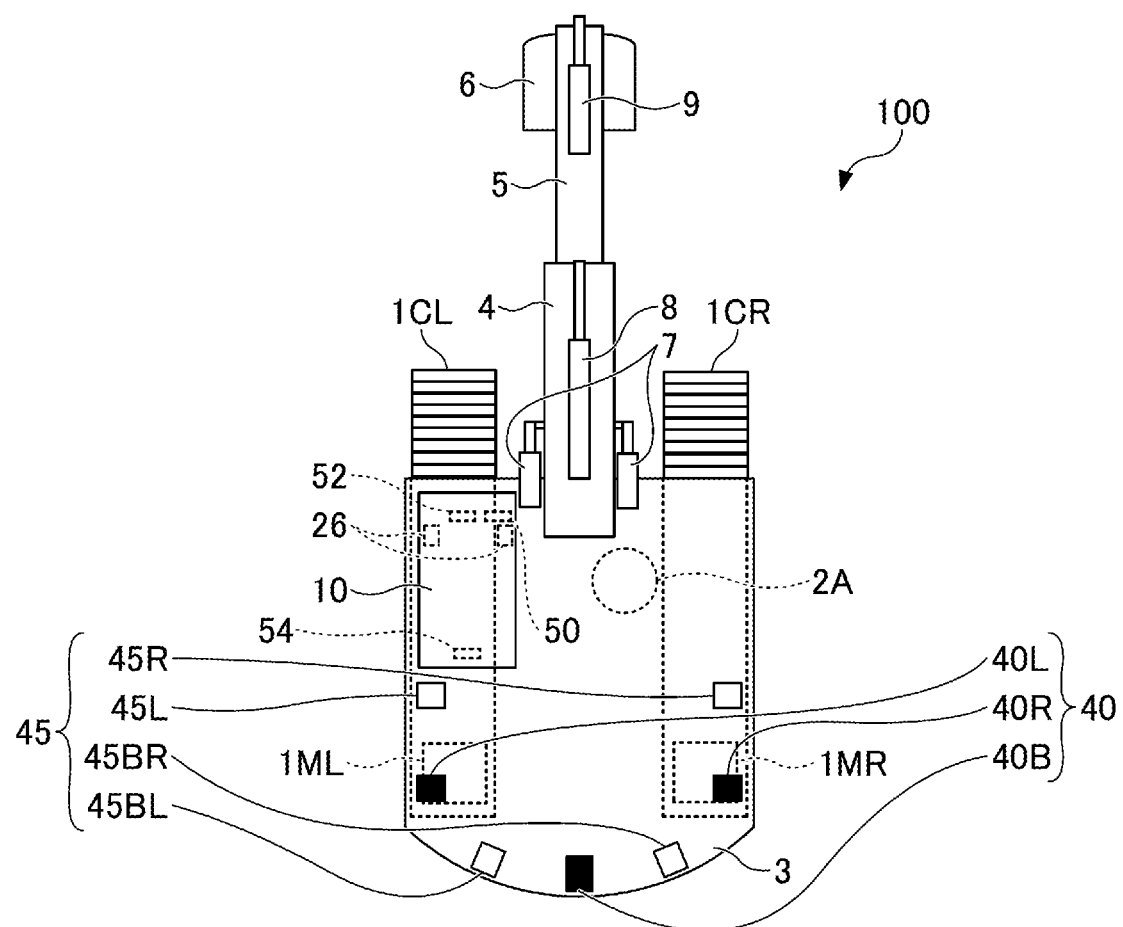
FIG. 2 is a top view of a shovel.

FIG. 1 is a diagram illustrating an example of the shovel management system 1000 according to the embodiment. In FIG. 1, a side view of a shovel 100 is depicted. FIG. 2 is a top view of the shovel 100.

The shovel management system 1000 includes the shovel 100, a management apparatus 200, and a terminal apparatus 300.

The shovel management system 1000 uses the management apparatus 200 and the terminal apparatus 300 to monitor (manage) the operation state, the control state, and the like of the shovel 100, for example.

The shovel management system 1000 may include one or more shovels 100. Further, the shovel management system 1000 may include one or more management apparatuses 200. Further, the shovel management system 1000 may include one or more terminal apparatuses 300.

<Outline of Shovel>

The shovel 100 includes a lower traveling body 1, an upper turning body 3 turnably mounted on the lower traveling body 1 via a turning mechanism 2, a boom 4, an arm 5, a bucket 6, and a cabin 10. The boom 4, the arm 5, and the bucket 6 serve as an attachment.

The shovel 100 drives driven elements such as the lower traveling body 1 (a pair of left and right crawlers 1C), the upper turning body 3, the boom 4, the arm 5, and the bucket 6 according to the operation of an operator seated in the cabin 10. Further, instead of or in addition to being configured to be operable by the operator seated in the cabin 10, the shovel 100 may be configured to be remotely operated. When the shovel 100 is remotely operated, the interior of the cabin 10 may be unmanned. In the following description, an operation performed by an operator includes at least one of an operation performed by the operator in the cabin 10 with respect to an operating device 26 or a remote operation performed by an external operator.

A remote operation includes a mode in which the shovel 100 is operated by an operation input, which is related to actuators of the shovel 100 and performed by an operator of a predetermined external apparatus, for example. The predetermined external apparatus may be the management apparatus 200 or the terminal apparatus 300. In this case, the shovel 100 may transmit image information (captured images), which are output by a front camera that captures an image in front of the upper turning body 3 for remote operation and by an image capturing device 40 as will be described later, to the external device through a communication device 70 as will be described later. The external device may display the received image information (captured images) on a display device (hereinafter referred to as a "remote operation display device") provided in the external device. Further, various kinds of information images (information screens) displayed on a display device 50 provided in the cabin 10 of the shovel 100, may also be displayed on the remote operation display device of the external device. Accordingly, the operator of the external device can remotely operate the shovel 100 while checking the contents displayed on the remote operation display device, such as a captured image representing a situation around the shovel 100, an information screen, and the like. The shovel 100 may operate actuators in accordance with a remote operation signal indicating the details of the remote operation received from the external device through the communication device 70, and drive the driven elements such as the lower traveling body 1 (left and right crawlers 1C), the upper turning body 3, the boom 4, the arm 5, and the bucket 6.

In addition, the remote operation may include a mode in which the shovel 100 is operated by speech or a gesture input from outside by a person (for example, a worker) around the shovel 100. Specifically, the shovel 100 recognizes speech spoken by a worker around the shovel 100, a gesture performed by a worker, and the like through a speech input device (for example, a microphone), a gesture input device (for example, an image capturing device), and the like mounted on the shovel 100 (shovel itself). The shovel 100 may operate actuators so as to drive the driven elements such as the lower traveling body 1 (left and right crawlers 1C), the upper turning body 3, the boom 4, the arm 5, and the bucket 6 in accordance with the details of the recognized speech, gesture, and the like.

Further, the shovel 100 may automatically operate actuators independent of the operator's operation. Accordingly, the shovel 100 can implement a function (hereinafter referred to as an "automatic operation function" or a "machine control function") to automatically operate at least some of the driven elements such as the lower traveling body 1 (left and right crawlers 1C), the upper turning body 3, the boom 4, the arm 5, and the bucket 6.

The automatic operation function may include a function (what is known as a "semi-automatic operation function") to automatically operate driven elements (actuators) other than a target driven element (actuator) in response to the operator's operation with respect to the operating device 26 or the operator's remote operation. Further, the automatic operation function may include a function (what is known as a "fully automatic operation function") to automatically operate at least some of a plurality of driven elements (actuators) without the operator's operation with respect to the operating device 26 or the operator's remote operation. When the fully automatic operation function of the shovel 100 is enabled, the interior of the cabin 10 may be unmanned. In addition, each of the semi-automatic operation function, the fully automatic operation function, and the like may include a function in which an automatic operation of a driven element (actuator) is automatically determined in accordance with predetermined rules. Further, each of the semi-automatic operation function, the fully automatic operation function, and the like may include a function (what is known as an "autonomous operation function") in which the shovel 100 autonomously makes various determinations, and an automatic operation of a driven element (actuator) is determined in accordance with the determination results.

The lower traveling body 1 includes, for example, the pair of left and right crawlers 1C (a left crawler 1CL and a right crawler 1CR), and the crawlers 1CL and 1CR are hydraulically driven by respective traveling hydraulic motors 1M so as to be self-propelling.

The upper turning body 3 is hydraulically driven by a turning hydraulic motor 2A through the turning mechanism 2, so that the upper turning body 3 is turned relative to the lower traveling body 1.

The image capturing device 40 and a surrounding information obtaining device 45 are mounted on the top surface of the upper turning body 3.

Further, a power source of the shovel 100 is installed in the upper turning body 3. The power source of the shovel 100 includes an engine 11 (such as a diesel engine) operated with predetermined fuel (such as diesel fuel). Further, instead of or in addition to the engine 11, the power source of the shovel 100 may include an electric motor or the like, which is operated by power supplied from a power storage device (such as a capacitor or a lithium ion battery) or an external power supply connected by a cable.

Further, various hydraulic devices such as a main pump 14, a pilot pump 15, and a control valve 17 are installed in the upper turning body 3.

The main pump 14 is driven by the power source such as the engine 11 or the electric motor, and supplies hydraulic oil to various hydraulic actuators as controlled by a controller 30. The hydraulic actuator includes a boom cylinder 7, an arm cylinder 8, and a bucket cylinder 9 in addition to the above-described traveling hydraulic motors 1M, the turning hydraulic motor 2A, and the like.

The pilot pump 15 is driven by the power source such as the engine 11 or the electric motor, and supplies hydraulic oil to various hydraulic-pilot-type hydraulic devices (such as the operating device 26 and the control valve 17).

The control valve 17 selectively supplies hydraulic oil discharged from the main pump 14 to the hydraulic actuators in accordance with the operating states of the driven element (that is, the corresponding hydraulic actuators), and adjusts the flow rate and flow direction of the hydraulic oil supplied to the hydraulic actuators. For example, the control valve 17 may include a plurality of hydraulic control valves (direction control valves) for controlling the flow rate and flow direction of the hydraulic oil supplied to the hydraulic actuators. The control valve 17 is of, for example, a hydraulically driven type (a hydraulic pilot type), and pilot pressures, commensurate with the operation details of the hydraulic actuators and commensurate with an operation command corresponding to the automatic operation function, are input into the control valve 17. Accordingly, the control valves (direction control valves) corresponding to the hydraulic actuators are driven in accordance with the input pilot pressures. Further, the control valve 17 may be of an electrically driven type such as an electromagnetic solenoid type, and electrical signals, commensurate with the operation details of the operating device 26 and commensurate with an operation command corresponding to the automatic operation function, are input into the control valve 17. Accordingly, the control valves (direction control valves) corresponding to the hydraulic actuators are driven in accordance with the input electrical signals.

The boom 4 is pivotably attached to the front center of the upper turning body 3 such that the boom 4 can be raised and lowered, the arm 5 is pivotably attached to the tip of the boom 4 such that the arm 5 can be turned upward and downward, and the bucket 6 is pivotably attached to the tip of the arm 5 such that the bucket 6 can be turned upward and downward.

The bucket 6 is an example of an end attachment, and is attached to the tip of the arm 5 such that the bucket 6 can be appropriately replaced with other end attachments in accordance with the work details of the shovel 100. That is, different types of buckets from the bucket 6, such as a relatively large bucket, a slope bucket, and a dredging bucket, may be attached to the tip of the arm 5. Further, end attachments of a different type from the bucket, such as an agitator, a breaker, and a crusher, may be attached to the tip of the arm 5. Further, additional attachments such as a quick coupler and a tiltrotator may be provided between the arm 5 and the end attachment.

The boom 4, the arm 5, and the bucket 6 are hydraulically driven by the boom cylinder 7, the arm cylinder 8, and the bucket cylinder 9, respectively.

The cabin 10 is a cab in which an operator is seated for operation of the shovel 100, and is mounted, for example, on the front left of the upper turning body 3.

The operating device 26, the controller 30, the display device 50, an input device 52, a sound output device 54, and the like are provided in the cabin 10. Further, the communication device 70 is provided on the top surface of the cabin 10.

The operating device 26 is used to operate the driven elements, such as the lower traveling body 1, the upper turning body 3, and the attachment (the boom 4, the arm 5, and the bucket 6), that are driven by the actuators (specifically, the hydraulic actuators). In other words, the operating device 26 is used to operate the hydraulic actuators (such as the traveling hydraulic motors 1M for the crawlers 1CL and 1CR, the turning hydraulic motor 2A, the boom cylinder 7, the arm cylinder 8, and the bucket cylinder 9) that drive the driven elements. The operating device 26 includes levers and pedals corresponding to respective driven elements, that is, respective hydraulic actuators.

The operating device 26 is, for example, of a hydraulic pilot type. In this case, the operating device 26 uses hydraulic oil supplied from the pilot pump 15 to output a pilot pressure, commensurate with the operation details (for example, the operation direction and the operation amount) of the driven elements (that is, the corresponding hydraulic actuators), to the control valve 17. Accordingly, the control valve 17 can cause the driven elements (that is, the corresponding hydraulic actuators) to operate in accordance with the operation details of the operating device 26.

The operating device 26 may be of an electrical type. In this case, the operating device 26 outputs an electrical signal (hereinafter referred to as an "operation signal"), commensurate with the operation details of the driven elements (that is, the corresponding hydraulic actuators), to the controller 30. The controller 30 outputs a control command corresponding to the operation signal to an operation control valve (an "operation control valve"), such as a hydraulic control valve 56 as will be described later, provided in an oil conduit (a pilot line) between the pilot pump 15 and the control valve 17. Therefore, the operation control valve can use hydraulic oil supplied from the pilot pump 15 to cause a pilot pressure commensurate with the operation signal, that is, a pilot pressure commensurate with the operation details of the operating device 26 related to the driven elements (that is, the corresponding hydraulic actuators), to act on the control valve 17. Accordingly, the control valve 17 can cause the driven elements (that is, the corresponding hydraulic actuators) to operate in accordance with the operation details of the operating device 26.

The driven elements, that is, the corresponding actuators (hydraulic actuators), of the shovel 100 may be remotely operated as described above. For example, when a signal (a remote operation signal) indicating the details of a remote operation is transmitted from the predetermined external apparatus to the shovel 100, the controller 30 receives the remote operation signal through the communication device 70. Then, the controller 30 outputs a control command, corresponding to the details of the remote operation specified in the remote operation signal (for example, driven elements or hydraulic actuators to be operated, the operation direction, the operation amount, and the like), to the operation control valve. Therefore, the operation control valve can use hydraulic oil supplied from the pilot pump 15 to cause a pilot pressure, commensurate with the details of the remote operation, to act on the control valve 17 of a hydraulically driven type. In this manner, the control valve 17 can cause the driven elements (that is, the corresponding hydraulic actuators) to operate in accordance with the details of a remote operation.

Some or all of the various hydraulic actuators of the shovel 100 may be replaced by electric actuators. That is, the shovel 100 may be a hybrid shovel or an electrically powered shovel. In this case, the controller 30 may output a control command, which corresponds to the operation details of the operating device 26, the details of a remote operation specified in a remote operation signal, the details of an operation command corresponding to the automatic operation function, or the like, to an electric actuator, a driver that drives the electric actuator, or the like.

Further, when a gate lock lever of the cabin 10 is pulled up (a "locked state"), an operation with respect to the operating device 26, a remote operation, and an operation command corresponding to the automatic operation function are disabled, and thus, the operation of the shovel 100 is disabled. Conversely, when the gate lock lever is pushed down ("an unlocked state"), an operation with respect to the operating device 26, a remote operation, and an operation command corresponding to the automatic operation function are enabled, and thus, the operation of the shovel 100 is enabled. The locked state of the gate lock lever can prevent the shovel 100 from being operated by the operator who unintentionally touches the operating device 26 in the process of seating him/herself in the operator seat, or exiting the cabin 10. Further, the operator can start the operation of the shovel 100 by pushing down the gate lock lever.

For example, the operating state of the gate lock lever synchronizes with the opening/closing state of a gate lock valve provided at the most upstream in a pilot line that supplies a pilot pressure from the pilot pump 15 to the various hydraulic device (such as the operating device 26 of a hydraulic pilot type and the operation control valve). Specifically, when the gate lock lever is in an unlocked state, the gate lock valve is maintained in an open state (enabled state), thereby causing a pilot pressure to be supplied from the pilot pump 15 to the operating device 26 and the operation control valve. Therefore, the operating device 26 and the operation control valve can supply the pilot pressure commensurate with the details of the operator's operation to the control valve 17 and cause the hydraulic actuator to be operated. Conversely, when the gate lock lever is in a locked state, the gate lock valve is maintained in a closed state (disabled state), thereby disabling the supply of a pilot pressure from the pilot pump 15 to the operating device 26 and the operation control valve. Therefore, the operating device 26 and the operation control valve cannot supply the pilot pressure commensurate with the details of the operator's operation to the control valve 17, and thus can disable the operator's operation and an operation command corresponding to the automatic operation function.

Further, as described above, some or all of the hydraulic actuator may be replaced by electric actuators. In this case, when the gate lock lever is in a locked state, the controller 30 may be configured to not output a control command, which corresponds to the operator's operation or an operation command corresponding to the automatic operation function, to an electric actuator, a driver, or the like. In this manner, the operator's operation or the operation command corresponding to the automatic operation function can be disabled in accordance with the locked state of the gate lock lever.

The communication device 70 communicates with external apparatuses (for example, the management apparatus 200 and the terminal apparatus 300), which are located outside the shovel 100, through a communication network NW.

The communication network NW includes, for example, a wide area network (WAN). The wide area network may include a mobile communication network with a base station at the end, for example. The wide area network may also include, for example, a satellite communication network using a communication satellite. The communication line NW may also include, for example, the Internet network. Further, the communication network NW includes, for example, a local area network (LAN) inside a facility or the like where the management apparatus 200 is installed. The local area network may be a wired network, a wireless network, or a combination of wired and wireless networks. The communication network NW may include, for example, a short-range wireless communication network, such as Wi-Fi or Bluetooth (registered trademark).

The shovel 100 uses the communication device 70 to communicate with the management apparatus 200. Therefore, the shovel 100 can transmit data related to the shovel 100 (shovel itself) to the management apparatus 200, and receive data related to the control of shovel 100 (shovel itself) from the management apparatus 200.

Further, the shovel 100 may use the communication device 70 to communicate with the terminal apparatus 300. In this case, the shovel 100 may indirectly communicate with the terminal apparatus 300 via the management apparatus 200, or may directly communicate with the terminal apparatus 300.

<Outline of Management Apparatus>

The management apparatus 200 is provided outside the shovel 100, and manages the operation state, the control state, and the like of the shovel 100, for example. The management apparatus 200 may assist the remote operation of the shovel 100.

The management apparatus 200 is, for example, a cloud server installed in a management center outside a worksite of the shovel 100. The management apparatus 200 may be, for example, an edge server installed in a temporary office or within a worksite or in a base station or a shelter relatively close to a worksite. Further, the management apparatus 200 may be a stationary terminal apparatus (a stationary terminal) installed in a temporary office or the like within a worksite of the shovel 100, or may be a terminal apparatus (a portable terminal). The stationary terminal may be for example, a desktop computer terminal. The portable terminal may be, for example, a mobile phone, a smartphone, a tablet terminal, or a laptop computer terminal.

The management apparatus 200 includes a control device 210, a communication device 220, an output device 230, and an input device 240.

The control device 210 performs control related to the management apparatus 200. Functions of the control device 210 may be implemented by any hardware, a combination of hardware and software, or the like. For example, the control device 210 may be configured mainly by a computer including a central processing unit (CPU), a memory device such as a random-access memory (RA), an auxiliary storage device such as a read-only memory (ROM), and input and output interfaces for external devices. A control device 310, which will be described later, may have a similar configuration.

The communication device 220 communicates with external apparatuses (such as the shovel 100 and the terminal apparatus 300) outside the management apparatus 200 via the communication network NW.

The output device 230 outputs information to a user (hereinafter referred to as a "management apparatus user") such as an administrator of the management apparatus 200 or a worker. The output device 230 may include, for example, a display device and an illumination device configured to output visual information. The display device includes, for example, a liquid crystal display or an organic electroluminescent (EL) display configured to output image information. Further, the display device may include the above-described remote operation display device. Further, the output device 230 may include, for example, a sound output device configured to output auditory information. The sound output device includes, for example, a speaker and a buzzer.

The input device 240 receives various inputs from the management apparatus user, and signals corresponding to the input contents are input into the control device 210. The input device 240 includes, for example, an operation input device configured to receive an operation input from the management apparatus user. The operation input device includes, for example, a mouse, a keyboard, a touch panel, a button, a toggle, and a lever. In addition, the input device 240 may include, for example, a speech input device configured to receive a speech input from the management apparatus user and a gesture input device configured to receive a gesture input from the management apparatus user. The speech input device includes, for example, a microphone configured to obtain speech data spoken by the management apparatus user. The gesture input device includes, for example, an image capturing device (a camera) configured to capture an image of a gesture performed by the management apparatus user. Further, the input device 240 may include, for example, an operation device for remote operation (a remote operation device).

The control device 210 uses the communication device 220 to communicate with each of the shovel 100 and the terminal apparatus 300. Therefore, the management apparatus 200 can receive various types of data transmitted (uploaded) from the shovel 100, and collect various types of data related to the shovel 100. Further, the control device 210 may use the communication device 220 to transmit data related to control of the shovel 100 to the shovel 100, and external control the shovel 100. Further, the control device 210 may use the communication device 220 to provide various types of data to the terminal apparatus 300 in response to a request from the terminal apparatus 300. Further, the control device 210 may use the communication device 220 to transmit a signal indicating the details of a remote operation, received from the input device 240 (the remote operation device), to the shovel 100 being remotely operated. In this manner, the management apparatus 200 can assist the remote operation of the shovel 100.

<Outline of Terminal Apparatus>

The terminal apparatus 300 is, for example, a terminal apparatus (user terminal) used by a user who receives information in the shovel management system 1000. The terminal apparatus 300 may assist the remote operation of the shovel 100.

The terminal apparatus 300 is a general-purpose portable terminal, such as a laptop computer terminal, a tablet terminal, or a smartphone carried by the user. The support apparatus 300 may be a general-purpose stationary terminal such as a desktop computer. The support apparatus 300 may be a dedicated terminal (a portable terminal or a stationary terminal) for receiving data (information) related to the shovel 100 and assisting the remote operation of the shovel 100.

The terminal apparatus 300 includes the control device 310, a communication device 320, an output device 330, and an input device 340.

The control device 310 performs control related to the terminal apparatus 300.

The communication device 320 communicates with external apparatuses (such as the shovel 100 and the management apparatus 200) outside the terminal apparatus 300 via the communication network NW.

The output device 330 outputs information to a user (hereinafter referred to as a "terminal apparatus user") such as an administrator of the terminal apparatus 300 or a worker. The output device 330 may include, for example, a display device and an illumination device configured to output visual information. The display device includes, for example, a liquid crystal display or an organic EL display configured to output image information. Further, the display device may include the above-described remote operation display device. Further, the output device 330 may include, for example, a sound output device configured to output auditory information. The sound output device includes, for example, a speaker and a buzzer.

The input device 340 receives various inputs from the terminal apparatus user, and signals corresponding to the input contents are input into the control device 310. The input device 340 includes, for example, an operation input device configured to receive an operation input from the terminal apparatus user. The operation input device includes, for example, a mouse, a keyboard, a touch panel, a button, a toggle, and a lever. In addition, the input device 340 may include, for example, a speech input device configured to receive a speech input from the terminal apparatus user and a gesture input device configured to receive a gesture input from the terminal apparatus user. The speech input device includes, for example, a microphone configured to obtain speech data spoken by the terminal apparatus user. The gesture input device includes, for example, an image capturing device (a camera) configured to capture an image of a gesture performed by the terminal apparatus user. Further, the input device 340 may include, for example, a remote operation device.

The control device 310 uses the communication device 320 to communicate with the management apparatus 200. Therefore, the terminal apparatus 300 can request the management apparatus 200 to provide data related to the shovel 100. Further, the terminal apparatus 300 may receive data related to the shovel 100 from the management apparatus 200, and provide a user with information related to the shovel 100 through the output device 330 (display device).

The control device 310 may use the communication device 320 to communicate with the shovel 100. In this case, the terminal apparatus 300 may indirectly communicate with the shovel 100 via the management apparatus 200, or may directly communicate with the shovel 100. The control device 310 may use the communication device 320 to transmit a signal (a remote operation signal) indicating the details of a remote operation, received from the input device 340 (the remote operation device), to the shovel 100 being remotely operated. In this manner, the terminal apparatus 300 can assist the remote operation of the shovel 100.

[Configuration of Surroundings Monitoring Apparatus]

Next, the configuration of a surroundings monitoring apparatus 150 included in the shovel 100 according to the present embodiment will be described with reference to FIG. 3 through FIG. 7 in addition to FIG. 1 and FIG. 2.

Figure 3:
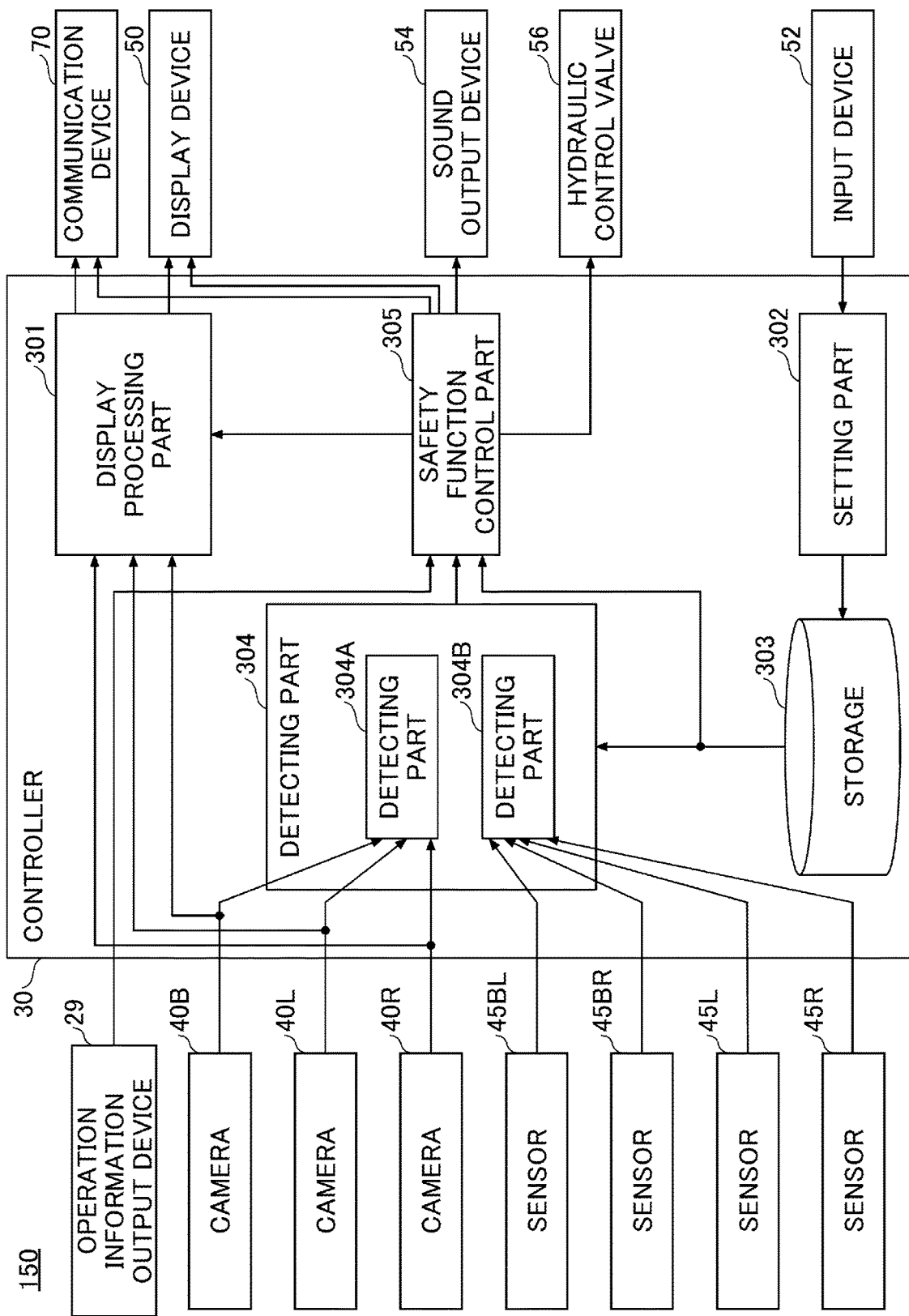
FIG. 3 is a block diagram illustrating an example configuration of a surroundings monitoring apparatus.
Figure 4:
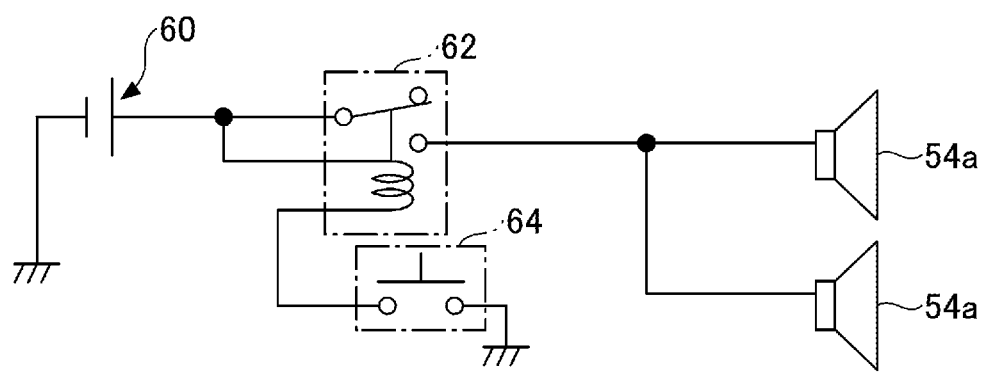
FIG. 4 is a diagram illustrating an example circuit configuration for sounding a horn.
Figure 5:
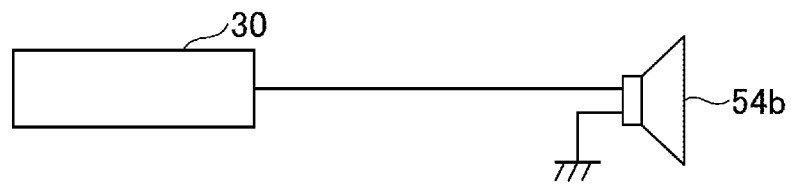
FIG. 5 is a diagram illustrating an example circuit configuration for sounding a travel alarm.

FIG. 3 through FIG. 5 are diagrams illustrating the configuration of the surroundings monitoring apparatus 150. Specifically, FIG. 3 is a block diagram illustrating an example configuration of the surroundings monitoring apparatus 150. FIG. 4 is a diagram illustrating an example circuit configuration for sounding a horn 54a. FIG. 5 is a diagram illustrating an example circuit configuration for sounding a travel alarm 54b.

The surroundings monitoring apparatus 150 monitors the entry of a predetermined object (hereinafter referred to as a "monitoring target") into a predetermined area surrounding the shovel 100. If a monitoring target is detected in the predetermined area surrounding the shovel 100, the surroundings monitoring apparatus 150 activates a safety function to ensure the safety in the surroundings of the shovel 100.

The safety function may include a notification function (an example of a first safety function) to, for example, output an alarm to at least one of the interior of the cabin 10, the exterior of the cabin 10, a remote operator or an administrator of the shovel 100, and the like so as to provide a notification indicating that the monitoring target is detected. Accordingly, the operator in the cabin 10, workers around the shovel 100, the remote operator or the administrator performing a remote operation of the shovel 100, and the like can be alerted that the monitoring target is detected in the predetermined area surrounding the shovel 100. In the following, the notification function to output an alarm to the interior of the cabin 10, that is, to the operator and the like of the shovel 100, may be referred to as an "internal notification function". Further, the notification function to output an alarm to the exterior of the cabin 10, that is, to workers and the like around the shovel 100, may be referred to as an "external notification function". Further, the notification function to output an alarm to the remote operator or the administrator, located remotely from the cabin 10, may be referred to as an "remote notification function". Further, the safety function may include an operation limiting function (an example of a second safety function) to limit the operation of the shovel 100 with respect to the operation of the operating device 26 or a remote operation.

The operation limiting function may include at least one of an operation deceleration function and an operation stop function. The operation deceleration function causes the operation speed of the shovel 100 to be lower than usual with respect to the operation of the operating device 26, a remote operation, or an operation command corresponding to the automatic operation function. The operation stop function stops the operation of the shovel 100, and maintains the stopped state of the shovel 100 irrespective of the operation of the operating device 26, a remote operation, or an operation command corresponding to the automatic operation function.

Examples of a monitoring target include persons such as workers performing work around the shovel 100 and supervisors at a worksite. In addition, examples of a monitoring target may include any objects (obstacles) other than persons, such as materials temporarily placed at a worksite, stationary obstacles (such as a temporary office placed at a worksite), and moving obstacles (such as vehicles including trucks). In the present embodiment, an example in which a monitoring target is a person will be mainly described.

As illustrated in FIG. 3, the surroundings monitoring apparatus 150 includes the controller 30, an operation information output device 29, the image capturing device 40, the surrounding information obtaining device 45, the display device 50, the input device 52, the sound output device 54, the hydraulic control valve 56, and the communication device 70.

The controller 30 is a control device configured to perform control related to functions of the surroundings monitoring apparatus 150. The controller 30 is installed in the cabin 10, for example.

Functions of the controller 30 may be implemented by any hardware, a combination of hardware and software, or the like. For example, the controller 30 may be configured mainly by a computer including a CPU, a memory device such as a RAM, an auxiliary storage device such as a ROM, and input and output interfaces for external devices. The controller 30 includes a display processing part 301, a setting part 302, a detecting part 304, a safety function control part 305, as functional units implemented by executing, on the CPU, one or more programs stored in the auxiliary storage device. Further, the controller 30 uses a storage 303. The storage 303 is implemented by, for example, the auxiliary storage device, an external storage device communicably connected to the controller 30, or the like.

Some or all of the functions of the controller 30 may be implemented by other controllers. That is, the functions of the surroundings monitoring apparatus 150 may be implemented by being shared by a plurality of controllers. The controller 30 may also perform control related to the shovel 100 other than the functions of the surroundings monitoring apparatus 150. That is, the controller 30 may be a dedicated controller specific to the functions of the surroundings monitoring apparatus 150, or may be a general-purpose controller that performs control related to various functions of the shovel 100 including the functions of the surroundings monitoring apparatus 150. Further, some or all of the functions of the controller 30 may be transferred to the exterior of the shovel 100 (for example, to the management apparatus 200). In this case, the operation of the shovel 100 may be controlled in real time in response to a control command from an external apparatus such as the management apparatus 200. For example, as in the case of a 5G (5th Generation) mobile communication network, if very high-speed communication can be achieved through the communication line NW, the operation of the shovel 100 can be controlled without delay even when control commands are sequentially transmitted from the management apparatus 200 to the shovel 100.

The operation information output device 29 is configured to output information (hereinafter referred to as "operation information") related to the operation details of the operating device 26, the details of a remote operation, or the details of an operation command corresponding to the automatic operation function, that is, information related to the operation details of driven elements (that is, corresponding hydraulic actuators).

The operation information output device 29 may be, for example, a sensor (hereinafter referred to as an "operation information obtaining sensor") that obtains information related to the operation details of the operating device 26. The operation information obtaining sensor is, for example, a linear encoder that senses the operation direction or the operation amount of a lever or a pedal of the operating device 26. The operation information obtaining sensor is, for example, a pressure sensor that senses a pilot pressure on the secondary side of the operating device 26 of a hydraulic pilot type. The operation information output device 29 may be, for example, the operating device 26 of an electrical type. This is because an operation signal output from the operating device 26 of an electrical type corresponds to operation information. Further, if the shovel 100 is remotely operated, the operation information output device 29 is, for example, the communication device 70 that receives a remote control signal from an external apparatus. Further, if the shovel 100 is operated by the automatic operation function, the operation information output device 29 may be, for example, an arithmetic device that outputs an operation command.

The image capturing device 40 is attached to the top surface of the upper turning body 3, and is configured to capture an image of an area surrounding the shovel 100, ranging from an area relatively close to the shovel 100 to an area relatively far from the shovel 100, and output the captured image. The image capturing device 40 includes cameras 40B, 40L, and 40R. The cameras 40B, 40L, and 40R may be hereinafter collectively referred to as a "camera 40X".

The camera 40B, the camera 40L, and the camera 40R are attached to the upper rear end, the upper left end, and the upper right end, respectively, of the upper turning body 3, and are configured to capture images on the rear side, the left side, and right side of the upper turning body 3. The camera 40X is, for example, a monocular camera having a very wide angle of view (that is, a wide angle camera). Further, the camera 40X may be, for example, a stereo camera, a depth camera, or the like. The camera 40B captures, for example, an image within an imaging range behind the upper turning body 3, for example, within an imaging range from the rear left to the rear right of the upper turning body 3 in the horizontal direction (that is, the circumferential direction viewed from the shovel 100). The camera 40L captures, for example, an image within an imaging range to the left of the upper turning body 3, for example, within an imaging range from the front left to the rear left of the upper turning body 3 in the horizontal direction (that is, the circumferential direction viewed from the shovel 100). The camera 40R captures, for example, an image within an imaging range to the right of the upper turning body 3, for example, within an imaging range from the front right to the rear right of the upper turning body 3 in the horizontal direction (that is, the circumferential direction viewed from the shovel 100). The camera 40X is attached to the top surface of the upper turning body 3 such that the optical axis points obliquely downward. The camera 40X captures an image within a vertical imaging range from the ground in the vicinity of the shovel 100 to an area far from the shovel 100.

During a period of time from when the shovel 100 is started (that is, when the key switch is turned on) until when the shovel 100 is stopped (that is, when the key switch is turned off), the camera 40X outputs captured images at predetermined intervals (for example, every ⅟30 seconds). The captured images output from the camera 40X are input into the controller 30.

If the shovel 100 is remotely operated, the shovel 100 may be provided with, in addition to the image capturing device 40, a front camera that captures an image in front of the shovel 100 such that an operator performing a remote operation as described above can check the situation in front of the shovel 100 may be provided.

The surrounding information obtaining device 45 (an example of a "sensor") is attached to the top surface of the upper turning body 3, and is configured to obtain information on the situation around the shovel 100. The surrounding information obtaining device 45 includes sensors 45BL, 45BR, 45L, and 45R. The sensors 45BL, 45BR, 45L, and 45R may be hereinafter collectively referred to as a "sensor 45X".

The sensors 45BL, 45BR, 45L, and 45R are attached to the upper rear end on the left side, the upper rear end on the right side, the upper left end, and the upper right end, respectively, of the upper turning body 3, and are configured to obtain information relating to the situations on the rear left side, the rear right side, the left side, and right side of the upper turning body 3. The sensor 45X may be light detection and ranging (lidar). The sensor 45X may be, for example, a millimeter wave radar, an ultrasonic sensor, or the like. In the following, an example in which the sensor 45X is lidar will be mainly described.

The sensor 45X obtains information indicating a situation around the shovel 100 by emitting infrared light in a direction and receiving reflected light (infrared light) from an object in the direction. Specifically, the sensor 45X obtains information related to the received reflected light (hereinafter referred to as "received light information"). The sensor 45X is, for example, scanning lidar, which is a three-dimensional laser scanner capable of scanning an infrared laser in the vertical direction and the horizontal direction with respect to an emission direction of the infrared laser. Further, the sensor 45X may also be, what is known as flash lidar that emits infrared light from a light emitting module over a wide three-dimensional area, and captures an image of reflected light (infrared light) with a three-dimensional range image device.

The received light information includes information related to a period of time (time of flight (TOF)) from when infrared light is emitted in each light emission direction until when reflected light is received (hereinafter referred to as "TOF information"), and also includes information related to the intensity of reflected light received from each light emission direction (hereinafter referred to as "received light intensity information").

The sensor 45BL is configured to be able to emit infrared light within a light emission range on the rear left side of the upper turning body 3, for example, within a light emission range from the rear left to the rear of the upper turning body 3 in the horizontal direction (that is, the circumferential direction viewed from the shovel 100). Further, the sensor 45BR is configured to be able to emit infrared light within a light emission range on the rear right side of the upper turning body 3, for example, within a light emission range from the rear right to the rear of the upper turning body 3 in the horizontal direction (that is, the circumferential direction viewed from the shovel 100). Further, the sensor 45L is configured to be able to emit infrared light within a light emission range to the left of the upper turning body 3, for example, within a light emission range from the front left to the rear left of the upper turning body 3 in the horizontal direction (that is, the circumferential direction viewed from the shovel 100). Further, the sensor 45R is configured to be able to emit infrared light within a light emission range to the right of the upper turning body 3, for example, within a light emission range from the front right to the rear right of the upper turning body 3 in the horizontal direction (that is, the circumferential direction viewed from the shovel 100). The sensor 45X is attached to the top surface of the upper turning body 3 such that the optical axis (that is, the reference axis in the light emission direction of infrared light) points obliquely downward. The sensor 45X is configured to emit infrared light within a vertical light emission range centered on the ground relatively to close to the shovel 100.

During a period of time from when the shovel 100 is started until when the shovel 100 is stopped, the sensor 45X outputs the received light information at predetermined intervals. The received light information output from the sensor 45X are input into the controller 30.

The display device 50 is disposed in the vicinity of the operator's seat within the cabin 10, specifically at a position easily visible from the operator seated in the cabin 10. The display device 50 displays various kinds of image information to be provided to the operator. The display device 50 may be a liquid crystal display or an organic electroluminescent (EL) display, or may be a touch panel display that also serves as the input device 52. As will be described later, the display device 50 displays, for example, an image (hereinafter referred to as a "monitoring image") representing a situation around the shovel 100 (shovel itself) based on an image captured by the image capturing device 40, as controlled by the controller 30 (display processing part 301).

The input device 52 receives the operator's various inputs related to the functions of the surroundings monitoring apparatus 150, and outputs signals corresponding to the inputs to the controller 30. The input device 52 includes, for example, any operation input devices implemented with hardware such as a touch panel, a touch pad, a button, a toggle, and a rotary knob. Further, the input device 52 may include operation input devices implemented with software such as a virtual button icon on an operation screen displayed on the display device 50. Further, the input device 52 may include a speech input device and a gesture input device configured to receive speech and gestures input by a user such as the operator.

The sound output device 54 outputs a sound toward at least one or both of the interior of the cabin 10 and the exterior of the cabin 10. The sound output device 54 may include, for example, a speaker and a buzzer provided within the cabin 10, and may output a sound toward the operator. Further, the sound output device 54 may include, for example, the horn 54a and the travel alarm 54b, and may output a sound toward the surroundings of the shovel 100.

The horn 54a is, for example, mounted on the front of the upper turning body 3.

As illustrated in FIG. 4, the horn 54a sounds when a relay 62 provided in a power path between the horn 54a and a battery 60 is closed, in response to a knob switch 64 provided in the cabin 10 being turned on. When starting to cause the shovel 100 to travel, the operator or the like can notify workers in the vicinity of the shovel 100 that the shovel 100 (lower traveling body 1) starts to travel by turning on the knob switch 64 to sound the horn 54a.

The travel alarm 54b is, for example, mounted on the rear of the upper turning body 3.

As illustrated in FIG. 5, the travel alarm 54b outputs a sound (such as a beep that sounds repeatedly) in a predetermined pattern while the lower traveling body 1 is traveling, that is, while the crawlers 1C are operated, as controlled by the controller 30.

Referring back to FIG. 3, the hydraulic control valve 56 is provided in a pilot line connecting the pilot pump 15 and the control valve 17 (specifically, a pilot port of a control valve corresponding to a hydraulic actuator). The hydraulic control valve 56 can be operated in response to a control command from the controller 30, and adjusts a pilot pressure acting on the control valve 17. The hydraulic control valve 56 may be, for example, provided in a pilot line between the pilot pump 15 and the operating device 26 of a hydraulic pilot type, that is, a pilot line on the primary side of the operating device 26. Further, the hydraulic control valve 56 may be, for example, provided in a pilot line between the operating device 26 and the control valve 17, that is, a pilot line on the secondary side of the operating device 26. Further, the hydraulic control valve 56 may be the above-described operation control valve in the case of, for example, the operating device 26 of an electrical type, a remote operation, or the automatic operation function. The hydraulic control valve 56 is, for example, a proportional solenoid valve. Specifically, the hydraulic control valve 56 can adjust the pilot pressure acting on the control valve 17, independent of the operation details of the operating device 26 or the details of a remote operation, as controlled by the controller 30. In other words, the controller 30 can use the hydraulic control valve 56 to automatically control the operation of the shovel 100, independent of the operation details of the operating device 26 or the details of a remote operation. As a result, the automatic operation function can be implemented.

The display processing part 301 causes the display device 50 to display a monitoring image (peripheral image) representing the situation around the shovel 100 based on an image captured by the image capturing device 40.

For example, the display processing part 301 causes the display device 50 to display, as a monitoring image, an image captured by at least one of the cameras 40B, 40L, and 40R, in accordance with a predetermined operation with respect to the input device 52. That is, the display processing part 301 may cause the display device 50 to display images captured by two or more of the cameras 40B, 40L, and 40R side by side, or may cause the display device 50 to display an image captured by one of the cameras 40B, 40L, and 40R. A captured image displayed on the display device 50 may be hereinafter referred to as a "through-the-lens image".

The display processing part 301 may switch between images, captured by the cameras 40B, 40L, and 40R, to be displayed on the display device 50 in accordance with a predetermined operation with respect to the input device 52. Accordingly, the operator can display a through-the-lens image on the display device 50 in a direction desired by the operator by operating the input device 52.

Further, for example, the display processing part 301 generates a combined image based on images captured by a plurality of cameras (at least two or more of the cameras 40B, 40L, and 40R) of the image capturing device 40, and causes the display device 50 to display a monitoring image including the combined image.

Specifically, the display processing part 301 generates a viewpoint-converted image viewed from a virtual viewpoint by performing a known viewpoint conversion process and a synthesizing process based on images captured by the cameras 40B, 40L, and 40R, and causes the display device 50 to display the viewpoint-converted image as a combined image. Further, when causing the display device 50 to display the combined image, the display processing part 301 causes the display device 50 to display a shovel image schematically representing the shovel 100 together with the combined image, in order to clarify the relative positional relationship between the imaging range of the image capturing device 40 and the shovel 100. That is, the display processing part 301 generates a monitoring image including a shovel image and a viewpoint-converted image, which is placed along the periphery of the shovel image in accordance with the relative positional relationship between the shovel 100 and the imaging range of the image capturing device 40. Then, the display processing part 301 causes the display device 50 to display the monitoring image.

Note that functions of the display processing part 301 may be provided in the display device 50.

Figure 6:
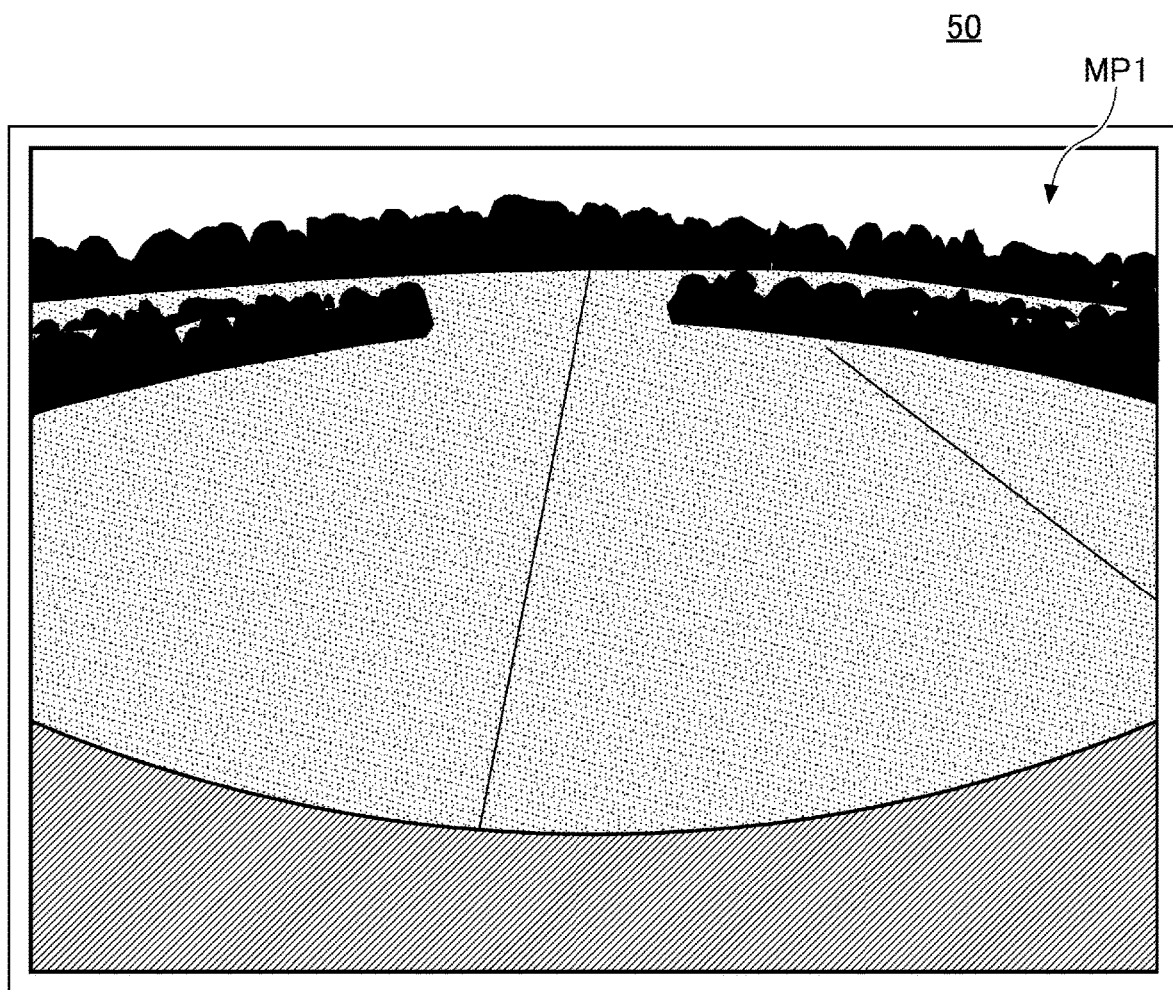
FIG. 6 is a diagram illustrating an example of a monitoring image (a through-the-lens image) displayed on a display device.
Figure 7:
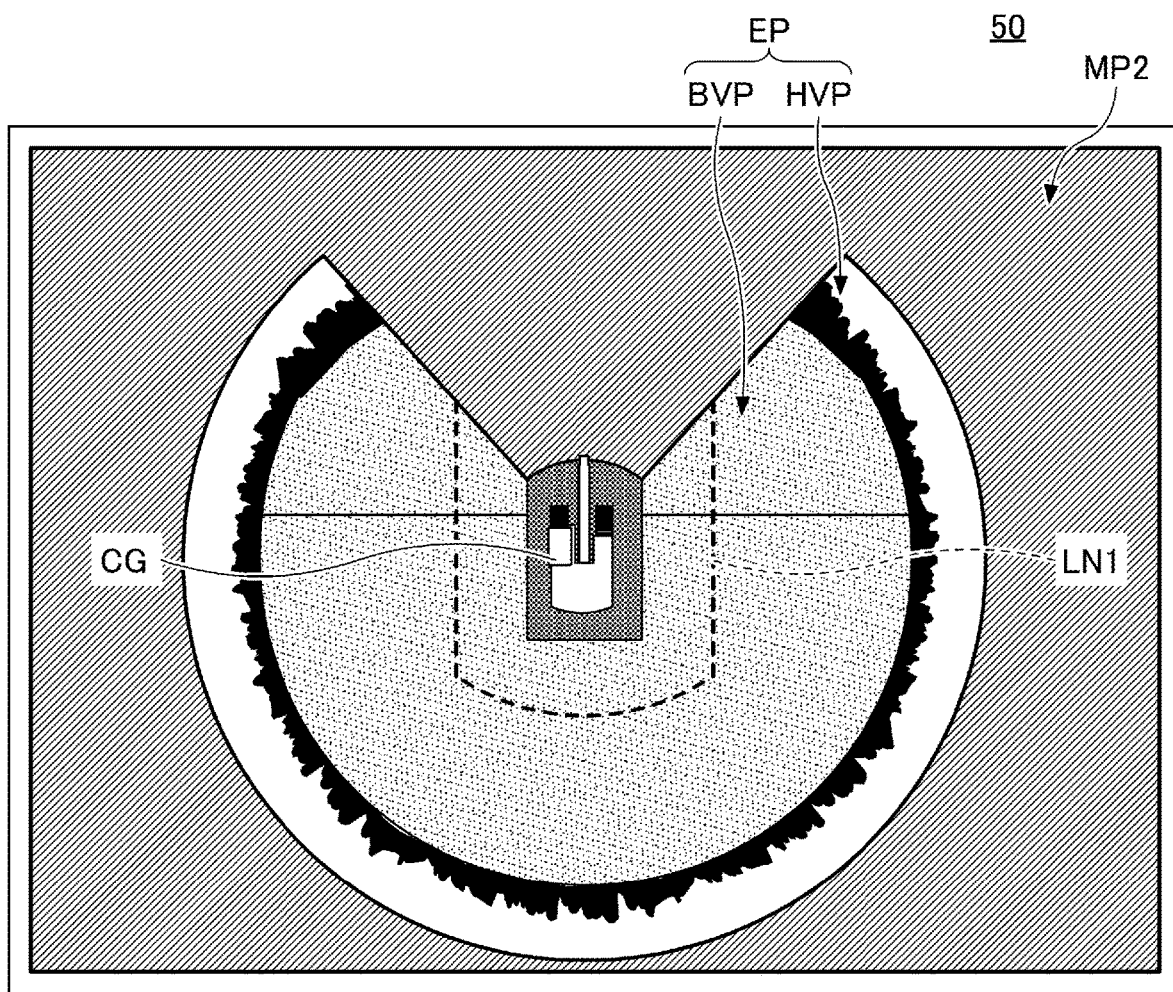
FIG. 7 is a diagram illustrating another example of a monitoring image (an overhead view image) displayed on the display device.

For example, FIG. 6 and FIG. 7 are drawings illustrating specific examples of monitoring images displayed on the display device 50. Specifically, FIG. 6 is a diagram illustrating an example of a monitoring image (a monitoring image MP1 including a through-the-lens image) displayed on the display device 50. FIG. 7 is a diagram illustrating another example of a monitoring image (a monitoring image MP2 including a viewpoint-converted image) displayed on the display device 50.

As illustrated in FIG. 6, in the present example, an image (a through-the-lens image) captured by the camera 40B is displayed on the display device 50 as the monitoring image MP1. This makes it possible for the operator to appropriately grasp the situation (for example, as to whether a monitoring target such as a person is present) in the vicinity of the shovel 100 (in the present example, behind the upper turning body 3).

Further, as illustrated in FIG. 7, the monitoring image MP2 including a shovel image CG and a viewpoint-converted image EP, which is placed along the periphery of the shovel image CG, is displayed on the display device 50. This allows the operator to appropriately ascertain the positional relationship between an object appearing in the viewpoint-converted image EP and the shovel 100.

A line LN1, whose distance from the shovel 100 is fixed, is superimposed and displayed on the viewpoint-converted image EP of the monitoring image MP2. The line LN1 may represent the outer peripheral edge of a monitoring area of a monitoring target by the surroundings monitoring apparatus 150 (detecting part 304). This allows the operator to appropriately ascertain the distance between an object appearing in the viewpoint-converted image EP and the shovel 100.

In the present example, the viewpoint-converted image EP is a combination of an overhead view image BVP looking at the surroundings of the shovel 100 from directly above and a horizontal image HVP looking horizontally at the surroundings of the shovel 100 and placed along the periphery of the overhead view image BVP. The viewpoint-converted image EP is obtained by projecting respective captured images of the cameras 40B, 40L, and 40R onto a space model and re-projecting the projected images projected on the space model onto a different two-dimensional plane. The space model is an object onto which a captured image is projected in a virtual space, and is composed of one or more plane surfaces or curved surfaces that include a plane surface or a curved surface different from a plane surface in which the captured image is positioned.

The display processing part 301 may transmit a monitoring image, generated based on an image captured by the image capturing device 40, to the management apparatus 200 or the terminal apparatus 300 through the communication device 70. Accordingly, the management apparatus 200 can receive the monitoring image from the shovel 100, and cause the output device 230 (such as a remote operation display device) to display the monitoring image. Similarly, the terminal apparatus 300 can receive the monitoring image from the shovel 100, and cause the output device 330 (such as a remote operation display device) to display the monitoring image. Therefore, the operator who uses the management apparatus 200 or the terminal apparatus 300 can remotely operate the shovel 100 while checking the monitoring image displayed on the output device 230 or the output device 330. Further, the administrator or the like, who uses the management apparatus 200 or the terminal apparatus 300 to operate a plurality of shovels 100, can remotely monitor the work situations of respective shovels 100, performing work under automatic operation, while checking the monitoring image displayed on the output device 230 or the output device 330.

Referring back to FIG. 3, the setting part 302 configures various settings related to the surroundings monitoring apparatus 150 in response to a request from the operator or the like, that is, in response to the operator's operation through the input device 52. For example, the setting part 302 configures detection conditions of the detecting part 304, safety function activating conditions of the safety function control part 305, and the like. The settings configured by the setting part 302 are stored (registered) in the storage 303.

The storage 303 stores (registers) various types of information related to the surroundings monitoring apparatus 150.

The detecting part 304 detects a monitoring target in the vicinity of the shovel 100 (upper turning body 3) based on the outputs of the image capturing device 40 and the surrounding information obtaining device 45. The detecting part 304 includes a detecting part 304A and a detecting part 304B.

The detecting part 304A detects a monitoring target in a predetermined monitoring area (hereinafter referred to as a "first monitoring area", for convenience) in the vicinity of the shovel 100 (upper turning body 3) based on the output of the image capturing device 40, that is, based on an image captured by the image capturing device 40. In the following, the detecting part 304 will be described assuming that the shovel 100 is located on a horizontal plane.

The detecting part 304A detects, for example, a monitoring target in the first monitoring area that extends in the horizontal direction viewed from the shovel 100 (hereinafter simply referred to as the "horizontal direction"), that is, in a direction parallel to a plane where the shovel 100 performs work (a plane contacted by the lower traveling body 1) (hereinafter referred to as a "work plane", for convenience). Specifically, the detecting part 304A may detect a monitoring target in the first monitoring area in which a distance D from the shovel 100 (upper turning body 3) in the horizontal direction is within a predetermined distance Dth1 (for example, five meters).

The detecting part 304A, for example, identifies a monitoring target in a captured image by applying a machine learning-based classifier, various types of known image processing techniques, artificial intelligence (AI), and the like. If the identified monitoring target is a person such as a worker, the detecting part 304A may determine whether the identified person is included in a plurality of pre-registered workers (hereinafter referred to as "registered workers").

Further, the detecting part 304A can determine (estimate) the position (the actual position, such as the foot position) of the identified monitoring target (person) appearing in the image captured by the monocular image capturing device 40 by applying various types of known methods.

The detecting part 304A, for example, estimates the position of the identified monitoring target in the horizontal direction viewed from the shovel 100 (hereinafter referred to as a "horizontal position"), based on the size of the identified monitoring target in the captured image (for example, the vertical size of the identified monitoring target in the captured image). This is because the size of the identified monitoring target in the captured image is correlated with the position, that is, the size of the identified monitoring target decreases as the monitoring target moves away from the shovel 100. Specifically, because an assumed size range may be defined for monitoring target (for example, an expected height range of a person), the correlation between the horizontal position of the monitoring target included in the assumed size range viewed from the shovel 100 and the size of the monitoring target in the captured image may be predefined. Therefore, the detecting part 304A can estimate the actual position of the identified monitoring target (the horizontal position from the shovel 100) based on a conversion formula, a conversion map, or the like representing the correlation between the size of the monitoring target in the captured image and the horizontal position viewed from the shovel 100. The conversion formula, the conversion map, or the like is, for example, stored in an internal memory such as the auxiliary storage device of the controller 30 in advance.

Further, for example, on the assumption that the monitoring target is on the same plane as the shovel 100 (specifically, the lower traveling object 1), the detecting part 304A can estimate the actual position (such as the foot position) of the monitoring target by performing projective transformation (a homography), or the like of the captured image onto the plane. In this case, a portion (a point) of the captured image corresponds to a position on the same plane as the shovel 100.

The detecting part 304B detects a monitoring target in a predetermined monitoring area (hereinafter referred to as a "second monitoring area", for convenience) in the vicinity of the shovel 100 (upper turning body 3) based on the output (that is, the received light information) of the surrounding information obtaining device 45. The first monitoring area and the second monitoring area may be hereinafter collectively referred to as a "monitoring area".

The detecting part 304B detects, for example, a monitoring target in the second monitoring area that extends in the horizontal direction, that is, in a direction parallel to the work plane. Specifically, the detecting part 304A may detect a monitoring target in the second monitoring area in which the distance D from the shovel 100 (upper turning body 3) in the horizontal direction is within a predetermined distance Dth2. The predetermined distance Dth1 and the predetermined distance Dth2 may be the same or may be different. That is, the first monitoring area and the second monitoring area may be the same or may be different. For example, the detecting part 304B may monitor a monitoring target in the first monitoring area that includes an area relatively far from the shovel 100, and the detecting part 304B may monitor a monitoring target in the second monitoring area that includes an area relatively close to the shovel 100.

The detecting part 304B identifies the presence and the position of an object in the vicinity of the shovel 100 based on the TOF information included in the received light information, which is output from the surrounding information obtaining device 45. Further, the detecting part 304B may identify the shape of the object, the size of the object, and the like based on the received light information (TOF information) of reflected light received from a plurality of light emission directions. In this manner, the detecting part 304B may identify the type of the object in the vicinity of the shovel 100 and determine whether the object is a monitoring target. Further, the detecting part 304B may obtain the retroreflectivity or the reflectance of the object based on the received light intensity information included in the received light information. In this manner, the detecting part 304B may identify the type of the object in the vicinity of the shovel 100 and determine whether the object is a monitoring target.

Further, functions of the detecting parts 304A and 304B may be switched between ON (enabled) and OFF (disabled) in accordance with a predetermined operation by the operator or the like with respect to the input device 52. In this case, when the functions of one of the detecting parts 304A and 304B are turned OFF (disabled), an operation for turning OFF (disabling) the functions of the other of the detecting parts 304A and 304B may be invalid. That is, only one of the detecting parts 304A and 304B can be switched OFF (disabled).

The detecting part 304 may be configured to output one detection result related to a monitoring target by integrally using the outputs of both the image capturing device 40 and the surrounding information obtaining device 45, instead of outputting two detection results of the detecting parts 304A and 304B related to the monitoring target. Further, the detecting part 304 may be configured to detect a monitoring target based on one of the outputs of the image capturing device 40 and the surrounding information obtaining device 45. Further, some or all of the functions of the detecting part 304A may be provided in the image capturing device 40 (camera 40X). Further, some or all of the functions of the detecting part 304B may be provided in the information obtaining device 45 (sensor 45X). For example, among the functions of the detecting part 304B, the function of detecting an object based on the received light information (the TOF information and the received light intensity information) may be provided in the sensor 45X, and the function of determining whether the object detected by the sensor 45X is a monitoring target may be implemented by the controller 30.

The safety function control part 305 (an example of a notification part) performs control related to the safety function and activates the safety function when a monitoring target is detected by the detecting part 304.

For example, the safety function control part 305 activates the notification function when a monitoring target is detected by the detecting part 304 in a predetermined area (hereinafter referred to as a "notification area") that is included in the monitoring area. The notification area may be the same as the monitoring area, or may be set such that the outer peripheral edge of the notification area is relatively closer to the shovel 100 than that of the monitoring area.

The safety function control part 305 activates the notification function to provide a notification by sound (that is, in an auditory manner) to at least one of the interior and the exterior of the cabin 10 by controlling the sound output device 54. At this time, in accordance with various conditions, the safety function control part 305 may change the pitch, the sound pressure, and the timbre of the output sound, and may change the sound output cycle if the sound is cyclically output.

Further, the safety function control part 305 activates the notification function to provide a notification in a visual manner to the interior of the cabin 10. Specifically, the safety function control part 305 may display an image, indicating that a monitoring target is detected, over a monitoring image displayed on the display device 50 by controlling the display device 50 through the display processing part 301 (see FIG. 20 through FIG. 22, for example). Further, through the processing part 301, the safety function control part 305 may highlight the detected monitoring target appearing in the monitoring image displayed on the display device 50, or may highlight the position of the detected monitoring target in the monitoring image, which corresponds to the position of the monitoring image viewed from the shovel 100. Specifically, through the display processing part 301, the safety function control part 305 may superimpose and display a frame that surrounds the monitoring target appearing in the monitoring image, or may superimpose and display a marker at a position in the monitoring image, which corresponds to the actual position of the detected monitoring target (see FIG. 10, FIG. 21, and FIG. 22, for example). Accordingly, the display device 50 can implement the notification function to provide a notification in a visual manner to the operator. Further, the safety function control part 305 may use a warning lamp, an illumination device, or the like provided inside the cabin 10 to notify the operator within the cabin 10 that the monitoring target is detected.

Further, the safety function control part 305 may activate the notification function to provide a notification in a visual manner to workers around the shovel 100, a supervisor, and the like by controlling an illumination device such as a headlight or an external display device provided on a house part of the upper turning body 3. Further, the safety function control part 305 may activate the notification function to provide a notification in a tactile manner to the operator within the cabin 10 by controlling a vibration generation device configured to vibrate the operator seat on which the operator is seated. Accordingly, the surroundings monitoring apparatus 150 can cause the operator, workers around the shovel 100, a supervisor, and the like to recognize the presence of a monitoring target (for example, a person such as a worker) in the vicinity of the shovel 100. Therefore, the surroundings monitoring apparatus 150 can urge the workers in the monitoring area to evacuate the area while also urging the operator to check the safety in the surroundings of the shovel 100.

Further, for example, the safety function control part 305 may activate the remote notification function by transmitting a command signal, indicating that the notification function is activated, to the management apparatus 200 or the terminal apparatus 300 through the communication device 70. In this case, in response to receiving the command signal from the shovel 100 through the communication device 220, the management apparatus 200 (control device 210) may output an alarm in a visual manner or an alarm in an auditory manner through the output device 230. Accordingly, the administrator of the management apparatus 200, workers, the operator performing the remote operation of the shovel 100 through the management apparatus 200, and the like can recognize that a monitoring target has entered the notification area in the vicinity of the shovel 100. Similarly, in response to receiving the command signal from the shovel 100 through the communication device 320, the terminal apparatus 300 (control device 310) may output an alarm in a visual manner or an alarm in an auditory manner through the output device 330.

Note that the remote notification function of the safety function control part 305 may be transferred to the management apparatus 200 or the terminal apparatus 300. In this case, the management apparatus 200 receives information related to the detection status of a monitoring target, detected by the detecting part 304, from the shovel 100, determines whether the monitoring target has entered the notification area based on the received information, and activates the external notification function in response to determining that the monitoring target has entered the notification area. The same may apply to the terminal apparatus 300.

Further, the safety function control part 305 may change the manner of notification (that is, a notification method) in accordance with the positional relationship between a monitoring target detected in the notification area and the shovel 100.

For example, if a monitoring target, detected in the notification area by the detecting part 304, is located in an area relatively far from the shovel 100, the safety function control part 305 may output an alarm having a relatively low urgency level (hereinafter referred to as an "attention level alarm") to urge the attention of the operator and the like to the monitoring target. The area relatively far from the shovel 100 within the notification area may be hereinafter referred to as an "attention level notification area" for convenience). Conversely, if a monitoring target, detected in the notification area by the detecting part 304, is located in an area relatively close to the shovel 100, the safety function control part 305 may output an alarm having a relatively high degree of urgency (hereinafter referred to as a "caution level alarm") indicating that the monitoring target is approaching the shovel 100 and the risk is increasing. In the following, the area relatively close to the shovel 100 within the notification area may be referred to as a "caution level notification area" for convenience).

In this case, the safety function control part 305 may change the pitch, the sound pressure, the timbre, the sound output cycle, and the like of the sound output from the sound output device 54, between the attention level alarm and the caution level alarm. The safety function control part 305 may change the color, the shape, the size, the presence or absence of blinking, the blinking cycle, and the like of an image displayed on the display device 50, between the attention level alarm and the caution level alarm. Examples of the image displayed on the display device 50 include an image indicating that a monitoring target, appearing in a monitoring image displayed on the display device 50, is detected, and images (such as a frame and a marker) for highlighting a monitoring target and the position of a monitoring target. Accordingly, the surroundings monitoring apparatus 150 can cause the operator or the like to ascertain the degree of urgency, that is, the proximity of the monitoring target to the shovel 100, based on the difference in notification sounds (alarm sounds) output from the sound output device 54, or the difference in notification images displayed on the display device 50.

The safety function control part 305 may stop the notification function when the monitoring target detected by the detecting part 304 is no longer detected in the monitoring area or when a predetermined operation for cancelling the activation of the notification function is received through the input device 52 after the notification function is activated.

Further, the safety function control part 305 activates the operation limiting function when a monitoring target is detected by the detecting part 304 in a predetermined area (hereinafter referred to as an "operation limiting area") included in the monitoring area. The operation limiting area may be the same as the monitoring area, or may be set such that the outer peripheral edge of the operation limiting area is relatively closer to the shovel 100 than that of the monitoring area. The operation limiting area includes at least one of an operation deceleration area and an operation stop area. In the operation deceleration area, the operation speed of the shovel 100 is lower than usual with respect to the operation of the operating device 26, a remote operation, or an operation command corresponding to the automatic operation function. In the operation stop area, the operation of the shovel 100 is stopped and the stopped state of the shovel 100 is maintained, irrespective of the operation of the operating device 26, a remote operation, or an operation command corresponding to the automatic operation function. For example, if the operation limiting area includes both the operation deceleration area and the operation stop area, the operation stop area is an area in close proximity to the shovel 100 within the operation limiting area, and the operation deceleration area is an area that is set outside the operation stop area within the operation limiting area.

The safety function control part 305 activates the operation limiting function to limit the operation of the shovel 100 by controlling the hydraulic control valve 56. In this case, the safety function control part 305 may limit the operations of all of the driven elements (that is, the corresponding hydraulic actuators), or may limit the operations of some of the driven elements (that is, the corresponding hydraulic actuators). Accordingly, the surroundings monitoring apparatus 150 can decelerate or stop the operation of the shovel 100 if a monitoring target is present in the vicinity of the shovel 100. Therefore, the surroundings monitoring apparatus 150 can reduce the occurrence of contact between a monitoring target in the vicinity of the shovel 100 and the shovel 100.

Further, the safety function control part 305 stops the operation limiting function when the monitoring target detected by the detecting part 304 is no longer detected or when a predetermined operation for cancelling the activation of the operation limiting function is received through the input device 52 after the operation limiting function is activated. The predetermined operation for cancelling the activation of the operation limiting function with respect to the input device 52 may be the same as or may be different from the predetermined operation for cancelling the activation of the notification function.

Further, the safety function control part 305 may activate the safety function in response to a predetermined condition other than detection of a monitoring target by the detecting part 304 (hereinafter referred to as the "other activation condition") being satisfied.

For example, when the operator within the cabin 10 does not wear a seat belt, the safety function control part 305 may activate the internal notification function or may activate the operation limiting function to prohibit (stop) the operation of the shovel 100. Accordingly, the operator within the cabin 10 can be encouraged to wear a seat belt. Thus, the safety in the surroundings of the shovel 100 can be improved.

Further, for example, when an openable and closable window of the cabin 10 is open, the safety function control part 305 may activate the internal notification function or may activate the operation limiting function to prohibit (stop) the operation of the shovel 100. If tipping of the shovel 100 occurs while the window of the cabin 10 is open, the operator may be thrown out of the cabin 10. Accordingly, the operator within the cabin 10 can be encouraged to close the window of the cabin 10. Thus, the safety in the surroundings of the shovel 100 can be improved.

[Displayable Area and Monitoring Target Detectable Area in Vicinity of Shovel]

Next, an area (hereinafter referred to as a "displayable area") in the vicinity of the shovel 100 that can be displayed on the display device 50, the output device 230 (display device), or the output device 330 (display device) (hereinafter referred to as the "display device 50 or the like") based on an image captured by the image capturing device 40, and an area (hereinafter referred to as a "detectable area") in the vicinity of the shovel 100, where a monitoring target is detectable by the detecting part 304 based on an image captured by the image capturing device 40, will be described with reference to FIG. 8 through FIG. 11.

In the following description, the shovel 100 is assumed to be located on a horizontal plane. Further, in the present example, the displayable area and the detectable area in the circumferential direction (turning direction) viewed from the shovel 100 (specifically, the upper turning body 3) will be described. That is, in the present example, the displayable area refers to an angle range that is within an angle range of 360 degrees in the horizontal direction viewed from the shovel 100, and is displayable on the display device 50 or the like based on an image captured by the image capturing device 40. Similarly, the detectable area refers to an angle range that is within the angle range of 360 degrees in the horizontal direction viewed from the shovel 100, and in which a monitoring target is detectable by the detecting part 304. Therefore, a displayable area, a detectable area of the detecting part 304A, a detectable area of the detecting part 304B may include areas in the circumferential direction viewed from the shovel 100 (that is, angle ranges in the horizontal direction), and may exclude areas in the radial direction (perspective direction) and in the vertical direction.

<Comparison Between Displayable Area and Detectable Area Based on Image Captured by Image Capturing Device>

Figure 8:
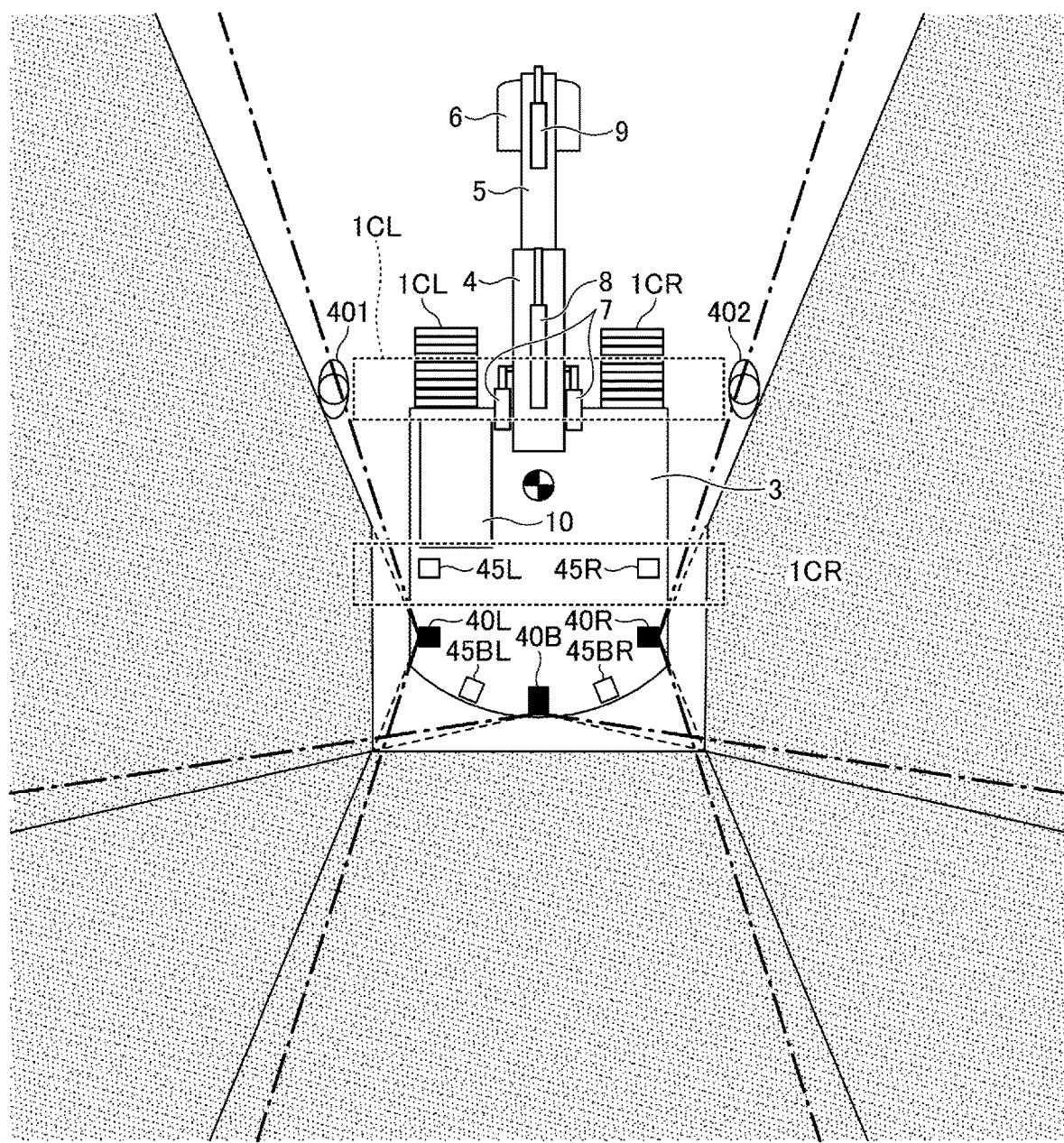
FIG. 8 is a diagram illustrating examples of a displayable area and a detectable area based on an image captured by an image capturing device.

FIG. 8 is a diagram illustrating examples of a displayable area on the display device 50 or the like and a detectable area of the detecting part 304A based on an image captured by the image capturing device 40 when the shovel 100 is viewed from overhead.

As illustrated in FIG. 8, the imaging range (angle of view) in the horizontal direction of the camera 40X is represented by an angle range between each pair of dash-dot lines extending from the camera 40X. Therefore, the displayable area is represented by an area corresponding to the union of the imaging ranges in the horizontal direction of the cameras 40B, 40L, and 40R.

The detectable area of the detecting part 304A based on an image captured by the image capturing device 40 (camera 40X) corresponds to the hatched area in FIG. 8. Specifically, the detectable area of the detecting part 304A is represented by an angle range between a pair of solid lines extending from each of the cameras 40B, 40L, and 40R, except for a range (between each pair of dotted lines) in close proximity of the shovel 100. This is because the top surface of the upper turning body 3, where the camera 40X is provided, is located at a relatively high position above the ground; therefore, the ground in close proximity of the upper turning body 3 may be in a blind spot of the upper turning body 3, thereby causing only a part of a monitoring target located near the ground in close proximity of the upper turning body 3 to appear in a captured image or a part of the upper turning body 3 to appear in the captured image.

The angle range between the pair of solid lines extending from each of the cameras 40B, 40L, and 40R, which corresponds to the detectable area of the detecting part 304A, is smaller than the actual angle of view (angle range between the pair of dash-dot lines) corresponding to the imaging range of each of the cameras 40B, 40L, and 40R. This is because, at the end of the imaging range (angle of view) of each of the cameras 40B, 40L, and 40R in the horizontal direction viewed from the shovel 100 (upper turning body 3), only a part of a monitoring target may appear in a captured image, and thus, the detecting part 304A is unable to identify (detect) the monitoring target from the captured image.

For example, a worker 401 is located at the front left of the upper turning body 3. A part of the worker 401 is included in an angle range between two dash-dot lines corresponding to the imaging range in the horizontal direction of the camera 40L. Therefore, the display device 50 or the like can display a monitoring image that includes the part of the worker 401 based on an image captured by the camera 40L, as controlled by the controller 30 (display processing part 301).

As described above, the worker 401 is located at the front end of the imaging range in the horizontal direction of the camera 40L. Therefore, the position of the worker 401 is not included in the detectable area of the detecting part 304A. Thus, the detecting part 304A is unable to detect the worker 401 although the part of the worker 401 appears in the image captured by the camera 40L.

Similarly, a worker 402 is located at the front right of the upper turning body 3. A part of the worker 402 is included in an angle range between two dash-dot lines corresponding to the imaging range in the horizontal direction of the camera 40R. Therefore, the display device 50 or the like can display a monitoring image that includes the part of the worker 402 based on an image captured by the camera 40R, as controlled by the controller 30 (display processing part 301).

As described above, the worker 402 is located at the front end of the imaging range in the horizontal direction of the camera 40R. Therefore, the position of the worker 402 is not included in the detectable area of the detecting part 304A. Thus, the detecting part 304A is unable to detect the worker 402 although the part of the worker appears in the image captured by the camera 40R.

As described, the detecting part 304A may be unable to detect a monitoring target located at the end of the angle of view of each of the cameras 40L and 40R, although the monitoring target is included in the displayable area. Therefore, if the image capturing device 40 (camera 40X) is used alone to detect a monitoring target in the vicinity of the shovel 100, there may be a possibility that the monitoring target is not detected by the image capturing device 40 (camera 40X), although the monitoring target appears on the display device 50 or the like, thereby causing the operator of the shovel 100, the administrator, and the like to feel discomfort.

<First Example of Monitoring Target Detectable Areas>

Figure 9:
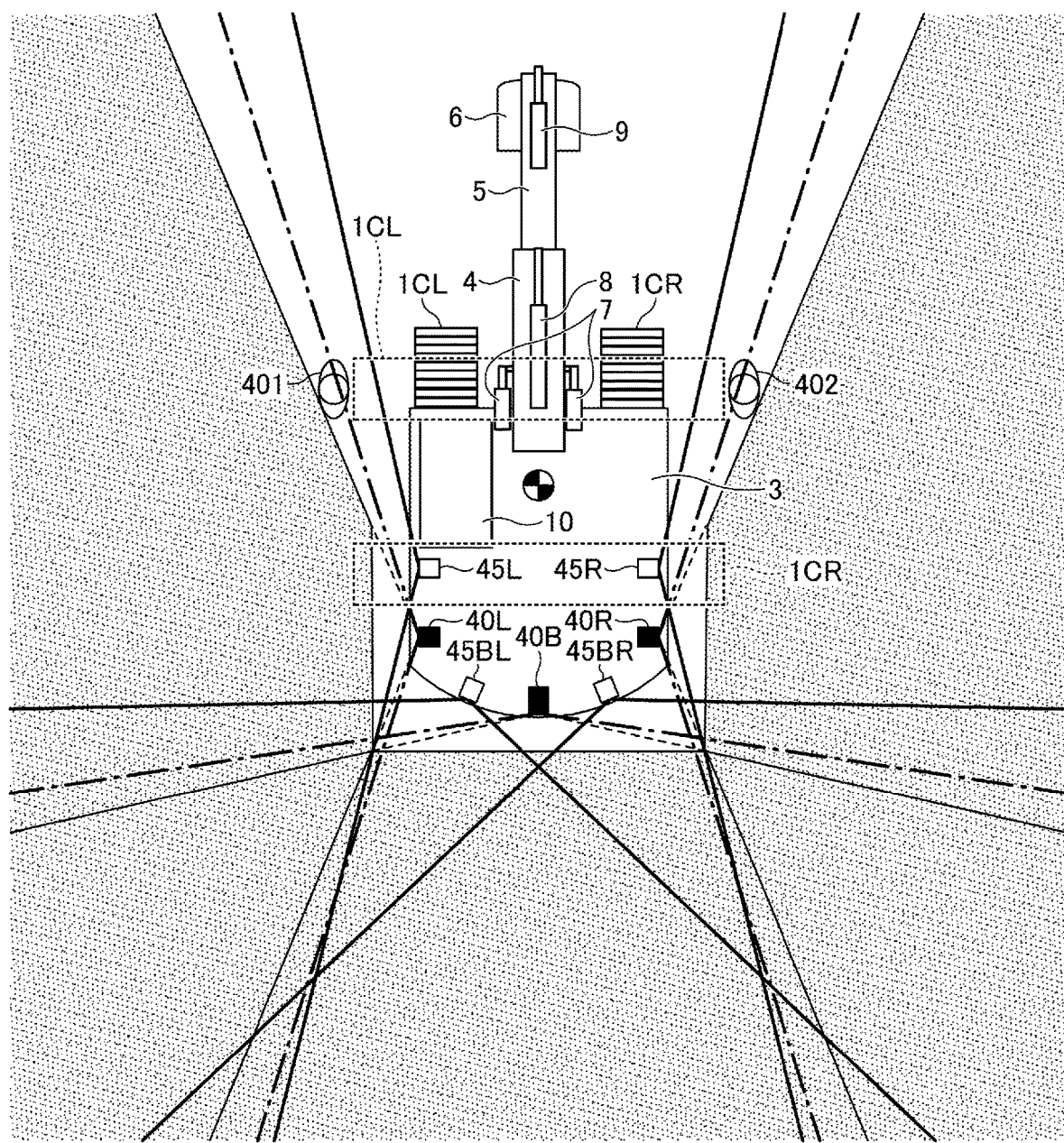
FIG. 9 is a diagram illustrating first examples of detectable areas of detecting parts.

FIG. 9 is first examples of a detectable area of the detecting part 304A that uses the image capturing device 40 and a detectable area of the detecting part 304B that uses the surrounding information obtaining device 45 when the shovel 100 is viewed from overhead.

As illustrated in FIG. 9, the detectable area of the detecting part 304A correspond to the hatched area in FIG. 9 as described above. Therefore, within the displayable area defined by an angle range between each pair of dash-dot lines extending from the camera 40X, the front end of the angle of view of each of the cameras 40L and 40R is outside the detectable area of the detecting part 304A.

The detectable area of the detecting part 304B is defined by an angle range (that is, a detection angle range in the horizontal direction) between each pair of thick lines extending from the sensor 45X. Specifically, the detectable area of the detecting part 304B is represented by an area corresponding to the union of detection angle ranges in the horizontal direction of the sensors 45BL, 45BR, 45L, and 45R. The detection angle ranges in the horizontal direction between the respective pairs of thick lines correspond to light emission ranges of infrared light in the horizontal direction of lidar.

The detection angle range in the horizontal direction of the sensor 45L includes the front end of the angle of view of the camera 40L within the displayable area, which includes the position (that is, an occupied area) of the worker 401. Further, the detection angle range in the horizontal direction of the sensor 45R includes the front end of the angle of view of the camera 40R within the displayable area, which includes the position (that is, an occupied area) of the worker 402. That is, the detectable area of the detecting part 304B includes substantially the entire detectable area of the detecting part 304A. Accordingly, the detecting part 304B can detect a monitoring target located outside the detectable area of the detecting part 304A and within the displayable area, that is, located at the front left or the front right of the upper turning body 3. Therefore, the detecting part 304B can detect a monitoring target (such as the worker 401 or the worker 402) partially included in the front end of displayable area of each of the cameras 40L and 40R, that is, partially included in the left end or the right end of an image captured by each of the cameras 40L and 40R.

Figure 10:
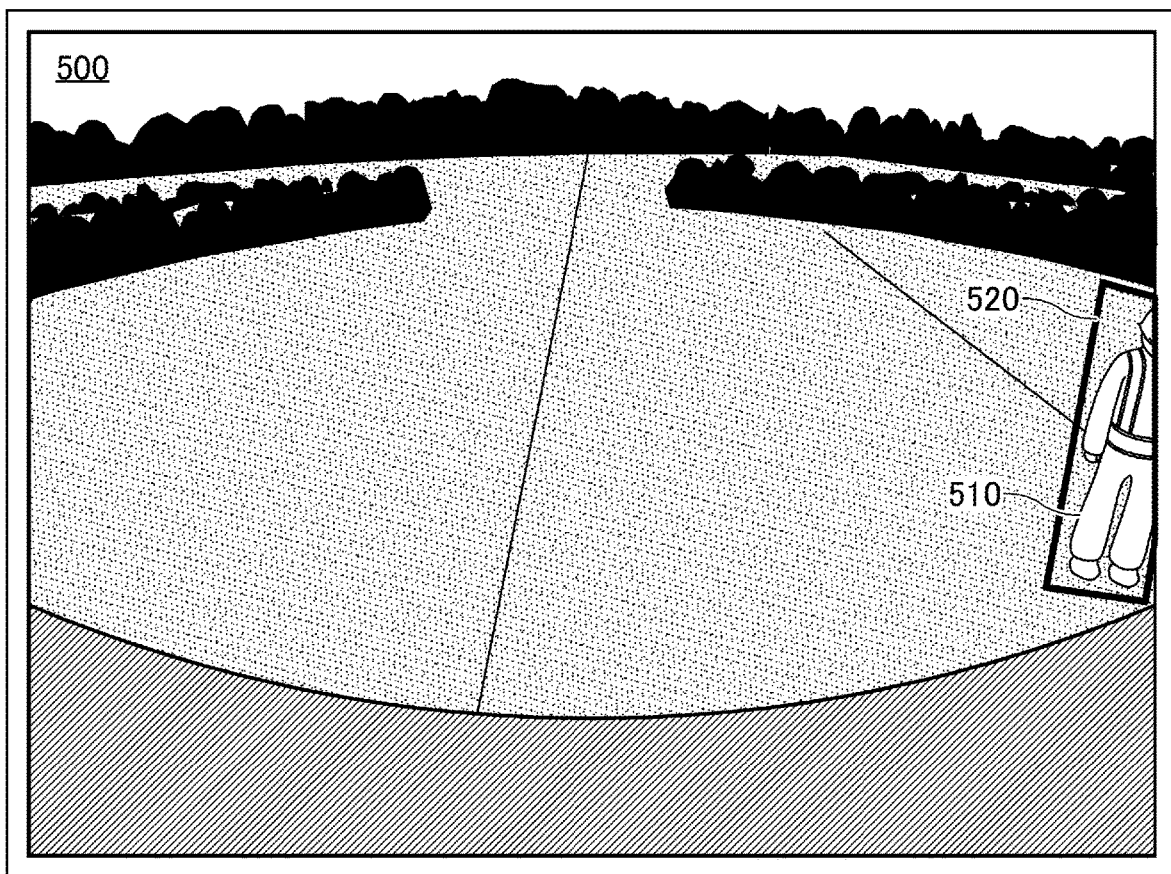
FIG. 10 is a diagram illustrating a specific example of a monitoring image displayed on the display device when a monitoring target is detected by a detecting part.

For example, FIG. 10 is a diagram illustrating a specific example of a monitoring image (monitoring image 500) displayed when a monitoring target is detected by the detecting part 304. Specifically, FIG. 10 depicts an image (a through-the-lens image) captured by the camera 40L in the situation illustrated in FIG. 9 and displayed on the display device 50 as the monitoring image 500.

Note that, instead of or in addition to the display device 50 of the shovel 100, the monitoring image 500 may be displayed on the output device 230 (display device) of the management apparatus 200 and the output device 330 (display device) of the terminal apparatus 300. Accordingly, the operator of the shovel 100 can perform a remote operation of the shovel 100 while checking the monitoring image 500. Further, the administrator or the like of a plurality of shovels 100 can remotely monitor the work situations of the respective shovels 100, performing work under automatic operation.

As illustrated in FIG. 9, the front end of the displayable area of the camera 40L includes a part of an area in which the worker 401 is located. Therefore, as illustrated in FIG. 10, a part of a worker 510 corresponding to the worker 401 is displayed (appears) at the right end of the monitoring image 500 (image captured by the camera 40L). The right end of the monitoring image 500 corresponds to the front end of the displayable area of the camera 40L.

Further, as described above, the detecting part 304 (detecting part 304B) can detect the worker 401 (worker 510) located at the front end of the displayable area of the camera 40L and partially appearing in the captured image (through-the-lens image). Therefore, a frame 520, indicating that the worker 510 is detected by the detecting part 304 (detecting part 304B), is displayed on the monitoring image 500. Accordingly, even when the monitoring target (worker 510) partially appears in the captured image, a user such as the operator of the shovel 100 or the administrator can ascertain that the monitoring target (worker 510) is detected by the detecting part 304 (detecting part 304B).

Similarly, in the case of the monitoring image MP2 (see FIG. 7) displayed on the display device 50 or the like, the detecting part 304B can detect the workers 401 and 402 even when the workers 401 and 402 partially appear at the front left end and the front right end of the viewpoint-converted image EP when viewed from the shovel image CG. Therefore, frames indicating that the workers 401 and 402, which appear in the viewpoint-converted image EP of the monitoring image MP2, are detected by the detecting part 304 may be displayed so as to surround the workers 401 and 402. Accordingly, similar to the monitoring image 500, even when the monitoring targets partially appear in the viewpoint-converted image EP (monitoring image MP2), a user such as the operator of the shovel 100 or the administrator can ascertain that the monitoring targets are detected by the detecting part 304.

Figure 20:
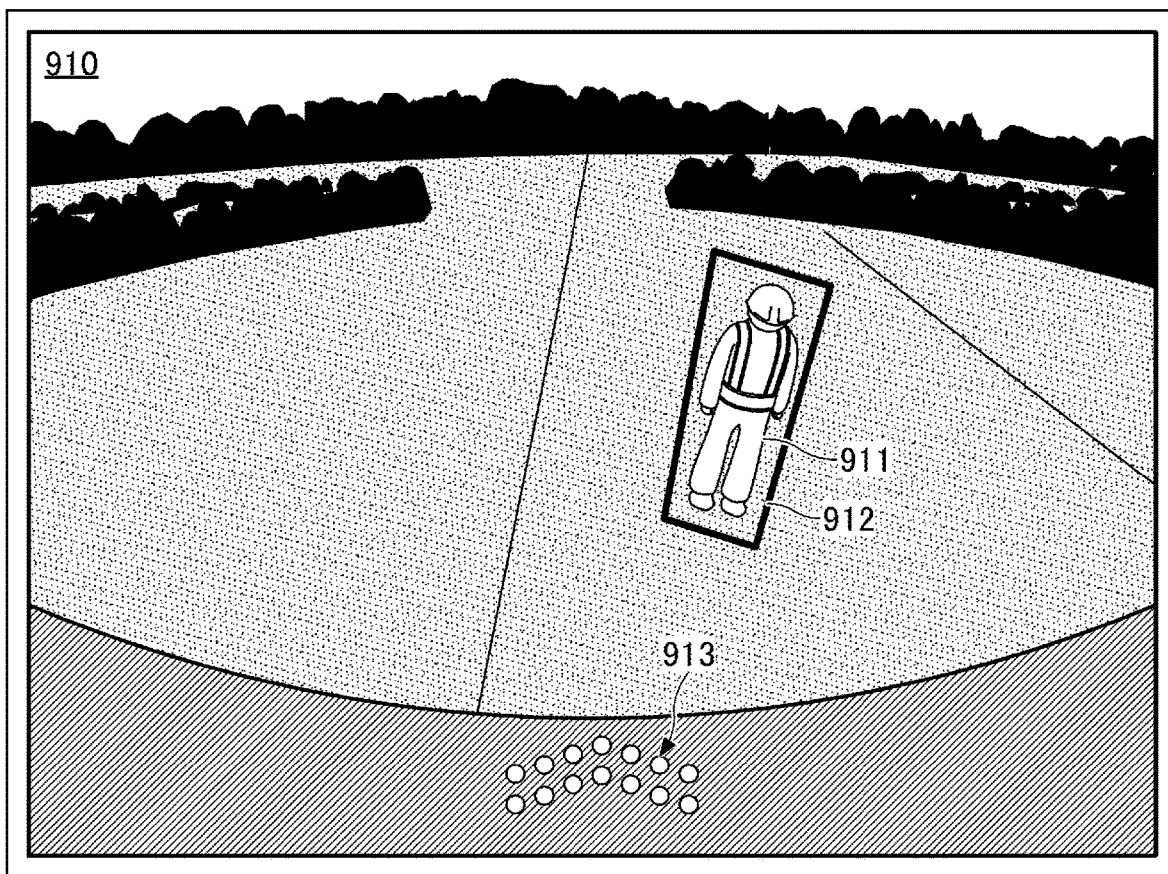
FIG. 20 is a diagram illustrating a specific example of a monitoring image when a monitoring target is detected by the detecting part.
Figure 22:
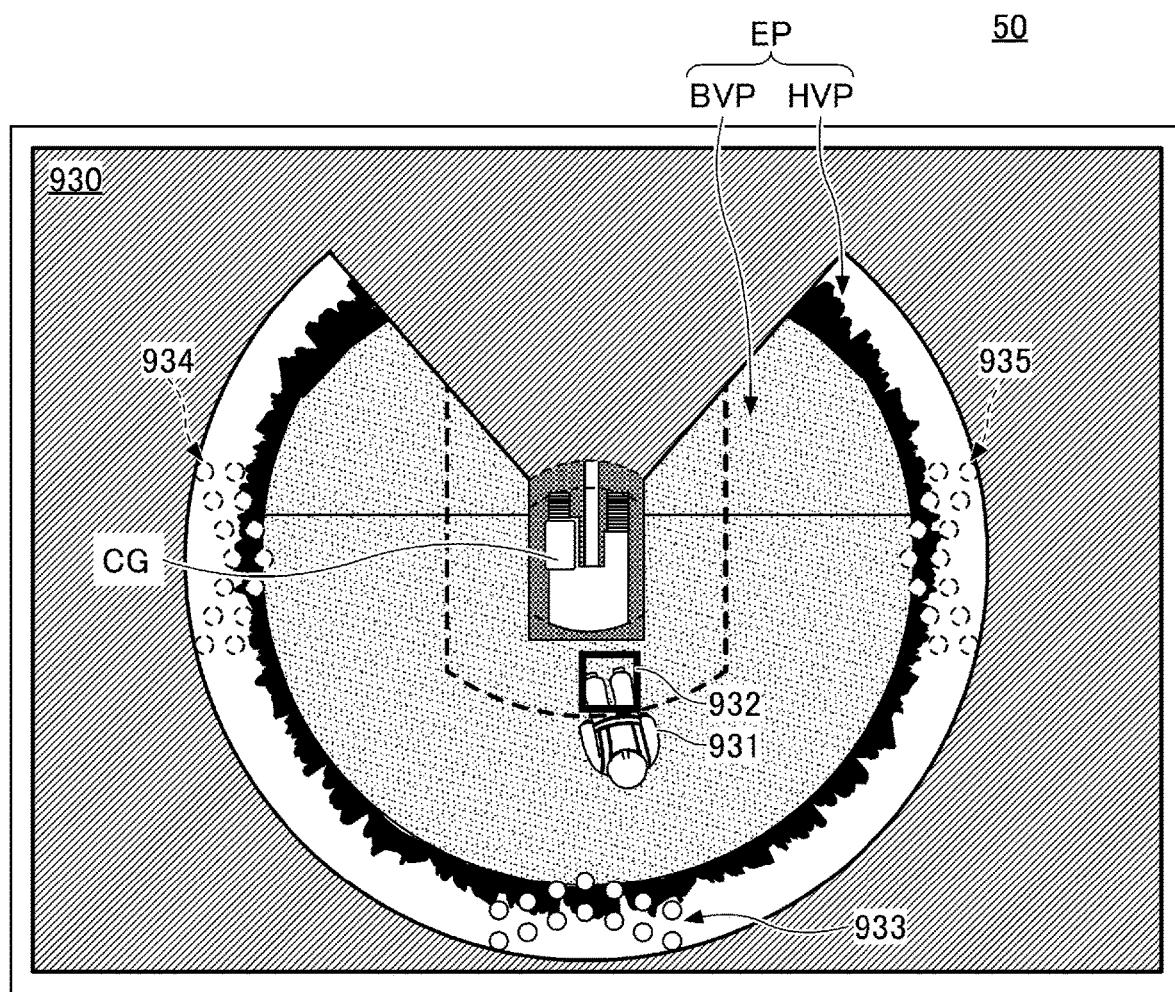
FIG. 22 is a diagram illustrating a specific example of a monitoring image when a monitoring target is detected by the detecting part.

Note that an image indicating that a monitoring target, which partially appears in a monitoring image (a peripheral image such as a through-the-lens image or a viewpoint-converted image EP), is detected may be an image that is different from a frame (such as the frame 520). For example, an image indicating that a monitoring target, which partially appears in a monitoring image (a peripheral image), is detected may be an instruction image (such as an instruction image 913, an instruction image 934, or an instruction image 935) as illustrated in FIG. 20 and FIG. 22, which will be described later.

As described above, in the present example, the detecting part 304 can use the surrounding information obtaining device 45 (sensor 45X) to complement an area, where a monitoring target is difficult to be detected simply by using an image captured by the image capturing device 40, and detect the monitoring target in that area. Therefore, the detecting part 304 can detect a monitoring target, who appears in a monitoring image displayed on the display device 50, in the entire area in the circumferential direction viewed from the shovel 100, that is, in the entire area relatively close to the shovel 100. In other words, the detecting part 304B can detect any monitoring target included in the imaging ranges of the cameras 40B, 40L, and 40R in the circumferential direction viewed from the shovel 100, that is, any monitoring target appearing in the monitoring image displayed on the display device 50. For example, even when a monitoring target partially appears at the left or right end of an image captured by the image capturing device 40, the detecting part 304B can detect the monitoring target. Accordingly, a situation where a user may feel discomfort due to the difference between an image (in which a monitoring target appears) displayed on the display device 50 and a detection result (indicating the monitoring target is not detected), can be avoided.

Referring back to FIG. 9, the shovel 100 may perform work in a state in which the moving direction (the extending direction) of the lower traveling body 1 coincides with the orientation of the upper turning body 3. In this case, as illustrated in FIG. 9, even if the workers 401 and 402 are located at the front left and front right positions relatively close to the upper turning body 3, the risk of the shovel 100 contacting the workers 401 and 402 and is not very high. This is because the shovel 100 only travels in the longitudinal direction of the upper turning body 3, and even if the lower traveling body 1 travels, it is considered that the shovel 100 is unlikely to contact the workers 401 and 402 located at the front left and the front right of the upper turning body 3. Further, the front end of the upper turning body 3 is relatively close to the turning center of the upper turning body 3. Therefore, it is considered that, even if the upper turning body 3 is turned, the distance between the front end portion of the upper turning body 3 and the workers 401 and 402 is unlikely to decrease.

The shovel 100 may relatively frequently perform work while the upper turning body 3 is turning. For example, the shovel 100 may perform work in a state in which the turning angle of the upper turning body 3 with respect to the moving direction (extending direction) of the lower traveling body 1 is relatively large (for example, the turning angle is approximately 90 degrees, as in the case of the crawlers 1CL and 1CR indicated by dotted lines in FIG. 9). In this case, as illustrated in FIG. 9, the workers 401 and 402 located relatively close to the front left and the front right of the upper turning body 3 may face the front-side crawler 1C (the crawler 1CL, in this example) as viewed from the upper turning body 3. Therefore, if the lower traveling body 1 travels, the lower traveling body 1 would be highly likely to contact the worker 401 or the worker 402. Further, areas facing the front-side crawler 1CL as viewed from the upper turning body 3 would tend to be in a blind spot when viewed from the cabin 10, and the areas would be thus invisible from the operator in the cabin 10.

In view of the above, in the present example, at least a part of each of the workers 401 and 402 facing the crawler 1CL is included in the displayable area as illustrated in FIG. 9. Specifically, a part of the worker 401 facing the crawler 1CL is included in the front end of the imaging range in the horizontal direction of the camera 40L. In addition, a part of the worker 402 facing the crawler 1CL is included in the front end of the imaging range in the horizontal direction of the camera 40R. Accordingly, even if the workers 401 and 402 facing the crawler 1CL are in blind spots when viewed from the cabin 10, the operator in the cabin 10 can recognize the presence of the workers 401 and 402 by viewing a monitoring image displayed on the display device 50. Further, the remote operator, the administrator, or the like who uses the management apparatus 200 or the terminal apparatus 300 to operate the shovel 100 can recognize the presence of the workers 401 and 402 by viewing a monitoring image displayed on the output device 230 or the output device 330. Thus, the safety in the surroundings of the shovel 100 can be improved.

Further, there may be a case where the workers 401 and 402 facing the front-side crawler 1C (crawler 1CL) as viewed from the upper turning body 3 partially appear at the left end and the right end of images captured by the cameras 40L and 40R, and the images, in which the workers 401 and 402 partially appear, may be displayed on the display device 50 or the like as a monitoring image. In this case, as described above, the detecting part 304A is unable to identify (detect) the workers 401 and 402, as monitoring targets, partially appearing in the images captured by the cameras 40L and 40R.

Conversely, in the present example, as illustrated in FIG. 9, the detectable area of the detecting part 304B is defined by the light emission range of infrared light in the horizontal direction of each of the sensors 45BL, 45BR, 45L, and 45R (that is, defined by the angle range between each pair of thick lines in FIG. 9). Therefore, unlike image recognition, even if reflected light can be received from a part of a monitoring target, the monitoring target can be identified (detected) by identifying the shape of the monitoring target, the size of the monitoring target, the intensity of the reflected light received, and the like based on the received light information as described above.

Specifically, the detectable area of the detecting part 304B corresponding to the sensor 45L can include the worker 401, located at the left end of the front-side crawler 1C (crawler 1CL) as viewed from the upper turning body 3 and also located in the moving direction to the left, in a state in which the turning angle of the upper turning body 3 with respect to the moving direction (extending direction) of the lower traveling body 1 is approximately 90 degrees. Further, the detectable area of the detecting part 304B corresponding to the sensor 45R can include the worker 402, located at the right end of the front-side crawler 1CL as viewed from the upper turning body 3 and also located in the moving direction of to the right, in a state in which the turning angle of the upper turning body 3 with respect to the moving direction (extending direction) of the lower traveling body 1 is approximately 90 degrees.

For example, if the lower traveling body 1 starts to travel in a state in which the turning angle of the upper turning body 3 with respect to the moving direction of the lower traveling body 1 is approximately 90 degrees, the lower traveling body 1 would contact the worker 401 or the worker 402. Further, in this state, it would be difficult for the operator in the cabin 10 to visually recognize the workers 401 and 402.

Conversely, in the present example, as described above, the detecting part 304B can detect a monitoring target in areas located in the moving direction of the front-side crawler 1C as viewed from the upper turning body 3, in a state in which the turning angle of the upper turning body 3 with respect to the moving direction of the lower traveling body 1 is approximately 90 degrees. Therefore, the surroundings monitoring apparatus 150 can activate the safety function such as the notification function or the operation limiting function, in response to the detection of the worker 401 or the worker 402. Thus, the safety in the surroundings of the shovel 100 can be further improved.

In this manner, in the present example, in a state in which the moving direction of the lower traveling body 1 does not coincide with the orientation of the upper turning body 3, areas located in the moving direction of the front-side crawler 1C as viewed from the upper turning body 3 is included in the displayable area, which is displayable on the display device 50 or the like as a monitoring image. In addition, in the present example, in a state in which the moving direction of the lower traveling body 1 does not coincide with the orientation of the upper turning body 3, areas located in the moving direction of the front-side crawler 1C as viewed from the upper turning body 3 is included in the detectable area where a monitoring target is detectable by the detecting part 304.

For example, if the camera 40X and the sensor 45X can be mounted on the lower traveling body 1, it would be relatively easy to detect a monitoring target located at a specific position viewed from the lower traveling body 1 (the crawlers 1C) and display an image of the monitoring target on the display device 50 or the like, regardless of the turning state of the upper turning body 3.

However, considering the work environment of the shovel 100, the operating conditions of the operator, and the like, mounting the camera 40X, the sensor 45X, and the like on the lower traveling body 1 is impractical. This is because there would be a possibility that soil may be deposited on the camera 40X, the sensor 45X, and the like, and thus the camera 40X, the sensor 45X, and the like may become unable to properly function or may be damaged by contacting the ground. Further, the operator often performs work using the attachment of the upper turning body 3, and thus, information related to the position of a monitoring target relative to the upper turning body 3 is necessary for the operator. For the above reasons, it is necessary to mount the camera 40X, the sensor 45X, and the like on the upper turning body 3. However, when the moving direction of the lower traveling body 1 does not coincide with the orientation of the upper turning body 3, there would be a possibility that the camera 40X, the sensor 45X, and the like would not be able to properly obtain information related to the positional relationship between a surrounding object and the upper turning body 3 during the travel of the lower traveling body 1.

Specifically, in a case where the lower traveling body 1 moves forward while the moving direction of the lower traveling body 1 coincides with the orientation of the upper turning body 3, the operator in the cabin 10 can visually determine whether a worker in front of the crawlers 1C is located. Further, in a case where a remote operation or remote monitoring is performed, an image captured by the front camera for remote operation is displayed on the remote operation display device. Therefore, a worker located in front of the crawlers 1C can be checked from the displayed image. Further, in a case where the lower traveling body 1 moves rearward while the moving direction of the lower traveling body 1 coincides with the orientation of the upper turning body 3, the operator of the shovel 100, the administrator, or the like can check whether a worker is behind the crawlers 1C by viewing an image captured by the camera 40B and displayed on the display device 50 or the like.

Conversely, in a state in which the moving direction of the lower traveling body 1 does not coincide with the orientation of the upper turning body 3, there would be a possibility that information relating to areas facing the lower traveling body 1 (crawlers 1C) would not be properly obtained, depending on the number or the arrangement of cameras 40X or sensors 45X. For example, relatively large areas on the left side and the right side mainly behind the upper turning body 3 become blind spots for the operator in the cabin 10. Therefore, a relatively large number of cameras 40X and sensors 45X may be placed in these areas. Conversely, because the operator, administrator, and the like can check the front side of the upper turning body 3 directly or by viewing an image captured by a front camera, a relatively small number of cameras 40X and sensors 45X may be placed in an area covering the front right to the front left of the upper turning body 3. For this reason, in a state in which the moving direction of the lower traveling body 1 does not coincide with the orientation of the upper turning body 3, there would be a possibility that such cameras 40X and sensors 45X would not be able to properly obtain information relating to areas facing the crawler 1C on the front left and front right of the upper turning body 3.

In view of the above, in the present example, the displayable area, which is displayable on the display device 50 or the like as a monitoring image, can include areas located in the moving direction of the front-side crawler 1C as viewed from the upper turning body 3 in a state in which the moving direction of the lower traveling body 1 does not coincide with the orientation of the upper turning body 3. In addition, the detectable area where a monitoring target is detectable by the detecting part 304 can include areas located in the moving direction of the front-side crawler 1C as viewed from the upper turning body 3 in a state in which the moving direction of the lower traveling body 1 does not coincide with the orientation of the upper turning body 3. Thus, the safety in the surroundings of the shovel 100 during the travel of the lower traveling body 1 can be improved.

Note that one of the displayable area and the detectable area may include areas located in the moving direction of the front-side crawler 1C as viewed from the upper turning body 3. Further, any number of sensors 45X may be mounted as long as the entire displayable area surrounding the shovel 100 in the circumferential direction can be included in the detectable area of the detecting part 304B in the circumferential direction viewed from the shovel 100. The same applies to the arrangement of sensors 45X. Further, instead of redundantly outputting two detection results of the detecting parts 304A and 304B related to a monitoring target, the detecting part 304 may output one detection result related to the monitoring target by integrally using the outputs of both the image capturing device 40 and the surrounding information obtaining device 45. The same effects and advantages can be obtained in this case as well. The same applies to the second example described below.

<Second Example of Monitoring Target Detectable Areas>

Figure 11:
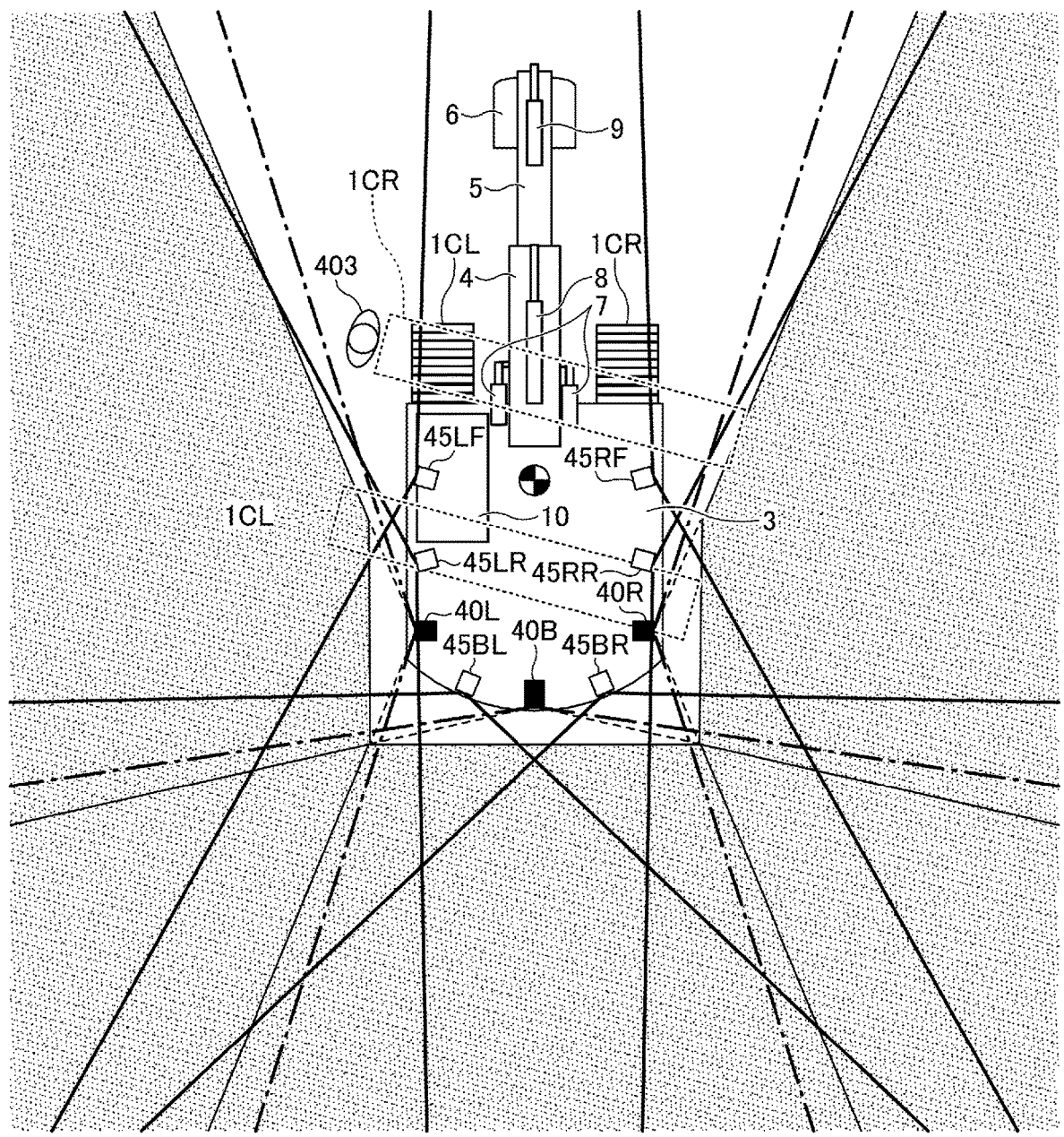
FIG. 11 is a diagram illustrating second examples of detectable areas of the detecting parts.

FIG. 11 is a diagram illustrating second examples of a detectable area of the detecting part 304A that uses the image capturing device 40 and a detectable area of the detecting part 304B that uses the surrounding information obtaining device 45 when the shovel 100 is viewed from overhead.

As illustrated in FIG. 11, the second example differs from the first example in that sensors 45LF and 45LR are provided instead of the sensor 45L, and sensors 45RF and 45RR are provided instead of the sensor 45R on the top surface of the upper turning body 3. That is, in the second example, the surrounding information obtaining device 45 includes the sensors 45BL, 45BR, 45LF, 45LR, 45RF, and 45RR. In the second example, differences from the first example will be mainly described, and no description will be provided for the same or corresponding parts. Further, in the second example, the sensors 45BL, 45BR, 45LF, 45LR, 45RF, and 45RR may be collectively referred to as "sensor(s) 45X".

For example, the shovel 100 may perform work when the upper turning body 3 is turned relatively large such that the turning angle with respect to the moving direction of the crawlers 1C (the longitudinal direction of the crawlers 1C) is smaller than 90 degrees (as in the case of the crawlers 1CL and 1CR indicated by dotted lines in FIG. 11). Specifically, in the present example, the upper turning body 3 of the shovel 100 is turned 75 degrees to the right with respect to the moving direction of the crawlers 1C.

In the above state, a worker 403 is located at the front end in the moving direction of the front-side crawler 1C (the crawler 1CR, in this example) as viewed from the upper turning body 3. In this case, the worker 403 is located off the front of the cabin 10. Thus, the operator in the cabin 10 would be difficult to visually recognize the worker 403. Similarly, the operator, the administrator, or the like, located remotely from the shovel 100 would also be difficult to identify the worker 403 based on an image captured by the front camera for remote operation and displayed on the output device 230 (display device) of the management apparatus 200 and the output device 330 (display device) of the terminal apparatus 300. Further, an area facing the front end in the moving direction of the crawler 1CR is far from the detectable area (hatched area) of the detecting part 304A and is not included in the imaging range (the angle range between two dash-dot lines in FIG. 11) of the camera 40L.

In view of the above, In the present example, two sensors 45X (the sensors 45LF and 45LR) that capture images to the left of the upper turning body 3 are provided. Specifically, the sensor 45LF is provided at the front left end of the top surface of the upper turning body 3 such that the optical axis points slightly towards the front left. Further, the sensor 45LR is provided at the rear left end of the top surface of the upper turning body 3 such that the optical axis points slightly towards the rear left. Accordingly, the sensor 45LR can be used to include an area on the left side from the front left to the rear left of the upper turning body 3 in a light emission range of infrared light. In addition, the sensor 45LF can be used to include, in a light emission range, an area located in the moving direction of the crawler 1CR and facing the front end of the crawler 1CR. Therefore, the detecting part 304B can detect the worker 403 located at the front end in the moving direction of the crawler 1CR in a state in which the upper turning body 3 is turned relatively large such that the turning angle of the upper turning body 3 with respect to the moving direction of the crawlers 1C is smaller than 90 degrees.

Further, in the present example, the two sensors 45RF and 45RR (sensors 45X) that capture images to the right of the upper turning body 3 are provided. Specifically, the sensor 45RF is provided at the front right end of the top surface of the upper turning body 3 such that the optical axis points slightly towards the front right. Further, the sensor 45RR is provided at the rear right end of the top surface of the upper turning body 3 such that the optical axis points slightly towards the rear right. Therefore, in contrast to the case of FIG. 11 (in which the left ends in the longitudinal direction of the crawlers 1C are directed upward), in a state in which the right ends in the longitudinal direction of the crawlers 1C are directed upward, the sensor 45RR can be used to include an area on the right side from the front right to the rear right of the upper turning body 3 in a light emission range of infrared light. In addition, the sensor 45RF can be used to include, in a light emission range, an area located in the moving direction of the crawler 1CR and facing the rear end of the crawler 1CR. Therefore, in the above state, the detecting part 304B can detect a worker located in the moving direction of the crawler 1CR and facing the rear end of the crawler 1CR.

As described above, in the present example, areas located in the moving direction of the crawlers 1C, in a state in which the upper turning body 3 is turned relatively large with respect to the moving direction of the crawlers 1C, are included in the detectable area where a monitoring target is detectable by the detecting part 304. Specifically, by appropriately devising the number and the arrangement of the sensors 45X, it is possible for the detecting part 304B to detect a monitoring target (for example, the worker 403) located in the moving direction of the front-side crawler 1C as viewed from the upper turning body 3, in a state in which the upper turning body 3 is turned relatively large such that the turning angle with respect to the moving direction of the crawlers 1C is smaller than 90 degrees. Thus, the safety in the surroundings of the shovel 100 can be further improved.

Instead of or in addition to causing areas located in the moving direction of the crawlers 1C, in a state in which the upper turning body 3 is turned relatively large with respect to the moving direction of the crawlers 1C, to be included in the detectable area of the detecting part 304, the areas may be included in the displayable area, which is displayable on the display device 50 or the like as a monitoring image. Specifically, by appropriately devising the number and the arrangement of cameras 40X, the areas can be included in the displayable area. Accordingly, the operator or the like can grasp the situation of the area in the moving direction of the crawlers 1C by viewing a monitoring image displayed on the display device 50 or the like.

[Method for Detecting Monitoring Target]

Next, a specific example of a method for detecting a monitoring target by the detecting part 304 will be described with reference to FIG. 12 through FIG. 15.

<Specific Example of Method for Detecting Monitoring Target>

Figure 12:
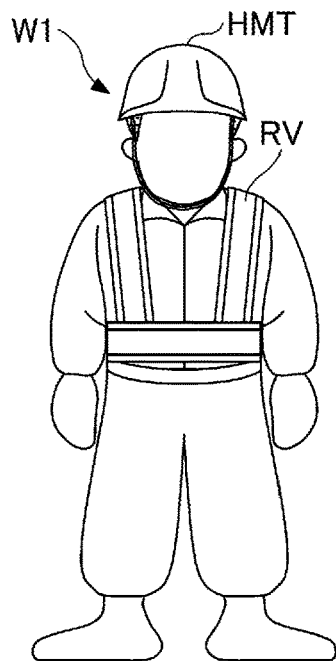
FIG. 12 is a diagram illustrating a first example of a worker at a worksite.
Figure 13:
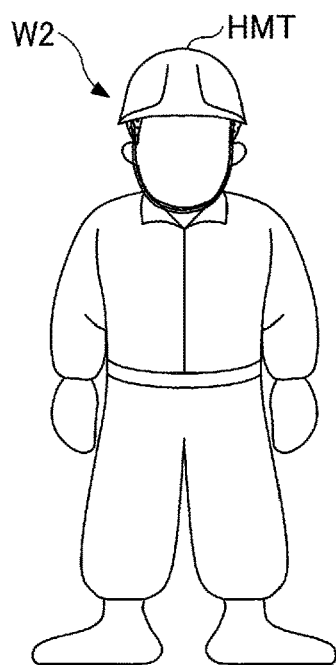
FIG. 13 is a diagram illustrating a second example of a worker at the worksite.
Figure 14:
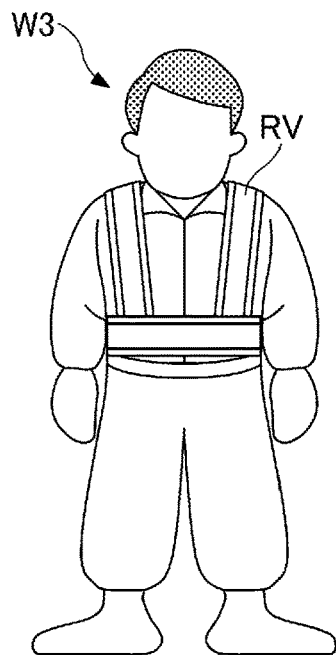
FIG. 14 is a diagram illustrating a third example of a worker at the worksite.
Figure 15:
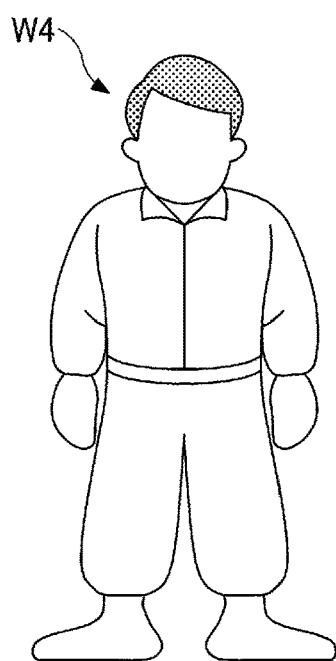
FIG. 15 is a diagram illustrating a fourth example of a worker at the worksite.

FIG. 12 through FIG. 15 are diagram illustrating persons (monitoring targets) at a worksite, that is, specific examples of workers. Specifically, FIG. 12 is a diagram illustrating a first example of a worker (worker W1). FIG. 13 is a diagram illustrating a second example of a worker (worker W2). FIG. 14 is a diagram illustrating a third example of a worker (worker W3). FIG. 15 is a diagram illustrating a fourth example of a worker (worker W4).

As illustrated in FIG. 12, the worker W1 (an example of a first person) wears a helmet HMT and a vest RV with a reflective material (hereinafter referred to as a "reflective vest RV") (an example of clothing with a reflective material). The reflective material is a member having very high retroreflectivity (the ability to reflect light back to a light source).

As illustrated in FIG. 13, the worker W2 (an example of a second person) wears a helmet HMT, but does not wear a reflective vest RV.

As illustrated in FIG. 14, the worker W3 (an example of the second person) wears a reflective vest RV, but does not wear a helmet HMT.

As illustrated in FIG. 15, the worker W4 (an example of a third person) wears neither a helmet HMT nor a reflective vest RV.

When the detecting part 304A (an example of a first detecting part) detects a person (worker), which is a monitoring target, the detecting part 304A attempts to identify both the person (worker) and a helmet from an image captured by the image capturing device 40. Thus, even if it is difficult to identify the person with certainty exceeding a predetermined level depending on the direction, the posture, or the like of the person, the detecting part 304A can identify the person if the helmet can be identified with certainty exceeding exceeds the predetermined level. That is, among the workers W1 through W4, the detecting part 304A can detect the workers W1 and W2 who wear the helmets HMT with a relatively higher probability than the other workers W3 and W4.

When the detecting part 304B (an example of a second detecting part) detects a person (worker), which is a monitoring target, the detecting part 304B attempts to identify (detect) an object by determining whether the intensity of reflected light (infrared light) received from the object is relatively high (specifically, higher than a predetermined level) based on the received light information. The intensity of the received reflected light is obtained based on the received light intensity information. The intensity of the reflected light received from the object increases as the retroreflectivity of the surface of the object increases, while the intensity of the reflected light received from the object decreases as the distance between the object and the sensor 45X increases. Therefore, the detecting part 304B may take into account the distance to the object based on the TOF information, and correct the intensity of the received reflected light (obtained based on the received light intensity information), assuming that the object is at a predetermined distance. At this time, the predetermined level is defined such that the reflective material is distinguishable from other objects. Accordingly, if the intensity of reflected light received from an object is relatively high, the detecting part 304B determines that the object is a worker who wears clothing with a reflective material such as a reflective vest. In this manner, the detecting part 304B can detect the worker. Examples of the clothing with a reflective material include any clothing to which a reflective material can be attached such as a jacket with a reflective material and pants with a reflective material, in addition to the reflective vest. That is, among the workers W1 through W4, the detecting part 304B can detect the workers W1 and W3 who wear the reflective vests RV with a relatively higher probability than the other workers W2 and W4.

Note that the detecting part 304B can identify the shape and the size of the object based on the received light information corresponding to the reflected light received from a plurality of light emission directions. Therefore, when detecting a person (worker), which is a monitoring target, the detecting part 304B may use the shape and the size of the object based on the received light information to identify the person (worker).

As described above, the detecting part 304 uses both the detecting part 304A and the detecting part 304B to detect a monitoring target. Therefore, the detecting part 304 detects a worker (for example, the worker W1) who wears both a helmet and clothing with a reflective material with the highest probability. Further, the detecting part 304 can detect a worker (for example, the worker W2 or the worker W3) who wears one of a helmet and clothing with a reflective material with a probability lower than the worker (for example, the worker W1) who wears both a helmet and clothing with a reflective material. Further, the detecting part 304 detects a worker (for example, the worker W4) who wears neither a helmet nor clothing with a reflective material with the lowest probability. In other words, the detecting part 304 is configured to detect a person who wears both a helmet and clothing with a reflective material with the highest probability, detect a person who wears one of a helmet and clothing with a reflective material with the next highest probability, and detect a person who wears neither a helmet nor clothing with a reflective material with the lowest probability.

For example, if an image captured by the image capturing device 40 is used alone to identify (detect) a person, which is a monitoring target, there would be a possibility that the person would not be identified as a person, or that an object would be identified as the person, depending on the direction, the posture, or the like of the person.

Conversely, in the present example, in addition to the detecting part 304A that uses the output (captured image) of the image capturing device 40 (camera 40X), the detecting part 304B that uses the output (received light information) of the surrounding information obtaining device 45 (sensor 45X) is provided. Accordingly, the surroundings monitoring apparatus 150 can use not only the detection result of the detecting part 304A, but also the detection result of the detecting part 304B. Therefore, even if a person, who should be detected, is not detected by the detecting part 304A or an object is detected as a person by the detecting part 304A, the surroundings monitoring apparatus 150 can use the detection result of the detecting part 304B to prevent the person from going undetected or the object from being incorrectly detected. Thus, the safety in the surroundings of the shovel 100 can be further improved. Further, in the present example, the detecting part 304 can detect a worker who wears safety equipment, that is, a helmet and clothing with a reflective material, with relatively high accuracy. Therefore, the surroundings monitoring apparatus 150 can encourage workers to wear helmets and clothing reflective materials from the viewpoint of ensuring the safety of the workers and the safety of a worksite.

In the present example, the detecting part 304 is configured to identify a helmet and clothing with a reflective material worn by a worker. However, the detecting part 304 may be configured to identify any other pieces of safety equipment so as to detect (identify) a person (worker), which is a monitoring target. Examples safety equipment to be identified include a safety belt, earplugs at a noisy worksite, safety shoes, arc welding gloves, anti-vibration gloves, an anti-dust mask, a respirator, anti-dust glasses, light shielding glasses, a welding shield, and an identification (ID) tag for outputting an alarm in response to the approach of a working machine, or the like. This allows the surroundings monitoring apparatus 150 to encourage workers to wear multiple pieces of safety equipment.

<Method for Identifying Position of Monitoring Target>

The detecting part 304A identifies the position (for example, the foot position) of a person (worker) viewed from the shovel 100 based on the size, the position, and the like of a partial image corresponding to the entire person (worker) or a helmet recognized in a captured image. This is because the size of the worker in the image changes depending on the distance between the worker and the camera 40X. In addition, the position of the worker appearing in the image changes depending on the distance and the direction of the worker relative to the camera 40X.

The detecting part 304B identifies the position of the worker viewed from the shovel 100 based on the TOF information included in the received light information. The TOF information includes the light emission direction of light viewed from the sensor 45X, and the time from when light is emitted in the light emission direction until when reflected light is received. The direction of an object relative to the sensor 45X can be determined based on the former, and the distance between the sensor 45X and the object can be determined based on the latter.

For example, as described above, the intensity of reflected light (infrared light) received from an object decreases as the distance between the object and the sensor 45X increases. Therefore, the position (distance) of the object can also be determined based on the received light intensity information. However, the intensity of reflected light (infrared light) received from an object changes depending on the surface properties of the object, specifically depending on the retroreflectivity, reflectance, and the like of the object. Therefore, if the received light intensity information is used alone to identify the position of a surrounding monitoring target, the accuracy of the identified position would relatively decrease. Therefore, the surroundings monitoring apparatus 150 would not be able to accurately ascertain the position of the surrounding monitoring target. For example, if there are large variations in retroreflectivity of clothing with a reflective material worn by a worker, the range of the intensity of received reflected light would become relatively wide, thus causing the accuracy of distance information based on the received light intensity information to be decreased. Therefore, when the safety function such as the notification function or the operation limiting function is activated according to the position of a monitoring target, the conditions for activating the notification function or the operation limiting function would vary.

The detecting part 304B recognizes (detects) the position of a monitoring target based on the received light intensity information and the TOF information, and identifies the position of the monitoring target. The safety function control part 305 activates one or both of the notification function and the operation limiting function if the intensity of reflected light received from a monitoring target by the detecting part 304B is relatively high, and the distance between the monitoring target and the shovel 100 is relatively small (that is, if the monitoring target is detected in the notification area or in the operation limiting area). That is, the safety function control part 305 outputs an alarm or limits the operation of the shovel 100 based on the output (the received light intensity information and the TOF information) of the sensor 45X. Because the surroundings monitoring apparatus 150 can use the TOF information, the surroundings monitoring apparatus 150 can identify the position of a monitoring target around the shovel 100 with relatively high accuracy, as compared to when the received light intensity information is used alone. Therefore, when activating the safety function such as the notification function or the operation limiting function according to the position of a monitoring target, the surroundings monitoring apparatus 150 can reduce variations in the conditions for activating the notification function or the operation limiting function. Accordingly, the surroundings monitoring apparatus 150 can improve the safety in the surroundings of the shovel 100.

In the present example, instead of or in addition to the TOF information, the detecting part 304B may use other information related to the distance between the shovel 100 and an object (a monitoring target) around the shovel 100 to identify the position of the monitoring target. For example, the detecting part 304B may obtain information related to the distance between the shovel 100 and an object (a monitoring target) based on an image captured by a stereo camera, which is the image capturing device 40 (camera 40X), and use the obtained information to identify the position of the monitoring target.

[Activation Control Method for Safety Function]

Next, a specific example of a method for controlling the activation of the safety function (the notification function and the operation limiting function) by the safety function control part 305 will be described.

In the following examples, the safety function control part 305 changes the manner of activating the safety function between when a monitoring target is detected by the detecting part 304A and when a monitoring target is detected by the detecting part 304B.

<First Example of Activation Control Method for Safety Function>

The safety function control part 305 activates the notification function only, of the safety function, when a monitoring target is detected by the detecting part 304A. That is, when a monitoring target is detected by the detecting part 304A, the safety function control part 305 does not activate the operation limiting function regardless of the distance between the monitoring target and the shovel 100. Specifically, when a monitoring target is detected in the notification area (hereinafter referred to as a "first notification area", for convenience) by the detecting part 304A, the safety function control part 305 activates the notification function, and does not set the operation limiting area (hereinafter referred to as a "first operation limiting area", for convenience).

The safety function control part 305 activates the operation limiting function alone when a monitoring target is detected in the operation limiting area (hereinafter referred to as a "second operation limiting area", for convenience) by the detecting part 304B. Further, the safety function control part 305 may also activate the notification function when the monitoring target is detected in the notification area (hereinafter referred to as a "second notification area", for convenience) by the detecting part 304B. The first notification area and the second notification area may be the same or may be different.

For example, in response to the detection of a monitoring target, if the operation limiting function is activated regardless of relative low detection accuracy, the operator would feel discomfort or the work efficiency of the shovel 100 would decrease, as compared to when the notification function is activated.

In view of the above, in the present example, the surroundings monitoring apparatus 150 allows the operation limiting function to be activated alone when a monitoring target is detected by the detecting part 304B of the detecting parts 304A and 304B. This is because the accuracy for detecting a monitoring target based on the received light information obtained by the surrounding information obtaining device 45 tends to be relatively higher than the accuracy for detecting a monitoring target based on image recognition on an image captured by the imaging device 40. That is, the accuracy for detecting a monitoring target by the detecting part 304B tends to be higher than that by the detecting part 304A. Accordingly, the surroundings monitoring apparatus 150 can improve the safety in the surroundings of the shovel 100 while causing less discomfort to the operator or minimizing a decrease in the work efficiency of the shovel 100.

<Second Example of Activation Control Method for Safety Function>

When activating the notification function, the safety function control part 305 changes the manner of notification (that is, a notification method) between when a monitoring target is detected in the first notification area by the detecting part 304A and when a monitoring target is detected in the second notification area by the detecting part 304B. Accordingly, the operator of the shovel 100, the administrator, and workers around the shovel 100 can readily identify whether the image capturing device 40 (camera 40X) is used to detect a monitoring target or surrounding information obtaining device 45 (sensor 45X) is used to detect a monitoring target.

For example, the safety function control part 305 may change the timbre, the volume, the pattern, and the sound output cycle of a sound, the contents of speech, and the like, output from the sound output device 54, between when a monitoring target is detected by the detecting part 304A and when a monitoring target is detected by the detecting part 304B. The same may apply to a case where the output device 230 (sound output device) of the management apparatus 200 and the output device 330 (sound output device) of the terminal apparatus 300 are activated. Specifically, when a monitoring target is detected by the detecting part 304B, the safety function control part 305 may employ the timbre, the volume, the pattern, and the sound output cycle of a sound, the contents of speech, and the like, representing that the degree of urgency (risk) is high. This is because the accuracy for detecting a monitoring target by the detecting part 304B tends to be higher than that by the detecting part 304A, as described above.

Further, for example, for the notification function, the safety function control part 305 may change the manner of displaying an image on the display device 50 or the like (see FIG. 20, for example) between when a monitoring target is detected by the detecting part 304A and when a monitoring target is detected by the detecting part 304B.

<Activation Control Method for Safety Function when Optional Equipment is Mounted>

Next, a specific example of a method for controlling the activation of the safety function by the safety function control part 305 when optional equipment for increasing the volume of the shovel 100 (hereinafter simply referred to as "optional equipment") is mounted will be described with reference to FIG. 16.

Figure 16:
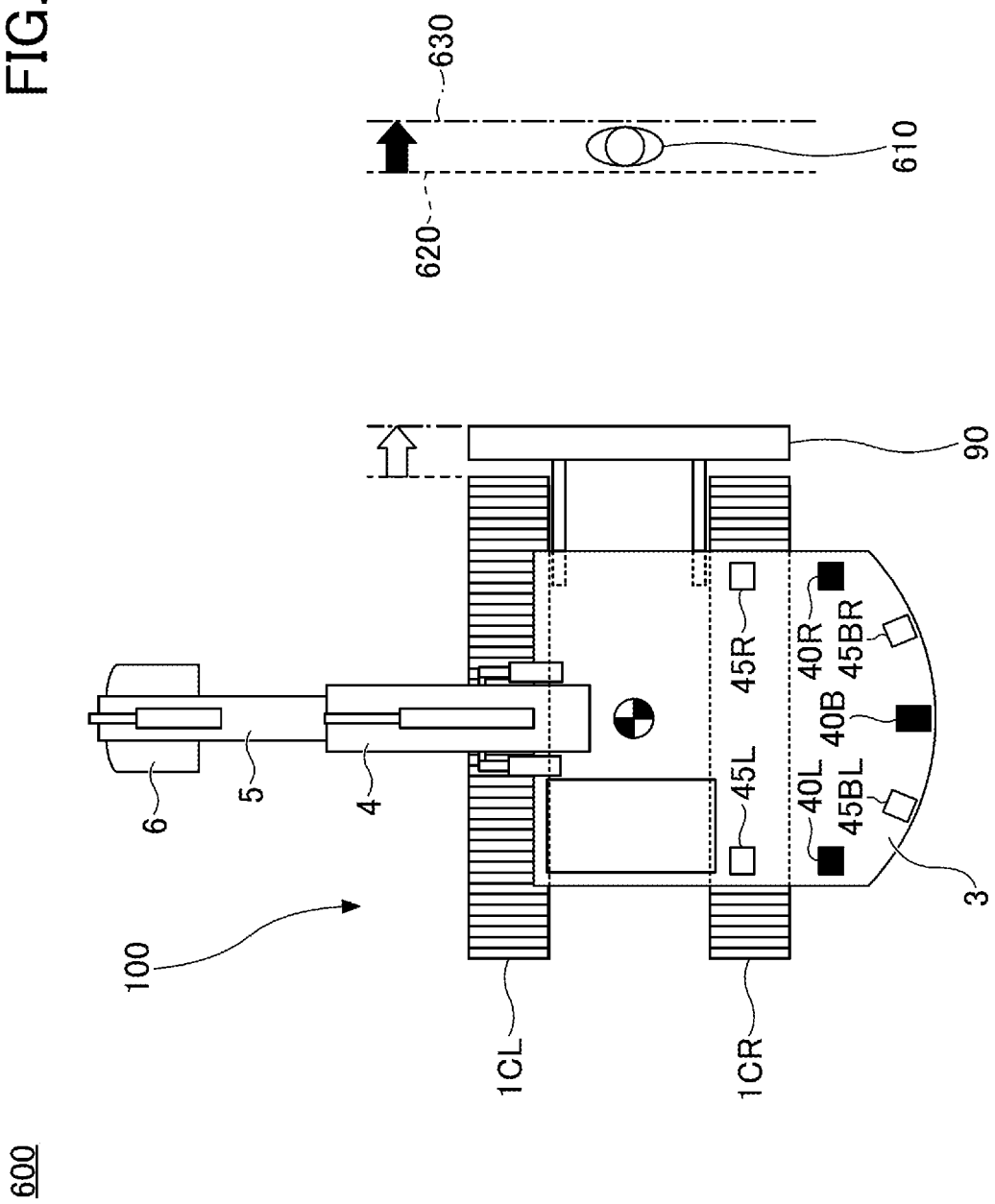
FIG. 16 is a diagram illustrating an operation limiting area when optional equipment is mounted.

FIG. 16 is a diagram illustrating the operation limiting area when optional equipment is mounted.

As illustrated in FIG. 16, in the present example, a blade 90, which is optional equipment, is attached to the front side of the lower traveling body 1 of the shovel 100. Specifically, the blade 90 is attached so at to project forward in the moving direction of the lower traveling body 1 (crawlers 1CL and 1CR) (as indicated by a white arrow in FIG. 16). Therefore, when the lower traveling body 1 travels (for example, when the lower traveling body 1 travels straight or performs a power turn) in the direction (the right direction in FIG. 16) in which the blade 90 projects, the distance between a surrounding worker 610 and the shovel 100 (blade 90) decreases as compared to when the blade 90 is not attached. Further, when the lower traveling body 1 performs a pivot turn, a spin turn, or the like, the blade 90 attached to the shovel 100 also turns in accordance with the turning operation of the lower traveling body 1. Therefore, the turning radius increases as the blade 90 projects forward relative to the lower traveling body 1. Thus, when the blade 90 is attached to the shovel 100, there would be a possibility that the distance between the surrounding worker 610 and the shovel 100 (blade 90) would decrease, as compared to when the blade 90 is not attached to the shovel 100.

In view of the above, the safety function control part 305 facilitates the activation of the safety function when the blade 90 is moved in a direction toward the surroundings of the shovel 100 in accordance with the operation of the shovel 100 (that is, in accordance with the travel operation of the lower traveling body 1), as compared to other cases. Examples of the other cases include a case where the lower traveling body 1 travels rearward (with the blade 90 being attached to the front side of the lower traveling body 1), such that the blade 90 is moved in a direction away from the surroundings of the shovel 100. In the present example, the outer peripheral edge of the operation limiting area, which faces the blade 90 or the front side of the lower traveling body 1, is set so as to be located away from the shovel 100 when the blade 90 is attached to the lower traveling body 1 (as indicated by a dash-dot line 630 in FIG. 16), as compared to when the blade 90 is not attached to the lower traveling body 1 (as indicated by a dotted line 620 in FIG. 16). The above-described setting (change) may be configured by the setting part 302, and may be registered in the storage 303. The same may apply to the outer peripheral edge of the notification area for the notification function. Accordingly, when the shovel 100 travels forward (rightward in FIG. 16) with the blade 90 being attached to the front side of the lower traveling body 1, the safety function control part 305 can more quickly activate the safety function (such as an alarm function or the operation limiting function) in response to the worker 610 being detected by the detecting part 304. Therefore, the safety function control part 305 can more appropriately activate the safety function in accordance with whether optional equipment is mounted. Thus, the surroundings monitoring apparatus 150 can further improve the safety in the surroundings of the shovel 100. In other words, the safety function control part 305 can activate the safety function such that the safety in the surroundings of the shovel 100 relatively increases when optional equipment (such as the blade 90) is mounted, as compared to when optional equipment is not mounted.

Further, the activation of the safety function may be facilitated by relaxing the other conditions for activating the safety function, instead of setting the outer peripheral edge of the notification area or the operation limiting area so as to be located away from the shovel 100. For example, if the conditions for activating the safety function includes a condition on the degree of certainty of detection of a monitoring target by the detecting part 304 (hereinafter referred to as the "degree of certainty of detection"), the condition on the degree of certainty may be relaxed. Information related to the degree of certainty of detection is output from the detecting part 304. Specifically, the setting part 302 may set a relatively low threshold for the condition on the degree of certainty of detection when the blade 90 is moved in a direction toward the surroundings of the shovel 100 in accordance with the operation of the shovel 100, as compared to the other cases. Further, the setting part 302 may set a relatively low threshold for the condition on the degree of certainty of detection when the blade 90 is mounted, as compared to when the blade 90 is not mounted. Accordingly, the safety function control part 305 can more appropriately activate the safety function in accordance with whether optional equipment is mounted.

Further, instead of relaxing the conditions for activating the safety function, the speciation of the safety function may be switched to a speciation with a relatively high safety level. For example, the setting part 302 may set the safety function, such that the notification function and the operation limiting function can be activated when the blade 90 is moved in a direction toward the surroundings of the shovel 100 in accordance with the operation of the shovel 100, and the notification function can be activated in the other cases. Further, the setting part 302 may set the safety function, such that the notification function and the operation limiting function can be activated when the blade 90 is mounted, and only the notification function can be activated when the blade 90 is not mounted. The operation limiting function provides a relatively higher safety level than the notification function because the operation of the shovel 100 can be forcibly limited regardless of the intent of the operator or the like. Further, the setting part 302 may set the operation limiting function, such that the operation limiting function can be activated with a relatively high degree of limitation when the blade 90 is moved in a direction toward the surroundings of the shovel 100 in accordance with the operation of the shovel 100, and that the operation limiting function can be activated with a relatively low degree of limitation in the other cases. Further, the setting part 302 may set the operation limiting function, such that the operation limiting function can be activated with a relatively high degree of limitation when the blade 90 is mounted, and that the operation limiting function can be activated with a relatively low degree of limitation when the blade 90 is not mounted. Further, the setting part 302 may set the notification function, such that the notification function can be activated with a relatively high degree of urgency (risk) when the when the blade 90 is moved in a direction toward the surroundings of the shovel 100 in accordance with the operation of the shovel 100, and that the notification function can be activated with a relatively low degree of urgency (risk) in the other cases. Further, the setting part 302 may set the notification function, such that the notification function can be activated with a relatively high degree of urgency (risk) when the blade 90 is mounted, and that the notification function can be activated with a relatively low degree of urgency (risk) when the blade 90 is not mounted. Accordingly, the safety function control part 305 can more appropriately activate the safety function in accordance with whether optional equipment is mounted.

Similarly, the safety function may be activated so as to provide a relatively high safety level when any other types of optional equipment is attached instead of or in addition to the blade 90. Examples of the other types of optional equipment include an additional counterweight mounted on the rear of the upper turning body 3 and a large counterweight that is heavier than a standard counterweight. Examples of the other types of optional equipment also include a relatively long arm that is attached in place of the arm 5. Examples of the other types of optional equipment also include a spare attachment (such as a breaker or an agitator), which serves as an end attachment in place of the bucket 6, and a spare attachment (such as quick coupling or a tilt rotator) attached between the end attachment and the arm 5.

If optional equipment is detachable, the safety function control part 305 may determine whether each type of optional equipment is mounted, and may change the manner of activating the safety function according to the determined results. For example, the setting part 302 configures the settings for the mounting state of optional equipment (for example, as to whether each type of optional equipment is mounted) in accordance with a predetermined input from the operator or the like through the input device 52. The safety function control part 305 may determine whether optional equipment is mounted based on the settings registered in the storage 303. For example, the safety function control part 305 may automatically determine whether each type of optional equipment is mounted based on the output of a sensor capable of obtaining information relating to the mounting state of each type of optional equipment (such as a sensor provided in image capturing device 40 or a switch provided in a mounting part of optional equipment) or the like.

Further, the display processing part 301 may cause the display device 50 or the like to display a notification (hereinafter simply referred to as a "notification of change") concerning a change in the manner of activating the safety function, when the state in which optional equipment is not mounted is switched to the state in which optional equipment is mounted. The notification of change includes that a notification that the manner of activating the safety function is automatically changed. Accordingly, the surroundings monitoring apparatus 150 can cause a user such as the operator or the administrator to ascertain that the manner of activating the safety function is automatically changed because the optional equipment is mounted. The notification of change may request the user such as the operator or the administrator to allow or disallow the change in the manner of activating the safety function. In this case, if the notification of change is displayed on the display device 50 or the like, the user such as the operator or the administrator may allow or disallow the change in the manner of activating the safety function through the input device 52, the input device 240, or the input device 340. Therefore, it is possible to reflect the intent of the user such as the operator or the administrator in changing the manner of activating the safety function in accordance with the mounting state of the optional equipment. Further, the notification of change may request the user such as the operator or the administrator to manually change the manner of activating the safety function. In this case, in response to receiving the notification of change, the user can manually change the manner of activating the safety function. That is, the setting part 302 can change the manner of activating the safety function in accordance with a setting operation manually performed by the operator, the administrator, or the like through the input device 52, the input device 240, or the input device 340. Accordingly, it is possible to reflect the intent of the user such as the operator or the administrator in changing the manner of activating the safety function in accordance with the mounting state of the optional equipment.

[Activation Control Method for External Notification Function]

Next, a specific example of a method for controlling the activation of the external notification function by the safety function control part 305 will be described.

As described above, the safety function control part 305 is configured to activate the external notification function when a monitoring target is detected by the detecting part 304.

For example, changes in the positional relationship between the shovel 100 and a surrounding worker, which is a monitoring target, due to the motion of the worker, are considered to be relatively slow, and thus, the possibility of causing a sudden decrease in safety is considered to be low. If the safety is not significantly decreased, the necessity to activate the external notification function is relatively low. Rather, if the external notification function is activated, there would be a possibility that the operator would be surprised, thereby causing the operator to make an operational mistake. In view of this, in the present example, when a monitoring target is detected (in the notification area) by the detecting part 304, the safety function control part 305 activates the external notification function in some cases, and does not activate the external notification function in other cases.

For example, depending on the operating conditions and the topographical conditions, it is assumed that the safety in the surroundings of the shovel 100 may be suddenly decreased due to the operation of the shovel 100. Therefore, even if the safety is not significantly decreased, it is considered highly necessary to provide a notification to the operator in the cabin 10 or the operator of a remote operation of the presence of a monitoring target such as a surrounding worker. Further, if a plurality of shovels 100 are performing work under automatic operation, the administrator or the like of the shovels 100 may, for example, monitor the work situations of the respective shovels 100 while viewing monitoring images displayed on the output device 230 (display device) of the management apparatus 200. Similarly, the administrator or the like may use the terminal apparatus 300 to monitor the work situations of the respective shovels 100. Therefore, even if the safety of the shovels 100 is not significantly decreased, it is considered highly necessary to provide a notification to the administrator, remotely monitoring the work situations of the respective shovels 100, of the presence of a monitoring target, such as a surrounding worker. Accordingly, the safety function control part 305 may activate the internal notification function or the remote notification function without activating the external notification function when a monitoring target is detected in the notification area by the detecting part 304.

For example, the safety function control part 305 may switch whether to activate the external notification function based on whether a monitoring target is detected by the detecting part 304A or by the detecting part 304B. Specifically, the safety function control part 305 may be configured to not activate the external notification function when a monitoring target is detected by the detecting part 304A, and configured to activate the external notification function when a monitoring target is detected by the detecting part 304B. For example, if the external notification function is activated, the work of workers around the shovel 100 may be stopped. Therefore, if an erroneous notification is output, the work efficiency may be decreased due to unnecessary activation of the external notification function. In light of this, as described above, the safety function control part 305 can activate the external notification function only when a monitoring target is detected by the detecting part 304B, which tends to have relatively high detection accuracy, of the detecting parts 304A and 304B. Accordingly, a balance between the safety around the shovel 100 and the work efficiency can be achieved.

Further, for example, when a monitoring target is detected by the detecting part 304, the safety function control part 305 may switch whether to activate the external notification function by taking into account the activation status of the operation limiting function. Specifically, the safety function control part 305 may be configured to not activate the external notification function even when a monitoring target is detected in the notification area by the detecting part 304, as long as the operation limiting function (for example, the operation deceleration function) is not activated (for example, there is no possibility that the monitoring target contacts the shovel 100, as will be described later). Conversely, the safety function control part 305 may be configured to activate the external notification function when a monitoring target is detected in the notification area by the detecting part 304 and also the operation limiting function for example, the operation deceleration function) is activated. Accordingly, the surroundings monitoring apparatus 150 can ensure the safety in the surroundings of the shovel 100, while avoiding a situation in which the work of workers around the shovel 100 may be stopped due to the activation of the external notification function in a state in which the possibility of contact between the shovel 100 and a surrounding monitoring target is low. The activation of the operation limiting function of the shovel 100 attracts the attention of workers or the like around the shovel 100. Therefore, when the operation limiting function is activated, the work of the workers around the shovel 100 is highly likely to be stopped or interrupted. In such a situation, even if the external notification function is activated and an erroneous notification is output, a concern about a decrease in work efficiency less likely occurs because the work of the workers around the shovel 100 is already stopped or interrupted.

Further, for example, when a monitoring target is detected in the notification area by the detecting part 304, the safety function control part 305 may switch whether to activate the external notification function based on whether the detected monitoring target is located in a direction in which the shovel 100 operates. Specifically, the safety function control part 305 may be configured to determine a direction in which the shovel 100 operates, which is associated with the operation of a driven element (such as the lower traveling body 1, the upper turning body 3, or the attachment), based on operation information of the shovel 100, and in response to determining that a monitoring target is not located in a direction in which the shovel 100 operates, the safety function control part 305 may be configured to not activate the external notification function. Conversely, the safety function control part 305 may be configured to determine a direction in which the shovel 100 operates, which is associated with the operation of the driven element, based on operation information of the shovel 100, and in response to determining that a monitoring target is located in a direction in which the shovel 100 operates, the safety function control part 305 may be configured to activate the external notification function. Accordingly, the surroundings monitoring apparatus 150 can ensure the safety in the surroundings of the shovel 100, while avoiding a situation in which the work of workers around the shovel 100 may be stopped due to the activation of the external notification function in a state in which the possibility of contact between the shovel 100 and a surrounding monitoring target is low. Therefore, the surroundings monitoring apparatus 150 can minimize a decrease in work efficiency at a worksite while securing the safety in the surroundings of the shovel 100.

Further, for example, when a monitoring target is detected in the notification area by the detecting part 304, the safety function control part 305 may switch whether to activate the external notification function in accordance with the degree of risk, which is determined based on the positional relationship between the shovel 100 and the monitoring target. Specifically, the safety function control part 305 may be configured to activate the external notification function when the risk (for example, the possibility of contact), determined based on the positional relationship between the shovel 100 and the monitoring target, is relatively high. Conversely, the safety function control part 305 may be configured to not activate the external notification function when the risk, which is determined based on the positional relationship between the shovel 100 and the monitoring target, is relatively low. The risk may be obtained (calculated) based on the distance between the monitoring target and the shovel 100. Further, the risk may be obtained (calculated) based on, for example, the position of the monitoring target relative to the operation direction of a driven element (for example, the travel direction of the lower traveling body 1, the turning direction of the upper turning body 3, the moving direction of the attachment, or the like) in accordance with the operation of the shovel 100. Accordingly, the surroundings monitoring apparatus 150 can ensure the safety in the surroundings of the shovel 100, while avoiding a situation in which the work of workers around the shovel 100 may be stopped due to the activation of the external notification function in a state in which the possibility of contact between the shovel 100 and a surrounding monitoring target is low. Therefore, the surroundings monitoring apparatus 150 can minimize a decrease in work efficiency at a worksite while securing the safety in the surroundings of the shovel 100.

Further, for example, when a monitoring target is detected in the notification area by the detecting part 304, the safety function control part 305 may switch whether to activate the external notification function in accordance with the operation state of the gate lock lever. Specifically, the safety function control part 305 may be configured to activate the external notification function when the gate lock lever is in an unlocked state. When the gate lock lever is in an unlocked state, the shovel 100 is likely to be operated in accordance with the operator's operation or an operation command corresponding to the automatic operation function. Conversely, the safety function control part 305 may be configured to not activate the external notification function when the gate lock lever is in a locked state. When the gate lock lever is in a locked state, the operator's operation or an operation command corresponding to the automatic operation function is disabled, and thus, the shovel 100 is not operated. Accordingly, the surroundings monitoring apparatus 150 can minimize a decrease in work efficiency at a worksite while securing the safety in the surroundings of the shovel 100.

Further, for example, when a monitoring target is detected in the notification area by the detecting part 304, the safety function control part 305 may switch whether to activate the external notification function, based on whether the operation of the shovel 100 is currently stopped in response to the other activation condition being satisfied. Specifically, the safety function control part 305 may be configured to activate the external notification function when the operation of the shovel 100 is not currently stopped (prohibited) in response to the other activation condition being satisfied. This is because there is a possibility that the shovel 100 may be operated in response to the operator's operation or an operation command corresponding to the automatic operation function. Conversely, the safety function control part 305 may be configured to not activate the external notification function when the operation of the shovel 100 is currently stopped (prohibited) in response to the other activation condition being satisfied. This is because the shovel 100 is currently stopped regardless of the operator's operation or an operation command corresponding to the automatic operation function. Accordingly, the surroundings monitoring apparatus 150 can minimize a decrease in work efficiency at a worksite while securing the safety in the surroundings of the shovel 100.

Further, for example, when a monitoring target is detected in the notification area by the detecting part 304, the safety function control part 305 may switch whether to activate the external notification function in accordance with the duration of the stopped state of the shovel 100. Specifically, the safety function control part 305 may be configured to activate the external notification function when the duration, for which the shovel 100 is stopped, exceeds a predetermined threshold. When the duration for which the shovel 100 is stopped is relatively long, the awareness of workers around the shovel 100 that the shovel 100 will not be operated may increase, thus resulting in less awareness of safety. Conversely, the safety function control part 305 may be configured to not activate the external notification function when the duration, for which the shovel 100 is stopped (including when the shovel 100 is not stopped), is less than or equal to a predetermined threshold. When the duration for which the shovel 100 is stopped is relatively short, and the shovel 100 is intermittently operated, the attention of workers can be easily attached to the shovel 100. Thus, the workers' awareness of safety is considered to be relatively high. Accordingly, the surroundings monitoring apparatus 150 can minimize a decrease in work efficiency at a worksite while securing the safety in the surroundings of the shovel 100.

Further, for example, when a monitoring target is detected in the notification area by the detecting part 304, the safety function control part 305 may switch whether to activate the external notification function based on whether there is a sign indicating that the operation of the currently-stopped shovel 100 may be started. Specifically, the safety function control part 305 may be configured to activate the external notification function when the shovel 100 is stopped and also there is a sign indicating that the operation of the shovel 100 may be started. Further, the safety function control part 305 may be configured to activate the external notification function when the duration for which the shovel 100 is stopped exceeds the predetermined threshold and also there is a sign indicating that the operation of the shovel 100 may be started. This is because the operation of the shovel 100 is likely to be started. Conversely, the safety function control part 305 may be configured to not activate the external notification function when the shovel 100 is not stopped or when there is no sign indicating that the operation of the shovel 100 may be started. Further, the safety function control part 305 may be configured to not activate the external notification function when the duration for which the shovel 100 is stopped is less than or equal to the predetermined threshold, or there is a sign indicating that the operation of the shovel 100 may be started. As described above, while the shovel 100 is operated, the attention of workers can be easily attached to the shovel 100. Thus, the workers' awareness of safety is considered to be relatively high. Further, when the operation of the shovel 100 is unlikely to be started, the necessity to activate the external notification function relatively decreases. Accordingly, the surroundings monitoring apparatus 150 can minimize a decrease in work efficiency at a worksite while securing the safety in the surroundings of the shovel 100.

The presence or absence of a sign indicating that the operation of the shovel 100 may be started may be determined based on the operation state of the gate lock lever. If the gate lock lever is in a locked state, the possibility that the operation of the shovel 100 may be started is low. If the state of the gate lock lever is changed from the locked state to the unlocked state, the possibility that the operation of the shovel 100 may be started is high. Further, the presence or absence of a sign indicating that the operation of the shovel 100 may be started may be determined based on the presence or absence of a sign indicating that the operator's operation may be started. The presence or absence of a sign indicating that the operator's operation may be started may be identified based on an image captured by a camera installed in the cabin 10 or captured by a camera configured to capture an image of the operator of a remote operation. For example, the management apparatus 200 or the terminal apparatus 300 is equipped with the camera configured to capture an image of the operator of a remote operation. Further, the presence or absence of a sign indicating that the operator's operation may be started may be identified based on the operator's contact with (grasping of) the operating device 26 or the remote operation device. For example, if the operating device 26 or the remote operation device is not grasped by the operator, the output of the operating device 26 or the remote operation device is maintained at a level corresponding to zero. Conversely, if the operating device 26 or the remote operation device is grasped by the operator's hand, the output of the operating device 26 or the remote operation device indicates a small operation amount. Therefore, the operator's contact with the operating device 26 or the remote operation device can be identified by monitoring the output (a pressure signal or an electrical signal) of the operating device 26 or the remote operation. As a result, the presence or absence of a sign indicating that the operator's operation may be started can be identified. Further, the presence or absence of a sign indicating that the operation of the shovel 100 may be started may be determined based on the operation pattern of the shovel 100. The operation pattern of the shovel 100 may be identified based on the history of the operator's operations or the history of operation commands corresponding to the automatic operation function.

Further, for example, the setting part 302 may configure settings for switching between ON (enabled) and OFF (disabled) according to a predetermined operation by the operator or the like with respect to the input device 52. In this case, when a monitoring target is detected in the notification area by the detecting part 304, the safety function control part 305 may switch whether to activate the external notification function in accordance with the settings for activating the external notification function. Specifically, in a case where a monitoring target is detected in the notification area by the detecting part 304, the safety function control part 305 may be configured to activate the external notification function when the external notification function is set to ON (enabled), and may be configured to not activate the external notification function when the external notification function is set to OFF (disabled). Accordingly, the surroundings monitoring apparatus 150 can reflect the intent of the operator or the like in determining whether to activate the external notification function.

As described above, the safety function control part 305 may activate the external notification function through the sound output device 54. As described above, the sound output device 54 includes the horn 54a and the travel alarm 54b. Accordingly, the safety function control part 305 may use the existing horn 54a and the travel alarm 54b to implement the external notification function. Therefore, the cost for implementing the external notification function can be reduced.

For example, in response to receiving a control command (control current), corresponding to the activation of the external notification function, from the controller 30, the horn 54a may be configured to sound by energizing a coil and closing the relay 62 independent of whether the knob switch 64 is turned on. The controller 30 can cause the horn 54a to output a sound in a predetermined sound pattern by appropriately controlling the opening/closing pattern of the horn relay. The predetermined sound pattern of the horn 54a, corresponding to the external notification function, may be configured to be different from a sound pattern normally used when the operator or the like starts the travel of the shovel 100. Accordingly, the surroundings monitoring apparatus 150 can allow workers or the like around the shovel 100 to distinguish between a notification (signal) of the start of the travel of the shovel 100 and the activation of the external notification function.

Further, for example, the travel alarm 54b outputs a sound in a predetermined sound pattern in response to receiving a control command, corresponding to the activation of the external notification function, from the controller 30. The sound pattern of the travel alarm corresponding to the activation of the external notification function (for example, a beep that sounds repeatedly) may be configured to be different from a sound pattern normally used during the travel of the lower traveling body 1. Accordingly, as in the case of the horn 54a, the surroundings monitoring apparatus 150 can allow workers or the like around the shovel 100 to distinguish between a notification of the travel of the shovel 100 and the activation of the external notification function.

Further, the safety function control part 305 may use an illumination device such as a headlight or an external display device provided on the house part of the upper turning body 3 to activate the external notification function.

For example, in response to receiving a control command, corresponding to the activation of the external notification function, from the controller 30, the illumination device may be turned on or may be alternately turned on and off in a predetermined pattern.

Further, the external display device displays character information urging workers around the shovel 100, the supervisor, and the like to evacuate the area around the shovel 100 in response to receiving a control command, corresponding to the activation of the external notification function, from the controller 30.

[Activation Control Method for Operation Limiting Function]

Next, a specific example of a method for controlling the activation of the operation limiting function by the safety function control part 305 will be described with reference to FIG. 17 through FIG. 19.

Figure 17:
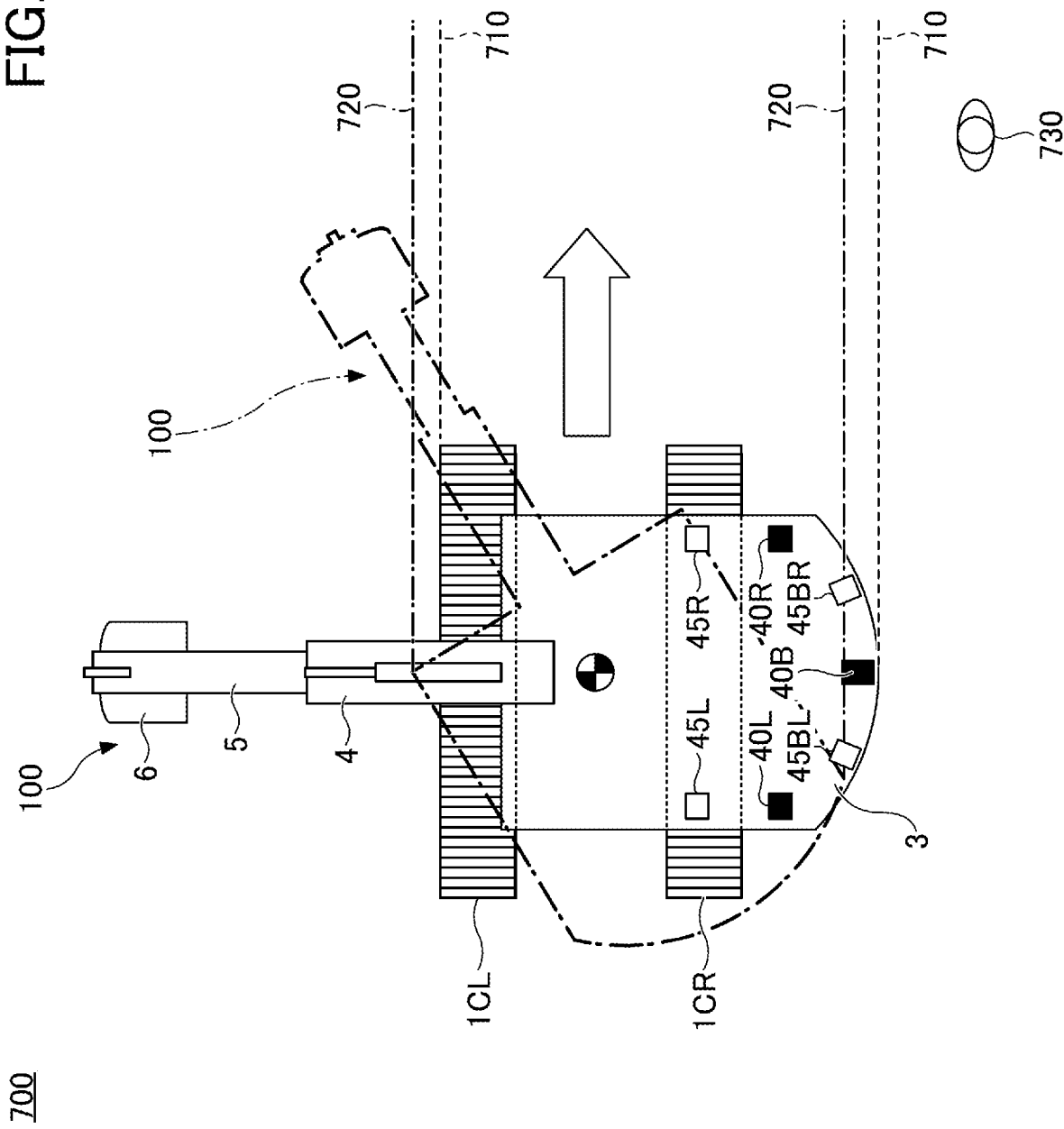
FIG. 17 is a diagram illustrating a method for determining whether the shovel contacts a surrounding monitoring target.

FIG. 17 is a diagram illustrating a method for determining whether the shovel 100 contacts a surrounding monitoring target. Specifically, FIG. 17 depicts a work situation 700 in which the lower traveling body 1 (crawlers 1CL and 1CR) of the shovel 100 is traveling straight in the right direction. FIG. 18 and FIG. 19 are diagrams illustrating a method for controlling the activation of the operation limiting function. Specifically, FIG. 18 and FIG. 19 depict the method for controlling the activation of the operation limiting function in work situations 810 and 820 of the shovel 100.

In the present example, when a monitoring target is detected in the operation limiting area by the detecting part 304, the safety function control part 305 determines whether the shovel 100 contacts the monitoring target based on an operation performed for the shovel 100 (that is, the operation of the operating device 26 or a remote operation) or based on the direction of the shovel 100 that operates in accordance with an operation command corresponding to the automatic operation function. Then, when the safety function control part 305 determines that the shovel 100 contacts the monitoring target, the safety function control part 305 activates the operation stop function and stops the shovel 100 that operates in accordance with an operation performed for the shovel 100.

Specifically, the safety function control part 305 may determine the operation direction of a driven element to be operated based on operation information of the driven element. Then, the safety function control part 305 may estimate whether the shovel 100 contacts a monitoring target (detected by the detecting part 304), based on information related to the positional relationship between the outer surface of the shovel 100 and the monitoring target and the determined operation direction of the shovel 100. The information related to the positional relationship between the outer surface of the shovel 100 and the monitoring target may include output information of the image capturing device 40 (camera 40X) and the surrounding information obtaining device 45 (sensor 45X), and detection results of the detecting part 304. Further, the information related to the positional relationship between the outer surface of the shovel 100 and the monitoring target may include, for example, information related to the installation positions of the camera 40X and the sensor 45X on the shovel 100 (upper turning body 3). This is because the safety function control part 305 can determine which portion of the outer surface of the shovel 100 is close to the monitoring target based on the installation positions of the camera 40X and the sensor 45X, which obtain information related to the monitoring target. Further, the information related to the positional relationship between the outer surface of the shovel 100 and the monitoring target may include information related to the body size (such as the width and the shape) of the shovel 100 with respect to the operation direction of the shovel 100. This is because the positional relationship between the outer surface of the shovel 100 and the monitoring target may change according to the body size (occupied width) of the shovel 100 with respect to the operation direction of the shovel 100.

For example, when a monitoring target is detected by the detecting part 304, the safety function control part 305 determines the operation direction of the shovel 100, which is associated with the operation of a driven element, based on operation information the driven element at predetermined intervals. Accordingly, the determined result of the operation direction of the shovel 100 is updated in accordance with the change in the operation information of the driven element. Similarly, the detecting part 304 performs a process for detecting a monitoring target around the shovel 100 and outputs position information of the detected monitoring target at predetermined intervals. Accordingly, the position information of the monitoring target, which is continuously detected by the detecting part 304, relative to the shovel 100 is sequentially updated. The safety function control part 305 may determine whether the shovel 100 contacts the monitoring target for a predetermined period of time based on the operation direction of the shovel 100, determined by the safety function control part 305 itself, and the position information of the monitoring target output from the detecting part 304. Accordingly, the safety function control part 305 can sequentially update the determined result as to whether the shovel 100 may contact the surrounding monitoring target based on the operation direction of the shovel 100, which is sequentially updated, and the position of the monitoring target viewed from the shovel 100. Therefore, the safety function control part 305 can appropriately determine whether the shovel 100 contacts the monitoring target even in a situation where the operation details of the driven element changes (for example, the operation details of the lower traveling body 1 changes from traveling straight to power turning).

For example, the safety function control part 305 may use a predetermined area (that is, the operation stop area), which is set based on the information related to the positional relationship between the outer surface of the shovel 100 and the monitoring target and the determined operation direction of the shovel 100, to determine whether the shovel 100 contacts the monitoring target. Specifically, the setting part 302 may set the operation stop area at predetermined intervals as an area where the shovel 100 may contact the monitoring target.

In the work situation 700 illustrated in FIG. 17, for example, in the shovel 100 whose upper turning body 3 and attachment are indicated by a solid line (hereinafter referred to as the "shovel 100 indicated by the solid line", for convenience), the upper turning body 3 (attachment) is turned 90 degrees to the left with respect to the moving direction (right direction in FIG. 17) of the lower traveling body 1, and is directed upward (in FIG. 17). Further, in the shovel 100 whose upper turning body 3 and attachment are indicated by a dash-dot line (hereinafter referred to as the "shovel 100 indicated by the dash-dot line", for convenience), the upper turning body 3 (attachment) is turned to the left with respect to the moving direction (right direction in FIG. 17) of the lower traveling body 1, and is directed upward and to the right (in FIG. 17).

When the lower traveling body 1 of the shovel 100 indicated by the solid line travels in the right direction in FIG. 17, the body (the lower traveling body 1 and the upper turning body 3) of the shovel 100 passes through an area having a width between dotted lines 710, which are defined by the left end (outer end) of the crawler 1CL and the rear end of the upper turning body 3 in top view. Therefore, when the lower traveling body 1 of the shovel 100 indicated by the solid line travels, the safety function control part 305 can determine whether (the body of) the shovel 100 contacts a surrounding monitoring target (for example, a worker 730) based on the positional relationship between the monitoring target versus the left end (outer end) of the crawler 1CL and the rear end of the upper turning body 3. Further, the safety function control part 305 can also determine whether (the body of) the shovel 100 contacts the surrounding monitoring target based on the relative position of the monitoring target relative to the body size (the width between the dotted lines 710) of the shovel 100 in the moving direction (right direction in FIG. 17) of the shovel 100. For example, the safety function control part 305 may determine that the shovel 100 contacts the monitoring target when the monitoring target is detected in the operation stop area having the width between the dotted lines 710 to which a predetermined margin (for example, 1 meter to 1.5 meters) is added.

When the lower traveling body 1 of the shovel 100 indicated by the dash-dot line travels in the right direction in FIG. 17, the body (the lower traveling body 1 and the upper turning body 3) of the shovel 100 passes through an area having a width between dotted lines 720, which are defined by the front left corner and the rear right corner of the upper turning body 3 in top view. Therefore, when the lower traveling body 1 of the shovel 100 indicated by the dash-dot line travels, the safety function control part 305 can determine whether (the body of) the shovel 100 contacts a surrounding monitoring target (for example, the worker 730) based on the positional relationship between the monitoring target versus the front left corner and the rear right corner of the upper turning body 3. Further, the safety function control part 305 can also determine whether (the body of) the shovel 100 contacts the surrounding monitoring target based on the relative position of the monitoring target relative to the body size (the width between the dotted lines 720) of the shovel 100 in the moving direction (right direction in FIG. 17) of the shovel 100. For example, the safety function control part 305 may determine that the shovel 100 contacts the monitoring target when the monitoring target is detected in the operation stop area having the width between the dotted lines 720 to which a predetermined margin is added.

As described above, for the shovel 100 indicated by the solid line, the operation stop area corresponds to an area between the dotted lines 710. For the shovel 100 indicated by the dash-dot line, the operation stop area corresponds to an area between the dash-dot lines 720. That is, the setting part 302 may change the operation stop area in accordance with the turning angle of the upper turning body 3 with respect to the lower traveling body 1. Accordingly, the setting part 302 can more appropriately set the operation stop area in accordance with the turning angle of the upper turning body 3. Information related to the turning angle of the upper turning body 3 may be obtained, for example, based on an image captured by the camera 40X. Specifically, the turning angle of the upper turning body 3 may be determined in accordance with how the crawlers appear in an image, which camera 40X captured the image, and the like. Further, the shovel 100 may be provided with a sensor (such as a rotary encoder, an acceleration sensor, an angular velocity sensor, a 6-axis sensor, or an (inertial measurement unit (IMU) mounted on the upper turning body 3) capable of obtaining the information related to the turning angle of the upper turning body 3.

In the work situation 700 illustrated in FIG. 17, it is assumed that the lower traveling body 1 travels straight; however, in addition to traveling straight, the lower traveling body 1 may also perform a power turn, a pivot turn, and a spin turn. Therefore, the safety function control part 305 may determine whether a travel operation of the lower traveling body 1 corresponds to straight line movement, a power turn, a pivot turn, or a spin turn, based on operation information received input from the operation information output device 29. That is, operation information related to the lower traveling body 1 include at least one of information representing a travel operation corresponding to straight line movement, information representing a travel operation corresponding to a power turn, information representing a travel operation corresponding to a pivot turn, and information representing a travel operation corresponding to a spin turn.

Accordingly, the safety function control part 305 can determine whether the shovel 100 contacts a surrounding monitoring target detected by the detecting part 304, by taking into account the body size (occupied width) of the shovel 100 in the operation direction of the driven element. Specifically, the safety function control part 305 may determine whether the shovel 100 contacts surrounding monitoring target during the operation of the driven element, based on operation information related to the driven element of the shovel 100 and the positional relationship between the outer surface of the shovel 100 and the monitoring target. Further, when the travel operation of the lower traveling body 1 is performed, the information related to the travel operation of the lower traveling body 1 include at least one of information representing a travel operation corresponding to straight line movement, information representing a travel operation corresponding to a power turn, information representing a travel operation corresponding to a pivot turn, and information representing a travel operation corresponding to a spin turn. Accordingly, the safety function control part 305 can ascertain the travel direction of the lower traveling body 1 in more detail, and can more appropriately determine whether the shovel 100 contacts a monitoring target.

Figure 18:
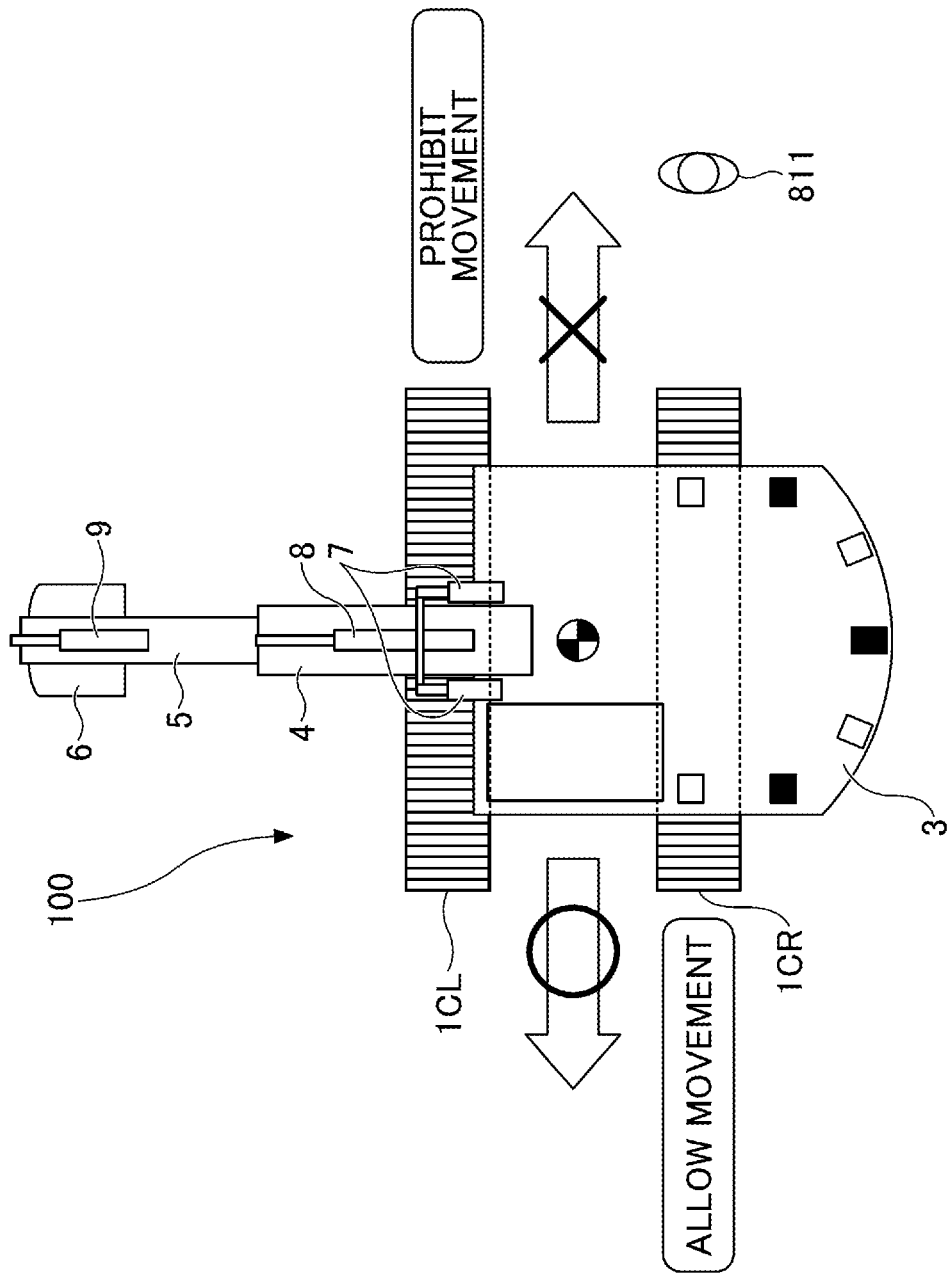
FIG. 18 is a diagram illustrating a method for controlling the activation of the operation limiting function.

For example, in a work situation 810 illustrated in FIG. 18, the shovel 100 is turned 90 degrees to the left with respect to the moving direction (right direction in FIG. 18) of the lower traveling body 1. Further, a worker 811, detected by the detecting part 304, is located at a position in front of (in FIG. 18, to the right of) the lower traveling body 1.

In this case, the safety function control part 305 allows the lower traveling body 1 to travel (move) backward (in the left direction in FIG. 18) in accordance with the travel operation of the lower traveling body 1. Because the shovel 100 moves away from the worker 811, the shovel 100 does not contact the worker 811. Conversely, the safety function control part 305 prohibits the lower traveling body 1 from traveling (moving) forward (in the right direction in FIG. 18) in accordance with the travel operation of the lower traveling body 1, and activates the operation stop function. Because the worker 811 is located in front of the shovel 100 in the travel direction, the shovel 100 approaches and contacts the worker 811 if the lower traveling body 1 travels.

Figure 19:
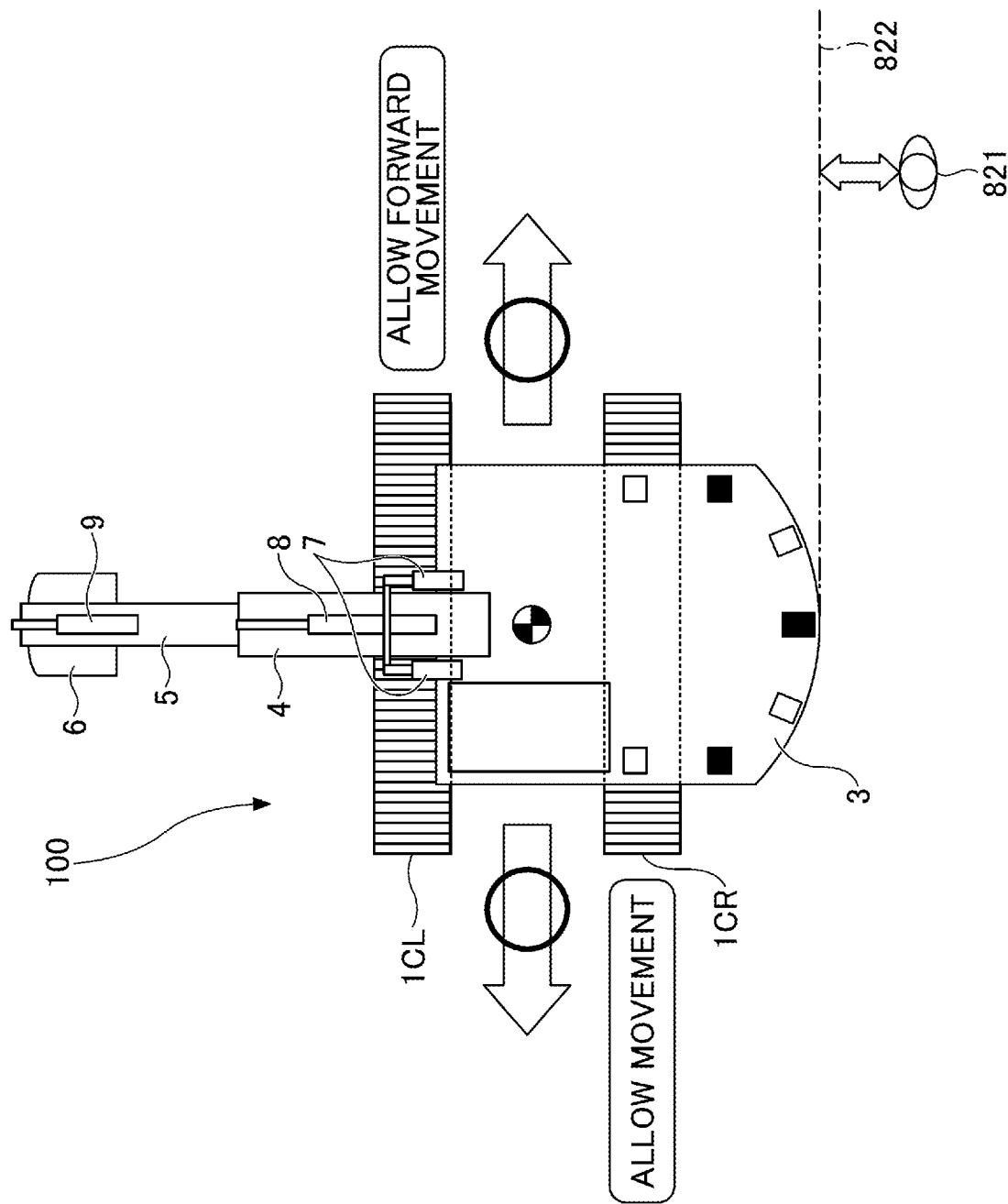
FIG. 19 is a diagram illustrating the method for controlling the activation of the operation limiting function.

Similar to the work situation 810 illustrated in FIG. 18, in a work situation 820 illustrated in FIG. 19, the shovel 100 is turned 90 degrees to the left with respect to the moving direction (right direction in FIG. 19) of the 1 lower traveling body 1. Further, a worker 821, detected by the detecting part 304, is located at a position behind and to the right of the lower traveling body 1 and in front of and to the right of the crawler 1CR.

In this case, the safety function control part 305 allows the lower traveling body 1 to travel (move) backward (in the left direction in FIG. 19) in accordance with the travel operation of the lower traveling body 1. Because the shovel 100 moves away from the worker 821, the shovel 100 does not contact the worker 821. In addition, the safety function control part 305 allows the lower traveling body 1 to travel (move) forward (in the right direction in FIG. 19) in accordance with the travel operation of the lower traveling body 1. As the lower traveling body 1 travels, the shovel 100 approaches the worker 821. However, even if the lower traveling body 1 travels (moves) forward, the shovel 100 does not contact the worker 821 because the worker 821 is sufficiently locate away from the outer edge (the occupied width indicated by a dash-dot line 822) of the shovel 100.

In the work situation 820 illustrated in FIG. 19, when a travel operation corresponding to a power turn to the right of lower traveling body 1, is performed, the shovel 100 moves toward the worker 812 while turning in the right direction. Therefore, if a travel operation of the lower traveling body 1 corresponds to a power turn to the right, the safety function control part 305 may prohibit the movement of the shovel 100, and may activate the operation stop function. Accordingly, the safety function control part 305 can more appropriately activate the operation stop function in accordance with the details of a travel operation of the lower traveling body 1.

As described above, if an operation for the shovel 100, is likely to cause the shovel 100 to contact a monitoring target detected by the detector 304, the safety function control part 305 activates the operation stop function and stops the operation of the shovel 100. Conversely, the safety function control part 305 allows the operation of the shovel 100 if the shovel 100 shovel 100 approaches a monitoring target detected by the detector 304, but does not contact the monitoring target. Specifically, the safety function control part 305 determines whether the shovel 100 (driven element) contacts a monitoring target detected by the detector 304, and when determining that the shovel 100 does not contact the monitoring target, the safety function control part 305 allows the operation of the shovel 100, which operates in accordance with an operation performed for the shovel 100. At this time, the safety function control part 305 may activate the operation deceleration function, and allow the operation of the shovel 100 while reducing the operation speed of the shovel 100. Alternatively, the safety function control part 305 may allow the operation of the shovel 100 without activating the operation limiting function. Accordingly, the surroundings monitoring apparatus 150 can allow the operation of the shovel 100 if the shovel 100 does not contact a monitoring target, and can achieve a balance between the safety in the surroundings of the shovel 100 and the work efficiency. Therefore, the surroundings monitoring apparatus 150 can more appropriately stop the operation of the shovel 100 in accordance with the presence of an obstacle (a monitoring target) around the shovel 100.

[Method for Controlling Display of Monitoring Image when Monitoring Target is Detected]

Next, a specific example of a method for controlling the display of a monitoring image, performed by the display processing part 301 when a monitoring target is detected by the detecting part 304, will be described with reference to each of FIG. 20 through FIG. 22.

Figure 21:
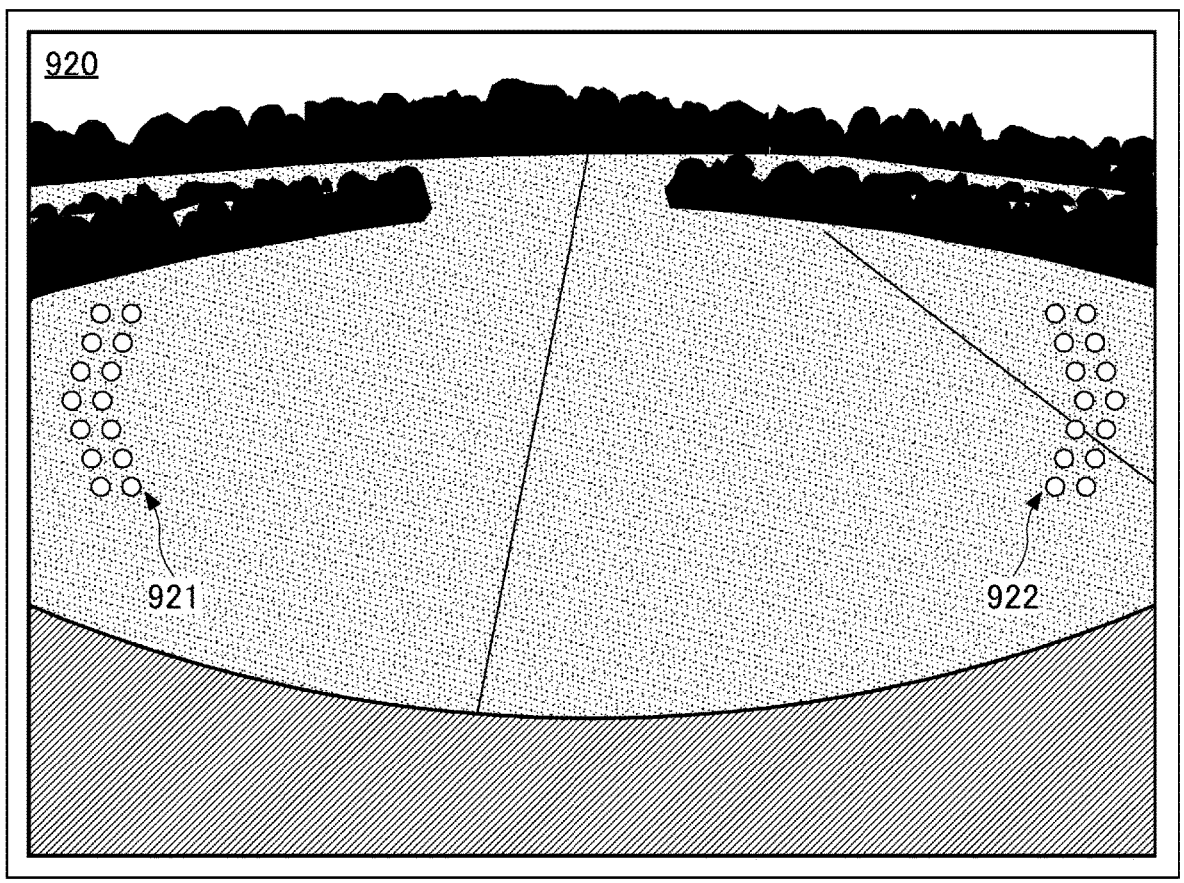
FIG. 21 is a diagram illustrating a specific example of a monitoring image when a monitoring target is detected by the detecting part.

FIG. 20 through FIG. 22 are diagrams illustrating specific examples of monitoring images when monitoring targets are detected by the detecting part 304. Specifically, FIG. 20 through FIG. 22 depict first through third examples of monitoring images (monitoring images 910 through 930) displayed on the display device 50 when monitoring targets are detected by the detecting part 304.

In FIG. 22, instruction images 934 and 935 that are not actually displayed are indicated by dotted lines.

First, as illustrated in FIG. 20, an image (a through-the-lens image) captured by the camera 40B is displayed on the display device 50 as a monitoring image 910, as controlled by the display processing part 301.

A worker 911 who wears a helmet and a reflective vest appears in the monitoring image 910. In the present example, because the worker 911 who wears both the helmet and the reflective vest, the worker 911 is detected by both the detecting part 304A and the detecting part 304B.

In addition, a frame 912 indicating that the worker 911 is detected by the detecting part 304A is superimposed and displayed on the monitoring image 910. Accordingly, the operator or the like can readily identify the presence or the position of the worker 911 detected by the detecting part 304A.

Further, the manner of displaying the frame 912 may be changed in accordance with the distance between the shovel 100 and the monitoring target (worker 911) detected by the detecting part 304 (detecting part 304A). For example, the frame 912 may be displayed in yellow if the distance between the shovel 100 and the monitoring target detected by the detecting part 304A is relatively large. Further, the frame 912 may be displayed in red if the distance between the shovel 100 and the monitoring target detected by the detecting part 304A is relatively small. Accordingly, the operator or the like can readily identify the positional relationship (distance) between the shovel 100 and the monitoring target by viewing the displayed frame 912. The same may apply to the frame 520 as described above with reference to FIG. 10 and a frame 932 as will be described later with reference to FIG. 22.

Further, the instruction image 913 is superimposed and displayed on the monitoring image 910. The instruction image 913 indicates that the monitoring target (worker 911) detected by the detecting part 304B is present in the monitoring image 910. Accordingly, the operator or the like can identify that the monitoring target detected by the detecting part 304B is present in the currently displayed monitoring image 910.

The instruction image 913 has an arrowhead (arrow) shape, and is displayed at the lower end of the monitoring image 910, that is, at the end close to the body (upper turning body 3) of the shovel 100 in the vertical direction of the monitoring image 910. The instruction image 913 points inward from the lower end of the monitoring image 910, which corresponds to the side closest to the body of the shovel 100. That is, the instruction image 913 points to the upper side corresponding to the inside of the monitoring image 910. Accordingly, the instruction image 913 can specifically represent that the monitoring target (worker 911) detected by the detecting part 304B is present in the monitoring image 910.

The arrowhead shape of the instruction image 913 is composed of a plurality of circular images (specifically, 14 circular images), and the monitoring image 910 is exposed through gaps between the circular images. Therefore, even when the instruction image 913 is superimposed and displayed on the monitoring image 910 (the image captured by camera 40X), the operator or the like can appropriately grasp the situation around the shovel 100 corresponding to a portion of the monitoring image 910 on which the instruction image 913 is superimposed and displayed. Further, even when the instruction image 913 is superimposed and displayed on a portion of the monitoring image 910 corresponding to the monitoring target, an image portion corresponding to the monitoring target and an image portion corresponding to the background are exposed through the gaps of the instruction image 913. Therefore, the user such as the operator can readily distinguish between the image portion corresponding to the monitoring target and the image portion corresponding to the background, on which the instruction image 913 is superimposed. The same applies to instruction images 921 and 922, which will be described later with reference to FIG. 21, and instruction images 933 through 935, which will be described later with reference to FIG. 22.

Note that the instruction image 913 may have an arrowhead shape without gaps. In this case, the instruction image 913 (having a continuous arrowhead shape) may be displayed such that a portion of the monitoring image 910, on which instruction image 913 is superimposed, can be seen through the instruction image 913. Therefore, even when the instruction image 913 is superimposed and displayed on the monitoring image 910 (the image captured by camera 40X), the operator or the like can appropriately grasp the situation around the shovel 100 corresponding to the portion of the monitoring image 910 on which the instruction image 913 is superimposed and displayed.

Further, the manner of displaying the instruction image 913 may be changed in accordance with the distance between the shovel 100 and the monitoring target (worker 911) detected by the detecting part 304 (detecting part 304B). For example, the instruction image 913 may be displayed in yellow if the distance between the shovel 100 and the monitoring target detected by the detecting part 304B is relatively large. Further, the instruction image 913 may be displayed in red if the distance between the shovel 100 and the monitoring target detected by the detecting part 304B is relatively small. Accordingly, the operator or the like can readily identify the positional relationship (distance) between the shovel 100 and the monitoring target by viewing the instruction image 913. The same may apply to the instruction images 921 and 922, which will be described later with reference to FIG. 21, and the instruction images 933 through 935, which will be described later with reference to FIG. 22.

Note that in the present example, the monitoring image 910 is displayed on the entire display area of the display device 50, but the monitoring image 910 may be displayed such that a margin is left in the display area of the display device 50. In this case, the instruction image 913 may be displayed in the margin. The same may apply to the instruction images 921 and 922, which will be described later with reference to FIG. 21. Further, the instruction image 913 may be displayed not only when the monitoring target is detected by the detecting part 304B, but also when the monitoring target is detected by the detecting part 304A. The same may apply to the instruction images 921 and 922, which will be described later with reference to FIG. 21, and the instruction images 933 through 935, which will be described later with reference to FIG. 22. Further, instead of the instruction image 913, an instruction image, capable of indicating that the monitoring target detected by the detecting part 304B is present in the monitoring image 910, may be displayed. For example, an instruction image having an upward arrow shape may be superimposed and displayed at the lower end of the monitoring image 910 (image captured by the camera 40B). Further, for example, an instruction image, having an isosceles triangle shape (or an equilateral triangle shape) whose apex faces upward, may be superimposed and displayed at the lower end of the monitoring image 910 (image captured by the camera 40B). In this case, similar to the instruction image 913, the arrow shape or the isosceles triangle shape of such an instruction image may have gaps through which an image portion, on which the instruction image is superimposed, is exposed. Alternatively, an image portion on which such an instruction image is superimposed may be seen through the instruction image. Accordingly, similar to the instruction image 913, the operator or the like can appropriately grasp the situation around the shovel 100 corresponding to the portion of the monitoring image 910 on which an instruction image is superimposed and displayed. The same may apply to the instruction images 921 and 922, which will be described later with reference to FIG. 21, and the instruction images 933 through 935, which will be described later with reference to FIG. 22.

As described above, the instruction image 913 is superimposed and displayed on the monitoring image 910 (through-the-lens image). The instruction image 913 represents the direction in which the monitoring target (worker 911) detected by the detecting part 304B is present, when viewed from the shovel 100 (upper turning body 3). Accordingly, by viewing the instruction image 913, the operator can readily identify the direction of the monitoring target detected by the detecting part 304B based on the monitoring image displayed on the display device 50.

Next, as illustrated FIG. 21, an image (a through-the-lens image) captured by the camera 40B is displayed on the display device 50 as a monitoring image 920.

In the present example, monitoring targets (workers) are detected by the detecting part 304B outside a surrounding area of the shovel 100, which corresponds to the monitoring image 920.

The instruction images 921 and 922 are superimposed and displayed on the monitoring image 920. Each of the instruction images 921 and 922 indicates that a monitoring target is detected by the detecting part 304B outside the surrounding area of the shovel 100, which corresponds to the monitoring image 920. Accordingly, the operator or the like can recognize that the monitoring target is detected outside the surrounding area of the shovel 100, which corresponds to the monitoring image 920.

Similar to the instruction image 913 illustrated in FIG. 20, the instruction image 921 has an arrowhead (arrow) shape, and is displayed on the left side near the center in the vertical direction of the monitoring image 920. The instruction image 921 points to the outside of the monitoring image 920, that is, the left side corresponding to the outside of the monitoring image 920. Accordingly, the instruction image 921 can represent that the monitoring target is detected by the detecting part 304B in an area located leftward (in the circumferential direction) relative to the surrounding area of the shovel 100, which corresponds to the monitoring image 920. That is, the instruction image 921 indicates the direction, in which the monitoring target detected by the detecting part 304B is present, with respect to the monitoring image 920. Therefore, the operator or the like can intuitively determine in which direction the monitoring target is present with respect to the monitoring image 920 currently displayed on the display device 50. Accordingly, the operator or the like can perform an operation for switching the contents displayed on the display device 50 through the input device 52, so as to cause the display device 50 to display, as a monitoring image, an image that includes the monitoring target detected by the detecting part 304B within the imaging range of the camera 40R.

Similar to the instruction image 921, the instruction image 922 has an arrowhead shape, and is displayed on the right side near the center in the vertical direction of the monitoring image 920. The instruction image 922 points to the outside of the monitoring image 920, that is, the right side corresponding to the outside of the monitoring image 920. Accordingly, the instruction image 922 can represent that the monitoring target is detected by the detecting part 304B in an area located rightward (in the circumferential direction) relative to the surrounding area of the shovel 100, which corresponds to the monitoring image 920. That is, the instruction image 922 indicates the direction, in which the monitoring target detected by the detecting part 304B is present, with respect to the monitoring image 920. Therefore, the operator or the like can intuitively determine in which direction the monitoring target is present with respect to the monitoring image 920 currently displayed on the display device 50. Accordingly, the operator or the like can perform an operation for switching the contents displayed on the display device 50 through the input device 52, so as to cause the display device 50 to display, as a monitoring image, an image that includes the monitoring target detected by the detecting part 304B within the imaging range of the camera 40L.

Note that when a monitoring target is detected by the detecting part 304 outside the surrounding area of the shovel 100, which corresponds to a monitoring image, the display processing part 301 may cause the display device 50 to continuously display the monitoring image, unless an operation for switching the contents displayed on the display device 50 is performed by the operator or the like through the input device 52. This is because the operator or the like can identify the presence or the position of the detected monitoring target by viewing each of the instruction images 921 and 922. Accordingly, the surroundings monitoring apparatus 150 can give priority to the intention of the user regarding the contents displayed on the display device 50. In addition to the display device 50, any other display device may be provided in the cabin 10. In this case, if a monitoring target is detected by the detecting part 304 outside the surrounding area of the shovel 100, which corresponds to a monitoring image displayed on the display device 50, the display processing part 301 may automatically cause the other display device to display an image of the monitoring target, which can be captured by a corresponding camera included in the camera 40X. Accordingly, the usability of the operator and the like can be improved. Further, if a monitoring target is detected by the detecting part 304 outside the surrounding area of the shovel 100, which corresponds to a monitoring image displayed on the display device 50, the controller 30 may notify the operator or the like that the monitoring target is detected in any manner instead of or in addition to notifying the operator or the like through the display device 50. For example, if a monitoring target is detected outside the surrounding area of the shovel 100, which corresponds to a monitoring image displayed on the display device 50, the controller 30 may notify the operator or the like that the monitoring target is detected by causing the sound output device 54 to output a predetermined sound or speech.

As described above, the instruction images 921 and 922 are superimposed and displayed on the monitoring image 920 (through-the-lens image). The instruction images 921 and 922 each represents the direction in which the monitoring target detected by the detecting part 304B is present, when viewed from the shovel 100 (upper turning body 3). Accordingly, by viewing each of the instruction images 921 and 922, the operator can readily identify the direction of the monitoring target detected by the detecting part 304B based on the monitoring image displayed on the display device 50.

Next, as illustrated in FIG. 22, the display device 50 displays a monitoring image 930 including a viewpoint-converted image EP and a shovel image CG generated based on images captured by the cameras 40B, 40L, and 40R.

In the present example, a worker 931 who wears a helmet and a reflective vest appears in the monitoring image 930 at a position corresponding to a position behind the upper turning body 3. In the present example, because the worker 931 wears both the helmet and the reflective vest, the worker 931 is detected by both the detecting part 304A and the detecting part 304B.

In addition, the frame 932 indicating that the worker 931 is detected by the detecting part 304A is superimposed and displayed on the monitoring image 930. Accordingly, the operator or the like can readily identify the presence or the position of the worker 931 detected by the detecting part 304A.

In addition, the instruction image 933 is superimposed and displayed on the monitoring image 930. The instruction image 933 indicates that the monitoring target (worker 931) detected by the detecting part 304B is present in the monitoring image 930. Accordingly, the operator or the like can recognize that the monitoring target detected by the detecting part 304B is present in the currently displayed monitoring image 930.

The instruction image 933 is superimposed and displayed on the outer edge, behind the shovel 100 (shovel image CG), of the viewpoint-converted image EP. That is, the instruction image 933 is superimposed and displayed on a portion of the horizontal image HVP. The instruction image 933 points inward from the outer edge of the viewpoint-converted image EP (the portion of the horizontal image HVP). That is, the instruction image 933 points upward toward the shovel 100 (shovel image CG) from the outer edge of the viewpoint-converted image EP. Accordingly, the instruction image 933 can specifically represent that the monitoring target (worker 931) detected by the detecting part 304B is present in the monitoring image 930. Further, the instruction image 933 is superimposed and displayed on the portion of the viewpoint-converted image EP (horizontal image HVP), which corresponds to the rear side of the upper turning body 3. Accordingly, the instruction image 933 can represent that the monitoring target (worker 931) detected by the detecting part 304B is present behind the shovel 100 (upper turning body 3).

Further, although not detected in the present example, if a monitoring target is detected on the left side of the upper turning body 3 (for example, within the imaging range of the camera 40L) by the detecting part 304B, the instruction image 934 (indicated by a dotted line) is displayed on a portion of the viewpoint-converted image EP (horizontal image HVP), which corresponds to the left side of the upper turning body 3. The instruction image 934 is superimposed and displayed on the outer edge, to the left of the shovel 100 (shovel image CG), of the viewpoint-converted image EP. That is, the instruction image 934 is superimposed and displayed on the portion of the horizontal image HVP. The instruction image 934 points inward from the outer edge of the viewpoint-converted image EP (the portion of the horizontal image HVP). That is, the instruction image 934 points rightward toward the shovel 100 (shovel image CG) from the outer edge of the viewpoint-converted image EP. Accordingly, the instruction image 934 can specifically represent that the monitoring target detected by the detecting part 304B is present in the monitoring image 930. Further, the instruction image 934 is superimposed and displayed on the portion of the viewpoint-converted image EP (horizontal image HVP), which corresponds to the left side of the upper turning body 3. Accordingly, the instruction image 934 can represent that the monitoring target detected by the detecting part 304B is present to the left of the shovel 100 (upper turning body 3).

Similarly, although not detected in the present example, if a monitoring target is detected on the right side of the upper turning body 3 (for example, within the imaging range of the camera 40R) by the detecting part 304B, the instruction image 935 (indicated by a dotted line) is displayed on a portion of the viewpoint-converted image EP (horizontal image HVP), which corresponds to the right side of the upper turning body 3. The instruction image 935 is superimposed and displayed on the outer edge, to the right of the shovel 100 (shovel image CG), of the viewpoint-converted image EP. That is, the instruction image 935 is superimposed and displayed on the portion of the horizontal image HVP. The instruction image 935 points inward from the outer edge of the viewpoint-converted image EP (the portion of the horizontal image HVP). That is, the instruction image 935 points leftward toward the shovel 100 (shovel image CG) from the outer edge of the viewpoint-converted image EP. Accordingly, the instruction image 935 can specifically represent that the monitoring target detected by the detecting part 304B is present in the monitoring image 930. Further, the instruction image 935 is superimposed and displayed on the portion of the viewpoint-converted image EP (horizontal image HVP), which corresponds to the right side of the upper turning body 3.

Accordingly, the instruction image 935 can represent that the monitoring target detected by the detecting part 304B is present to the right of the shovel 100 (upper turning body 3).

Note that the instruction images 933 through 935 may be displayed in a margin around the viewpoint-converted image EP of the monitoring image 930.

Monitoring images similar to the monitoring images 910, 920, 930 according to the present example may be displayed on the output device 230 (display device) of the management apparatus 200 or the output device 330 (display device) of the terminal apparatus 300. Accordingly, the operator can perform a remote operation of the shovel 100 while checking the similar monitoring images displayed on the display device of the management apparatus 200 or the display device of the terminal apparatus 300. Further, if a plurality of shovels 100 are performing work under automatic operation, the administrator or the like of the shovels 100 can monitor the work situations of the respective shovels 100 while viewing the similar monitoring images displayed on the output device 230 (display device) of the management apparatus 200. Similarly, the administrator or the like of the shovels 100 can monitor the work situations of the respective shovels 100 while viewing the similar monitoring images displayed on the output device 330 (display device) of the terminal apparatus 300.

[Effects]

Next, effects of the shovel management system 1000 (the shovel 100, the management apparatus 200, and the terminal apparatus 300) according to the present embodiment will be described.

According to the embodiment, when a predetermined object (monitoring target) is detected by the detecting part 304 outside a range of the displayed peripheral image (such as a through-the-lens image or a viewpoint-converted image), the display device 50 displays an image representing that the predetermined object is detected by the detecting part 304 outside the range of a peripheral image, which is currently displayed by the display device 50. The same applies to the output device 230 (display device) of the management apparatus 200 and the output device 330 (display device) of the terminal apparatus 300.

Accordingly, even if the monitoring target detected by the detecting part 304 is not shown in the displayed peripheral image, the operator, the administrator or the like of the shovel 100 can readily recognize that the monitoring target is detected outside the range of the displayed peripheral image.

Further, according to the embodiment, when the predetermined object is detected outside the range of the displayed peripheral image, the display device 50 may display an image (an arrow image 921 or 922) indicating a direction in which the predetermined object is present with respect to the displayed peripheral image. The same applies to the output device 230 (display device) of the management apparatus 200 and the output device 330 (display device) of the terminal apparatus 300.

Accordingly, even if the monitoring target is detected outside the range of the displayed peripheral image, the operator, the administrator or the like of the shovel 100 can readily identify the position of the monitoring target with respect to the displayed peripheral image.

Further, according to the embodiment, in response to the predetermined object being detected within the range of the displayed peripheral image, the display device 50 may display an image indicating a direction in which the predetermined object is present within the displayed peripheral image. The same applies to the output device 230 (display device) of the management apparatus 200 and the output device 330 (display device) of the terminal apparatus 300.

Accordingly, the operator, the administrator or the like of the shovel 100 can readily (intuitively) ascertain that the monitoring target is detected within the displayed peripheral image.

Further, according to the embodiment, the display device 50 may superimpose the image (instruction image 913, 921, 922, 933, 934, or 935) indicating the direction in which the detected predetermined object is present on the displayed peripheral image. The same may apply to the output device 230 (display device) of the management apparatus 200 and the output device 330 (display device) of the terminal apparatus 300.

Accordingly, the operator, the administrator or the like of the shovel 100 can readily recognize that the image such as the arrow image 913 corresponds to the display contents of a through-the-lens image or a viewpoint-converted image EP.

Further, according to the embodiment, image indicating the direction in which the detected predetermined object is present may include a gap through which the peripheral image is exposed. The same may apply to the output device 230 (display device) of the management apparatus 200 and the output device 330 (display device) of the terminal apparatus 300.

Accordingly, the operator, the administrator or the like of the shovel 100 can readily grasp the situation around the shovel 100, which corresponds to a portion of a through-the-lens image or a viewpoint-converted image EP on which the image such as the instruction image 913 is superimposed.

Further, according to the embodiment, the manner of displaying the image indicating the direction in which the predetermined object, detected by the detecting part 304, is present may be changed in accordance with the distance between the predetermined object and the shovel 100. The same may apply to the output device 230 (display device) of the management apparatus 200 and the output device 330 (display device) of the terminal apparatus 300.

Accordingly, the operator, the administrator or the like of the shovel 100 can readily grasp the proximity of the monitoring target, detected by the detecting part 304, to the shovel 100 by looking at the arrow image 913, Further, according to the embodiment, when the predetermined object is detected outside the range of the displayed peripheral image, the display device 50 may cause the peripheral image to remain displayed until an operation for changing the display content is performed. The same may apply to the output device 230 (display device) of the management apparatus 200 and the output device 330 (display device) of the terminal apparatus 300.

Accordingly, the shovel management system 1000 can give priority to the intention of the user, such as the operator or the administrator, regarding the contents displayed on the display device 50, the output device 230, or the output device 330.

Modifications/Variations

Although the embodiments have been specifically described above, the present invention is not limited to the specific embodiments, and various modifications and variations may be made without departing from the scope of the present invention set forth in the claims.

The surroundings monitoring apparatus 150 according to the embodiment described above may be mounted on any work machine other than the shovel 100. For example, the surroundings monitoring apparatus 150 may be mounted on a lifting magnet machine having a lifting magnet attached thereto as an end attachment, a bulldozer, a wheel loader, an asphalt finisher, a forestry machine, and the like.

The functions of the detecting part 304 according to the embodiments and modifications described above, that is a detection device (an identification device) capable of identifying whether the wearing state of safety equipment may be provided in a structure, any other work machine, a work vehicle, a building, and the like at a worksite, instead of or in addition to the shovel 100. Examples of the structure at a worksite include an entrance gate. Examples of work machines at a worksite include a bulldozer and a crane. Examples of work vehicles at a worksite include a truck. Examples of buildings at the worksite include a temporary office. Accordingly, the administrator or the like at a worksite can use detection results of the detection device to ascertain the wearing state of safety equipment by a worker over a wide range of the worksite. That is, the administrator or the like can perform safety management at the worksite. Further, information related to detection results of the detection device may be stored in a storage device. In this case, hardware (such as a terminal apparatus or a server apparatus) implementing the configuration of a storage device, a recording device, or the like may be provided at the same location as the detection device, or may be provided at a different location from the detection device so as to be communicated with the detection device in a wired manner or a wireless manner.

FIG. 23 is a block diagram illustrating an example configuration of a worksite safety management system 2000, for example.

As illustrated in FIG. 23, the worksite safety management system 2000 (an example of a safety equipment confirmation system) includes a control device 2100, a camera 2200, a sensor 2300, an input device 2400, an output device 2500, and a communication device 2600.

The control device 2100 performs control related to the worksite safety management system 2000. The control device 2100 may be provided at a location where the camera 2200 and the sensor 2300 are provided, may be provided at a location relatively close to the camera 2200 and the sensor 2300, or may be provided at a location different from the camera 2200 and the sensor 2300 at a worksite. Further, the control device 2100 may be provided, for example, in a structure, a building, or the like at a worksite. Further, the control device 2100 may be provided, for example, in a work machine including the shovel 100, a work vehicle, or the like at a worksite. If the control device 2100 is provided in the shovel 100, the control device 2100 corresponds to the controller 30 according to the embodiments described above.

The functions of the control device 2100 may be implemented by any hardware, a combination of any hardware and any software, or the like. For example, the control device 2100 may be configured mainly by a computer that includes a CPU, a memory device such as a RAM, an auxiliary storage device such as a ROM, and input and output interfaces for external devices.

The control device 2100 includes a detecting part 2110, a setting part 2120, and a log output part 2150 as functional parts implemented by reading a program installed in the auxiliary storage device, loading a program into the memory device, and executing the program on the CPU. Further, the control device 210 uses a storage 2130 and a storage 2140 implemented by storage areas defined in an internal memory, such as the auxiliary storage device of the control device 210, or in an external storage device that is communicatively connected to the control device 2100.

The camera 2200 (an example of a sensor) captures an image of an area at a worksite. The camera 2200 is communicably connected to the control device 2100, and the output (a captured image) of the camera 2200 is input into the control device 2100. The camera 2200 may be provided in a structure, a building, or the like at a worksite. Further, the camera 2200 may be provided, for example, in a work machine including the shovel 100, a work vehicle, or the like at a worksite. If the camera 2200 is provided in the shovel 100, the camera 2200 corresponds to the image capturing device 40 (camera 40X) according to the embodiments described above.

The sensor 2300 obtains information on the situation of a worksite. The sensor 2300 is communicably connected to the control device 2100, and the output of the sensor 2300 is input into the control device 2100. Similar to the surrounding information obtaining device 45 (sensor 45X), the sensor 2300 may be, for example, lidar. Similar to the surrounding information obtaining device 45 (sensor 45X), the sensor 2300 may be, for example, a millimeter wave radar, an ultrasonic sensor, or the like. In the following, an example in which the sensor 2300 is lidar will be mainly described.

The imaging range of the camera 2200 and the information obtaining range of the sensor 2300 are set such that the imaging range and the information obtaining range overlap at least partially. Accordingly, the detecting part 2110 can detect the same monitoring target (worker) located in an overlapping area both when the output of the camera 2200 is used and when the output of the sensor 2300 is used.

The input device 2400 receives various inputs from a user such as an administrator, a supervisor, or a worker at a worksite. The input device 2400 is communicably connected to the control device 2100, and signals corresponding to the various inputs are input into the control device 2100. The input device 2400 includes, for example, an operation input device configured to receive an operation input from the user. The input device 2400 may include a speech input device and a gesture input device configured to receive a speech input and a gesture input from the user.

The output device 2500 is communicably connected to the control device 2100, and outputs information to a user, such as an administrator, a supervisor, or a worker at a worksite, based on data received from the control device 2100. The output device 2500 includes, for example, a display device, an illumination device, and the like configured to output visual information. The output device 2500 includes, for example, a sound output device configured to output auditory information, The communication device 2600 is provided at the same location as the control device 2100, and communicates with external apparatuses (such as the management apparatus 200 and terminal apparatus 300) outside the location where the control device 2100 is provided.

The detecting part 2110 (an example of an identification device) detects a worker at a worksite based on the outputs of the camera 2200 and the sensor 2300. The detecting part 2110 includes detecting parts 2110A and 2110B.

The detecting part 2110A detects a person (worker) in a predetermined monitoring area at a worksite based on the output (a captured image) of the camera 2200, in a manner similar to the detecting part 304A according to the embodiments described above. In this manner, the detecting part 2110A can detect a worker in the monitoring area, identify the position of the worker, and identify whether the detected worker is included in a plurality of pre-registered workers. Further, the detecting part 2110A can detect a worker who wears a helmet with a relatively high probability (detection accuracy) by recognizing the helmet in an image captured by the camera 2200. That is, the detecting part 2110A can identify whether a worker, detected based on a feature other than a helmet or detected by the detecting part 2110B, wears a helmet.

The detecting part 2110B detects a person (worker) in the monitoring area, which is the same as that of the detecting part 2110A, at a worksite based on the output of the sensor 2300, in a manner similar to the detecting part 304B according to the embodiments described above. In this manner, the detecting part 2110B can detect a worker in the monitoring area, and identify the position of the worker. Further, the detecting part 2110B can detect a worker who wears clothing with a reflective material with a relatively high probability (detection accuracy) by utilizing the received light intensity information. That is, the detecting part 2110B can identify whether a worker, detected based on a feature other than clothing with a reflective material or detected by the detecting part 2110A, wears clothing with a reflective material.

Further, when a worker is detected, the detecting part 2110 may determine the wearing states of a plurality of (types) of pieces of safety equipment by the detected worker. The plurality of pieces of safety equipment may be a plurality of pieces of safety equipment required or recommended to be worn at a worksite managed by the worksite safety management system 2000. Examples of the plurality of pieces of safety equipment include a helmet and clothing with a reflective material as described above. In addition, examples of the plurality of pieces of safety equipment include a safety belt, earplugs at a noisy worksite, and safety shoes. In addition, examples of the plurality of pieces of safety equipment include arc welding gloves, anti-vibration gloves, and the like (which are examples of predetermined gloves), an anti-dust mask, a respirator, and the like (which are examples of a predetermined mask), anti-dust glasses, light shielding glasses, and the like (which are examples of predetermined safety glasses), and a welding shield (which is an example of a predetermined face shield). In addition, examples of the plurality of pieces of safety equipment include an ID tag (an example of a portable alarm device) for outputting an alarm in response to the approach of a working machine (an example of a predetermined object), or the like.

When a worker is detected, the detecting part 2110 may determine whether the detected worker wears each of a helmet and clothing with a reflective material based on the output results of the detecting part 2110A and the detecting part 2110B.

Further, when a worker is detected, the detecting part 2110 may determine the wearing state of each piece of safety equipment by the detected worker by comprehensively considering the output (a captured image) of the camera 2200 and the output (received light information) of the sensor 2300. Specifically, the detecting part 2110 may determine whether the detected worker wears each piece of safety equipment based on an image feature value of an image captured by the camera 2200 and the three-dimensional size of clothing worn by the detected worker. The three-dimensional size of the clothing worn by the detected worker is obtained based on received light information. In this case, the storage 2130 may include a database (hereinafter referred to as a "wearing state determination database") storing image feature values and received light information used to determine whether each piece of safety equipment is worn. The wearing state determination database may be built in advance by machine learning (reinforcement learning) using experimental results or simulated results. Then, the detecting part 2110 may determine whether the detected worker wears each piece of safety equipment by comparing an image feature value of an image captured by the camera 2200 and received light information of the sensor 2300, with data included in the wearing state determination database.

The detecting part 2110 may output information related to determination results of the wearing state of each piece of safety equipment by the detected worker, to users including the detected worker through the output device 2500.

For example, when determining that any safety equipment of the plurality of pieces of safety equipment is not worn, the detecting part 2110 may output an alarm, indicating that the safety equipment is not worn, through the output device 2500. Further, when determining that all of the plurality of pieces of safety equipment are worn, the detector 2110 may output a notification, indicating that all of the plurality of pieces of safety equipment are worn, to the worker through the output device 2500. Accordingly, the worksite safety management system 2000 can encourage workers to wear the plurality of pieces of safety equipment required or recommended to be worn at a worksite.

The setting part 2120 configures settings related to the worksite safety management system 2000, in response to receiving a predetermined input from a user through the input device 2400. Accordingly, the user can cause the control device 2100 to configure the settings related to the worksite safety management system 2000 through the input device 2400 in any manner.

For example, in response to receiving a predetermined input through the input device 2400, the setting part 2120 may configure settings for adding or deleting safety equipment to be identified. Further, in response to receiving a predetermined input through the input device 2400, the setting part 2120 may configure settings related to the wearing state determination database, that is, may register new data, update data, or the like in the wearing state determination database. The settings (changes) made by the setting part 2120 are registered (stored) in the storage 2130.

The storage 2130 stores various settings and the like related to the worksite safety management system 2000. For example, as described above, the storage 2130 stores settings for defining the plurality of types of safety equipment to be identified. Further, for example, the wearing state determination database is built in the storage 2130, as described above.

The storage 2140 (an example of a storage device) stores (registers) log information related to results determined by the detecting part 2110 as to whether the plurality of pieces of safety equipment are worn by workers (that is, the determination results of the wearing state of each piece of safety equipment). For example, when a worker is detected by the detecting part 2110, log information (a record), including the date and time when the worker is detected, identification information of the detected worker (for example, a unique ID for each of the registered workers), and information indicating whether of each piece of safety equipment is worn, is stored in the storage 2140. Accordingly, a database including a group of records related to the determination results of the wearing state of each piece of safety equipment can be built in the storage 2140.

The log output part 2150 outputs the log information stored in the storage 2140 to an external device. The log information is related to the determination results of the wearing state of each piece of safety equipment by workers.

In response to receiving a predetermined input through the input device 2400, the log output part 2150 outputs the log information stored in the storage 2140 to a user through the output device 2500. Accordingly, the user can check the history of the wearing state of safety equipment by the past workers, and analyze the wearing state of safety equipment at the worksite based on the history.

Further, in response to receiving a predetermined input through the input device 2400, the log output part 2150 may output (transmit) the log information, stored in the storage 2140, to an external apparatus (such as the management apparatus 200 or the terminal apparatus 300) through the communication device 2600. Accordingly, the user can send the log information to the external apparatus such as the management apparatus 200 or the terminal apparatus 300. Then, the user can check the history of the wearing state of safety equipment by the past workers, and analyze the wearing state of the safety equipment at the worksite based on the history.

As described, in the present example, the worksite safety management system 2000 includes a plurality of different types of sensors (for example, the camera 2200 and the sensor 2300). Based on the outputs of the plurality of sensors, the detecting part 2110 detects a worker at a worksite where a plurality of pieces of safety equipment are recommended or required to be worn, and determines (identifies) the wearing state of each piece of safety equipment by the worker.

Accordingly, the worksite safety management system 2000 can ascertain the wearing state of safety equipment by a worker at a worksite. Therefore, if a worker detected at a worksite does not wear any safety equipment based on the determination results (identification results) of the wearing state of each piece of safety equipment, the administrator or the like at the worksite can encourage the worker to wear the safety equipment. Therefore, the worksite safety management system 2000 can improve the safety at the worksite.

In the present example, the storage 2140 may store information related to determination results (identification results) of the wearing state of each piece of safety equipment by a worker detected by the detecting part 2110.

Accordingly, the user can later check the log information (history) of the determination results of the wearing state of each piece of safety equipment through an external apparatus (for example, the management apparatus 200 or the terminal apparatus 300) communicatively connected to the output device 2500 or the control device 2100. Therefore, the user can consider measures to improve the wearing rate of safety equipment at a worksite by checking and analyzing the log information later. Therefore, the worksite safety management system 2000 can improve the safety of the worksite.

What is claimed is:

1. A display device,
   wherein the display device is configured to display a through-the-lens image captured by a camera, the captured image representing a situation around a shovel, and when an object is detected based on an output of a distance sensor, display an indicator image within the displayed captured image of the camera, the indicator image pointing to a direction in which the detected object is present when an area in the captured image of the camera is viewed from the shovel, and
   wherein the display device is configured to, when a predetermined object is detected within an imaging range of the camera based on the captured image of the camera and the output of the distance sensor, display, within the displayed captured image of the camera,
   an image of the predetermined object,
   a frame image over the image of the predetermined object, the frame image indicating a position of the predetermined object, and
   the indicator image separately from the image of the predetermined object and the frame image, the indicator image pointing to a direction in which the predetermined object is present when the area in the captured image of the camera is viewed from the shovel, the indicator image being displayed at a lower end of the displayed captured image of the camera.

2. The display device according to claim 1, wherein the display device is configured to, when the predetermined object is detected outside the imaging range of the camera based on the output of the distance sensor, display the indicator image within the displayed captured image of the camera, the indicator image pointing to a direction in which the predetermined object is present when the area in the captured image of the camera is viewed from the shovel, the indicator image pointing outward of the displayed captured image.

3. The display device according to claim 2, wherein the display device is configured to, when the predetermined object is detected outside the imaging range of the camera, display the indicator image within the displayed captured image of the camera without displaying the image of the predetermined object or the frame image.

4. The display device according to claim 1, wherein the display device is configured to superimpose the indicator image on the displayed captured image of the camera.

5. The display device according to claim 1, wherein the indicator image includes a gap, the displayed captured image of the camera being exposed through the gap.

6. The display device according to claim 1, wherein the display device is configured to change a manner of displaying the indicator image in accordance with a distance between the predetermined object and the shovel.

7. The display device according to claim 1, wherein the display device is configured to, when the predetermined object is detected outside the imaging range of the camera based on the output of the distance sensor, cause the captured image of the camera to remain displayed until an operation for changing a display content is performed.

8. The display device according to claim 1, wherein the display device is configured to, when the predetermined object is detected within the imaging range of the camera, display the indicator image pointing inward of the displayed captured image of the camera.

9. The display device according to claim 1, wherein the display device is configured to display the indicator image having an arrow shape or a triangular shape.

10. The display device according to claim 1, wherein the distance sensor is one of a LIDAR sensor, a millimeter wave radar, and an ultrasonic sensor.

11. A shovel comprising:
    the display device according to claim 1; and
    a cabin,
    wherein the display device is provided within the cabin.

12. An information processing apparatus comprising:
    the display device according to claim 1; and
    an operation device for remote operation of the shovel.

* * * * *